Jan. 27, 1942.　　　　H. T. AVERY　　　　2,271,240
CALCULATING MACHINE
Filed June 12, 1936　　　37 Sheets-Sheet 1
FIG_1_
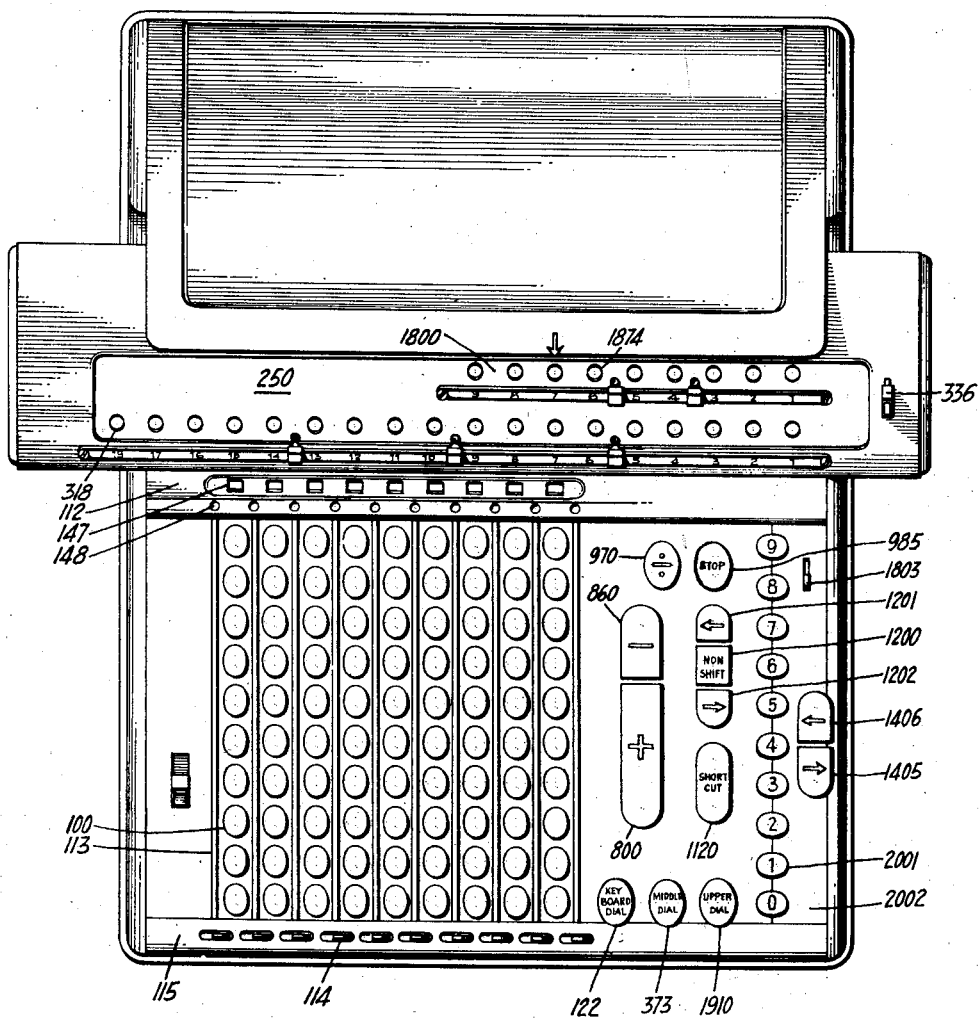
INVENTOR.
Harold T. Avery
BY
ATTORNEY

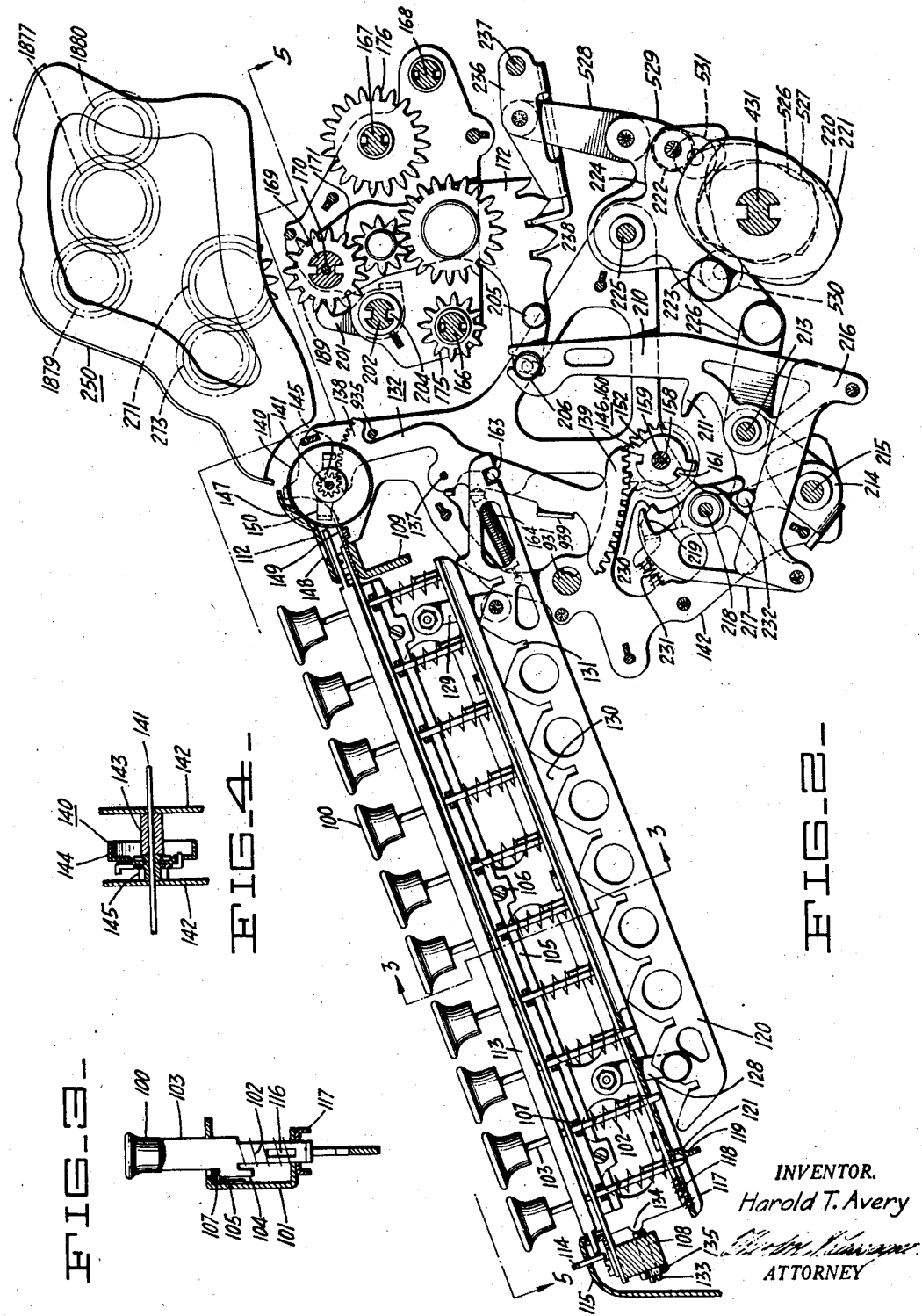

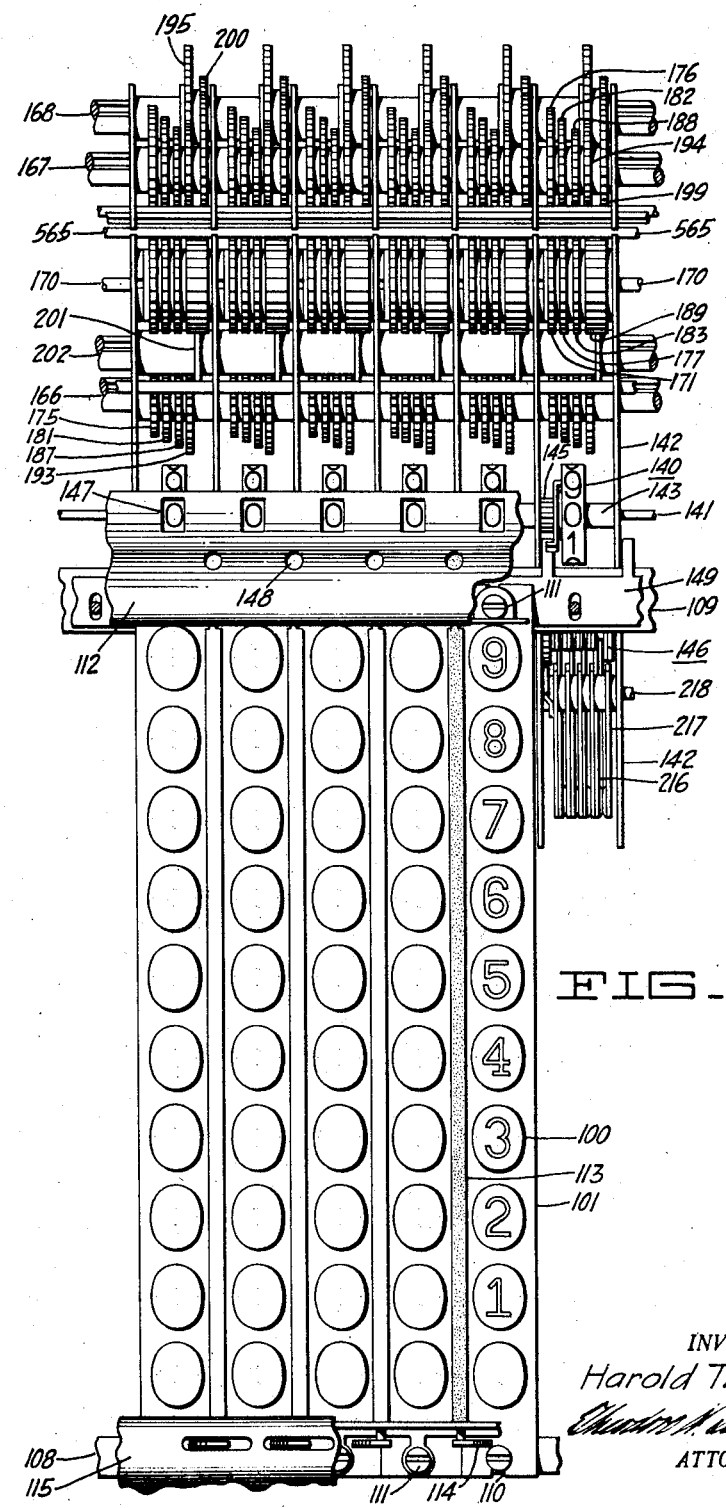
FIG_5_

Jan. 27, 1942.   H. T. AVERY   2,271,240
CALCULATING MACHINE
Filed June 12, 1936   37 Sheets-Sheet 4
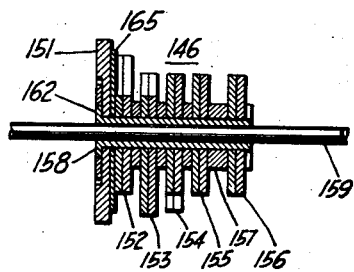
FIG_7_
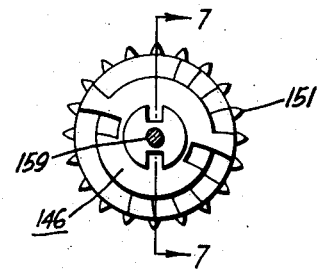
FIG_6_
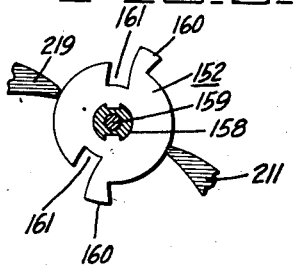
FIG_8_
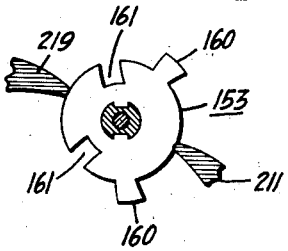
FIG_8A_
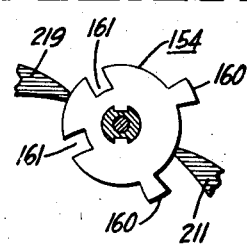
FIG_8B_
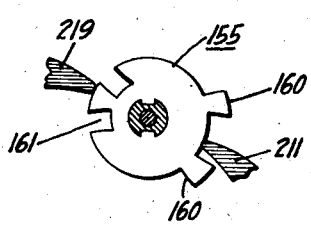
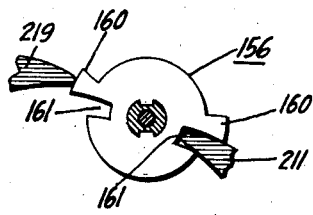
FIG_8C   FIG_8D_
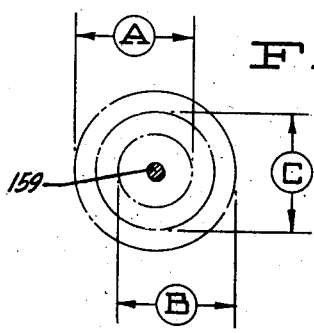
FIG_9_
INVENTOR.
Harold T. Avery
BY
ATTORNEY Jan. 27, 1942.   H. T. AVERY   2,271,240
CALCULATING MACHINE
Filed June 12, 1936   37 Sheets-Sheet 5
FIG_10_
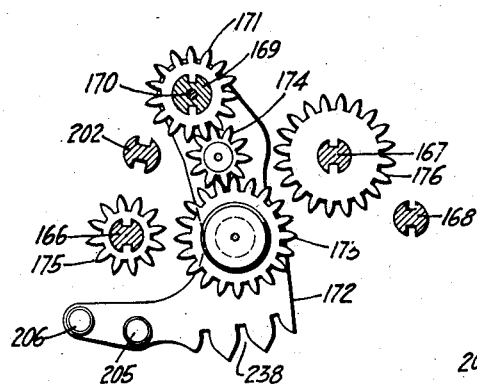
FIG_11_
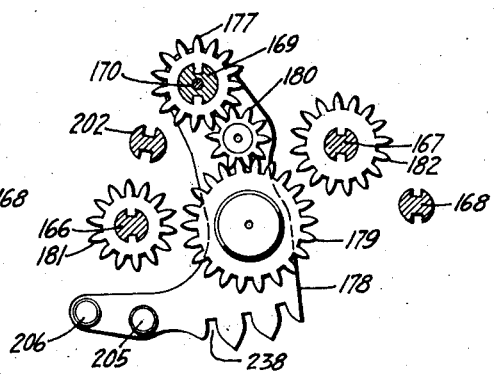
FIG_12_
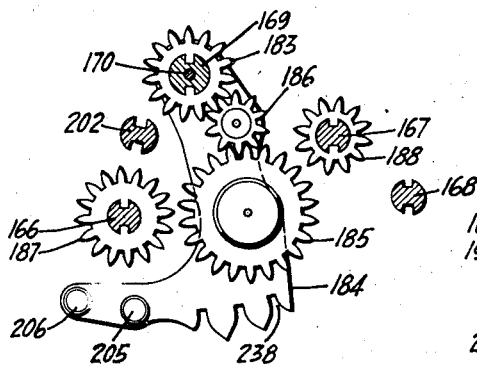
FIG_13_
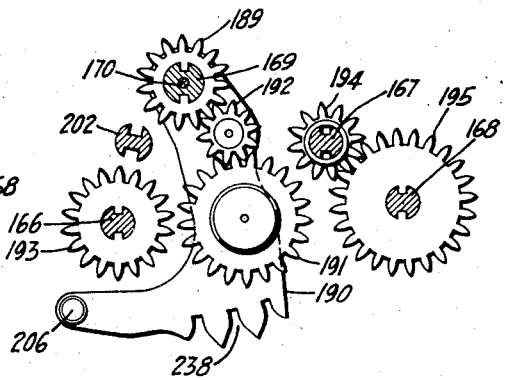
FIG_14_
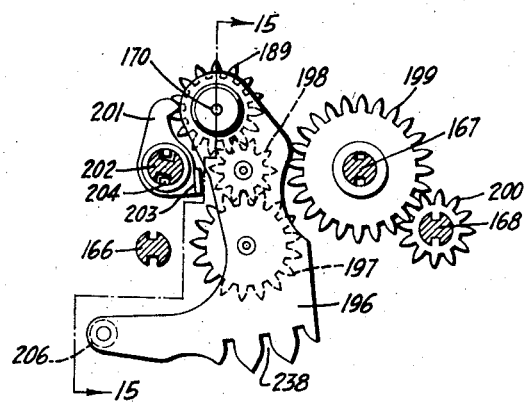
FIG_15_
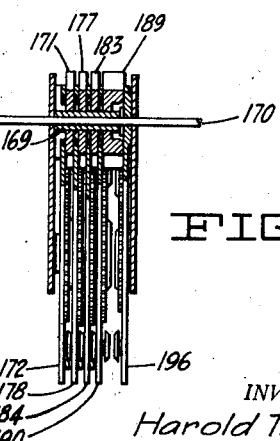
INVENTOR.
Harold T. Avery
BY
ATTORNEY

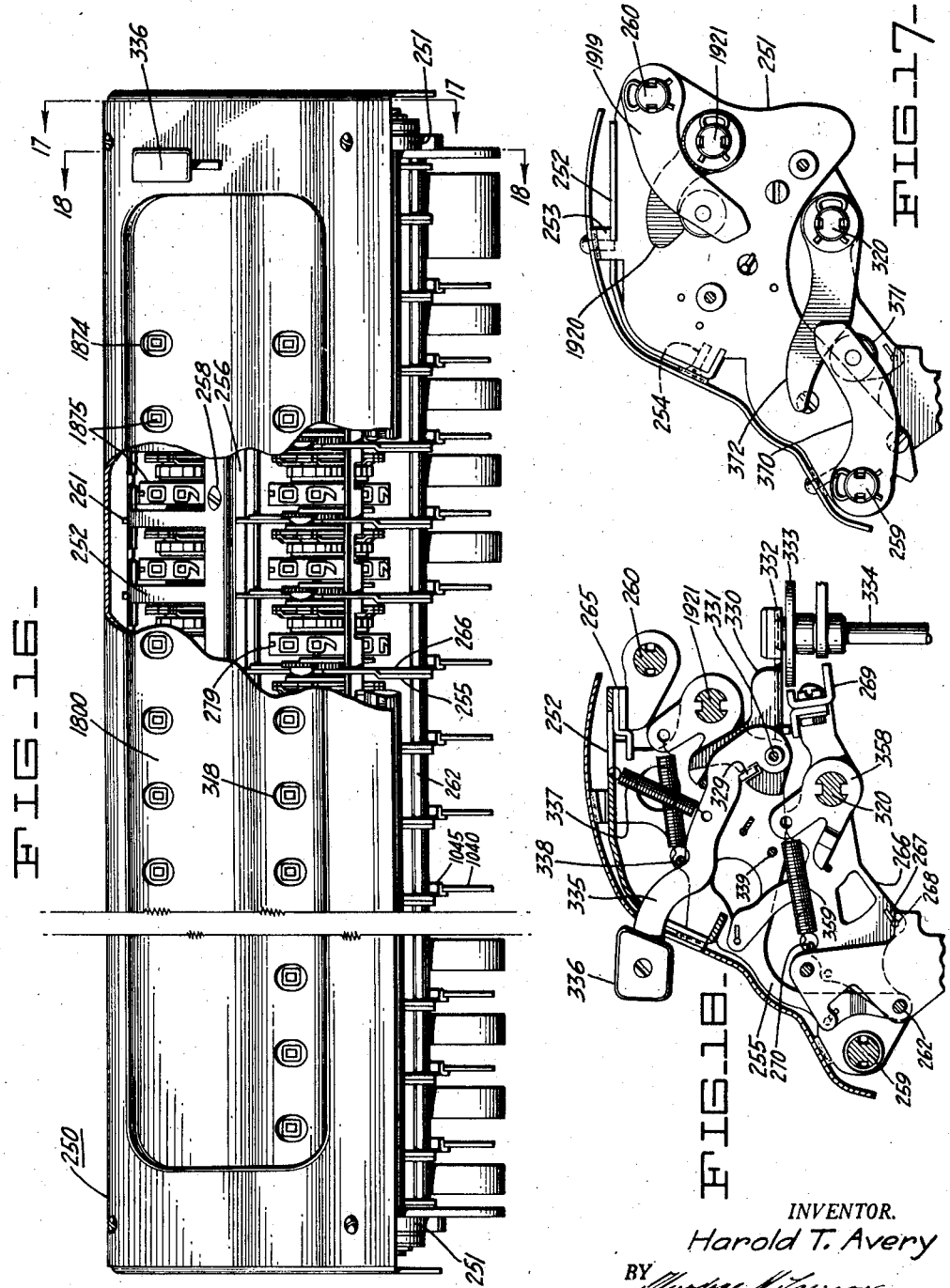

Jan. 27, 1942. H. T. AVERY 2,271,240
CALCULATING MACHINE
Filed June 12, 1936 37 Sheets-Sheet 7
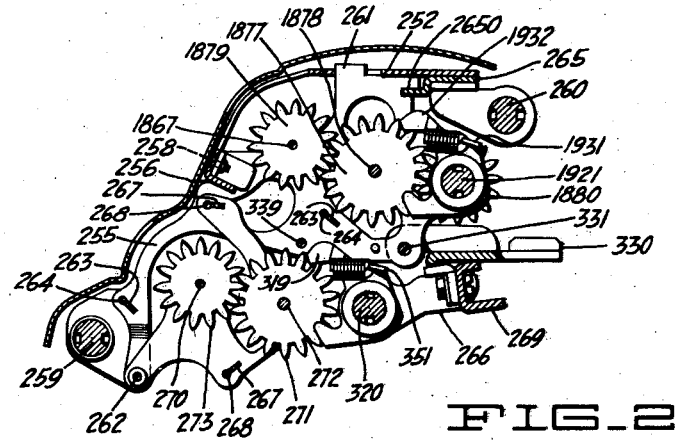
FIG_19_
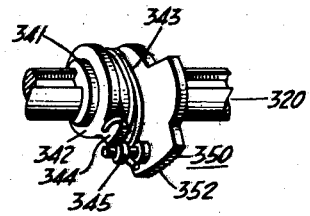
FIG_20_
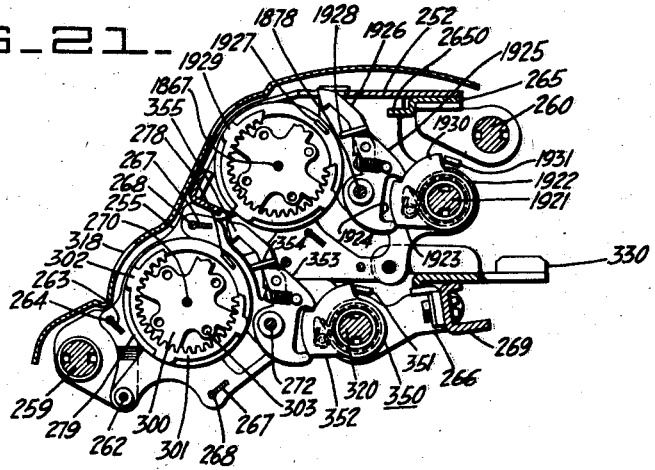
FIG_21_
INVENTOR.
Harold T. Avery
BY
ATTORNEY Jan. 27, 1942.  H. T. AVERY  2,271,240
CALCULATING MACHINE
Filed June 12, 1936  37 Sheets-Sheet 8
FIG_22_
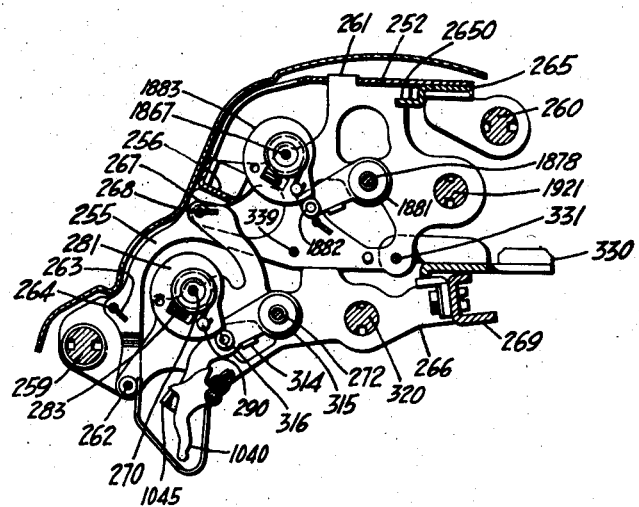
FIG_23_
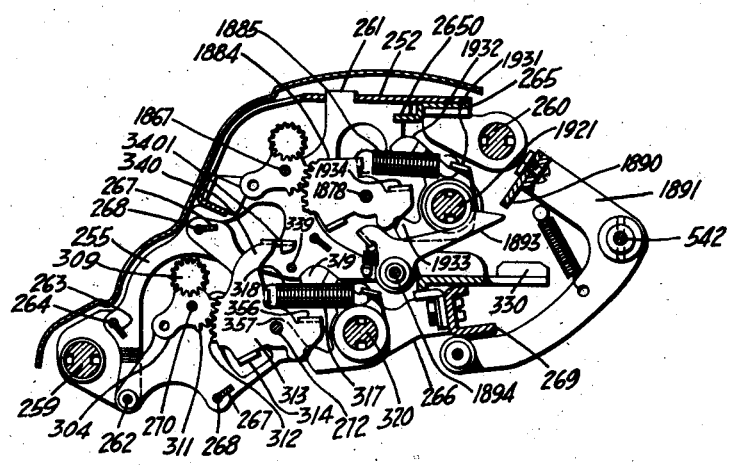
INVENTOR.
Harold T. Avery
BY
ATTORNEY.

Jan. 27, 1942.     H. T. AVERY     2,271,240
CALCULATING MACHINE
Filed June 12, 1936     37 Sheets-Sheet 9
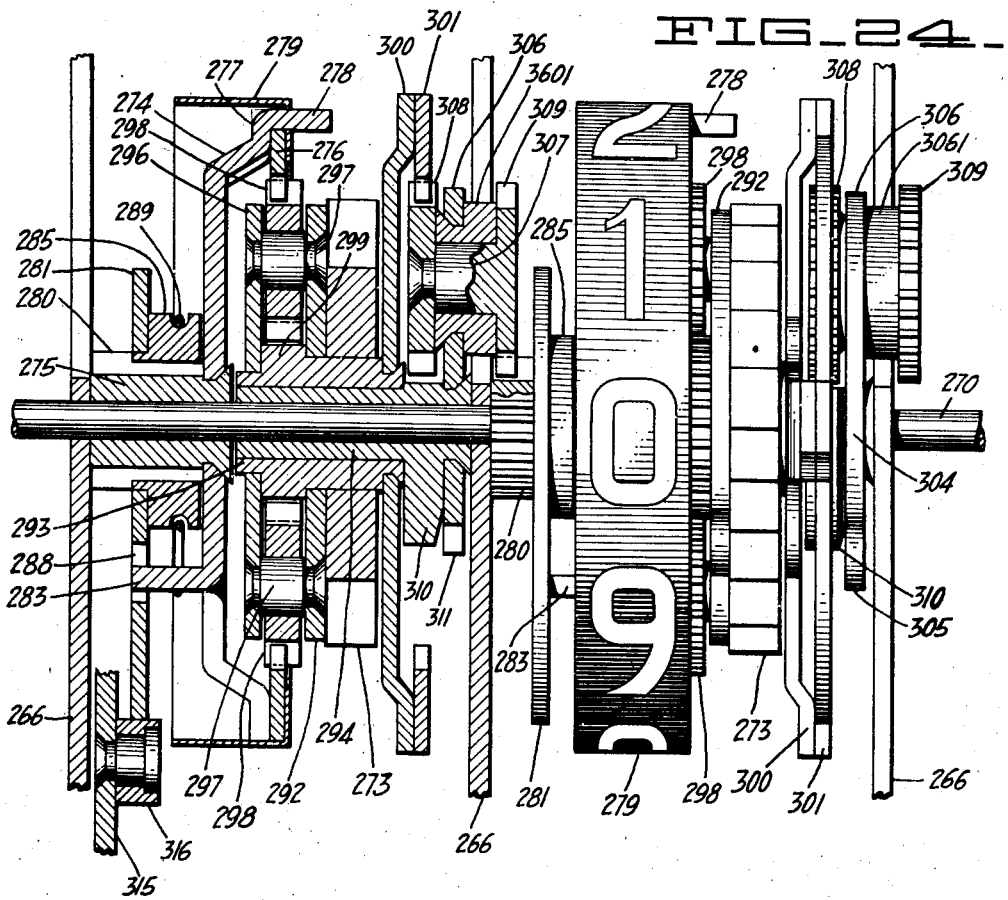
FIG_24_
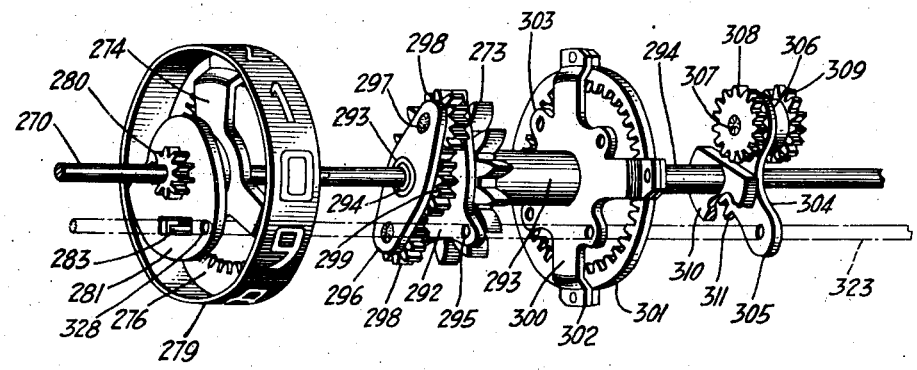
FIG_25_
INVENTOR.
Harold T. Avery
BY 
ATTORNEY

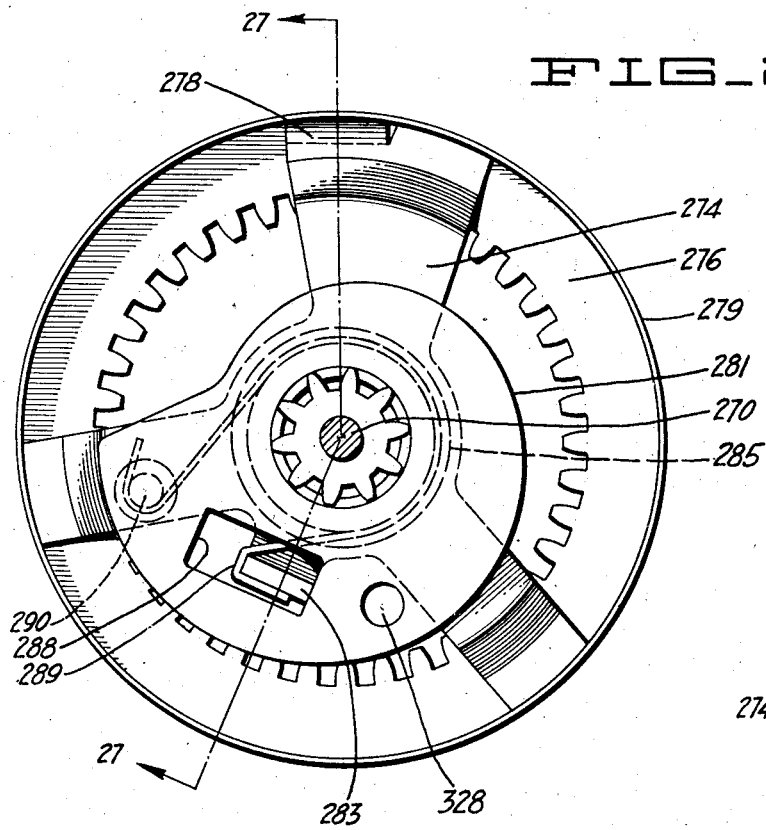
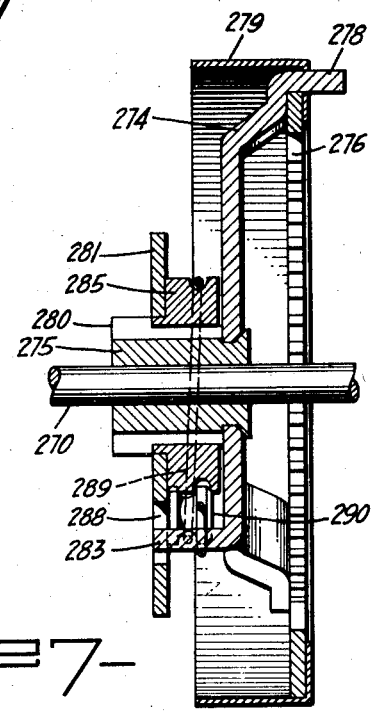

Jan. 27, 1942.  H. T. AVERY  2,271,240
CALCULATING MACHINE
Filed June 12, 1936  37 Sheets-Sheet 11
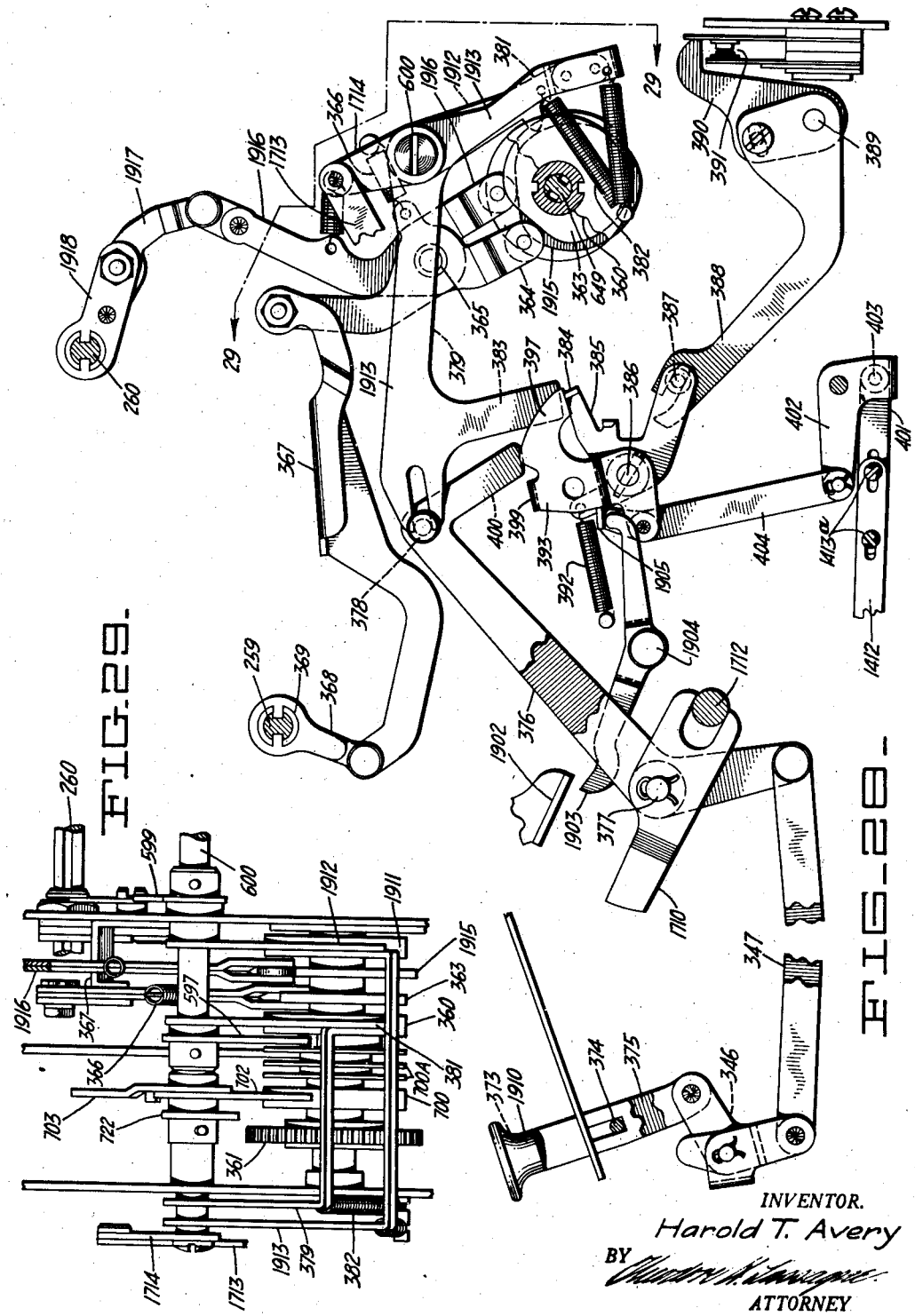
FIG. 29.  FIG. 28.
INVENTOR.
Harold T. Avery
BY
ATTORNEY Jan. 27, 1942.　　　H. T. AVERY　　　2,271,240
CALCULATING MACHINE
Filed June 12, 1936　　　37 Sheets-Sheet 12
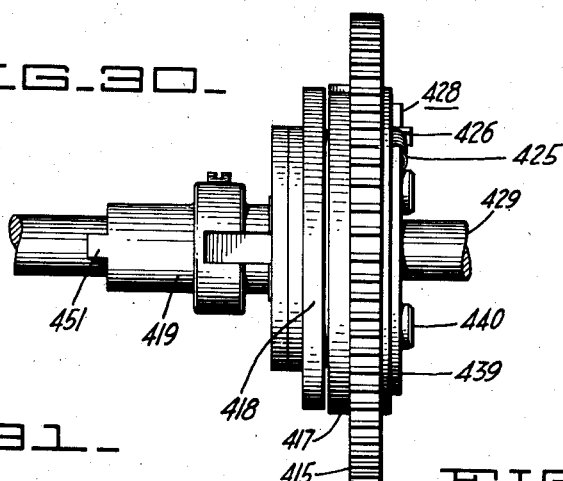
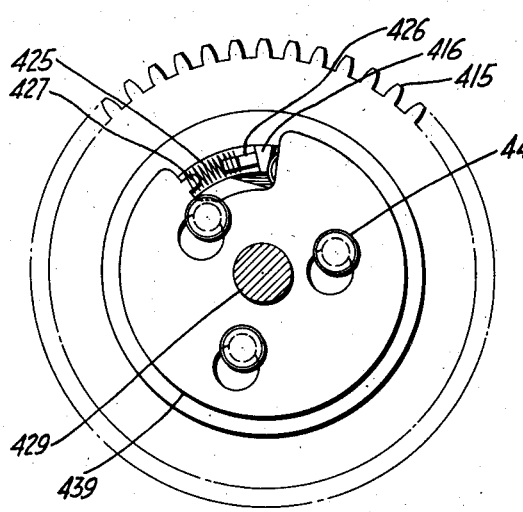
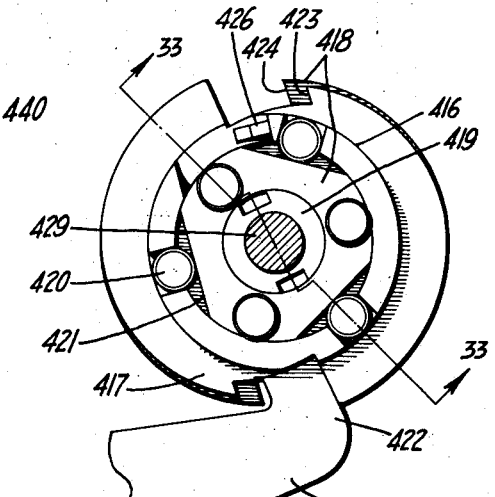
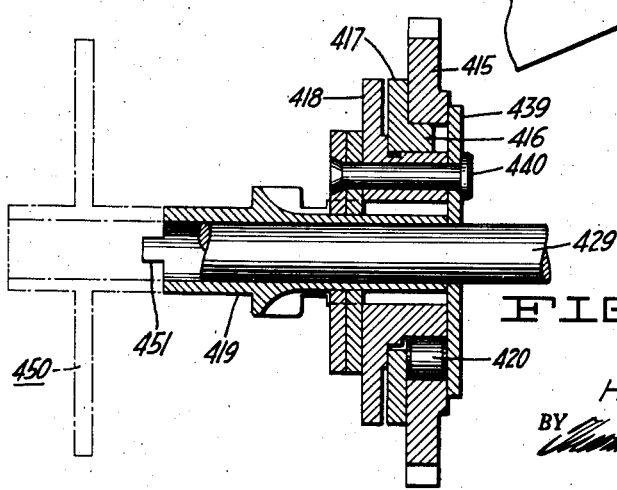
INVENTOR.
Harold T. Avery
BY
ATTORNEY

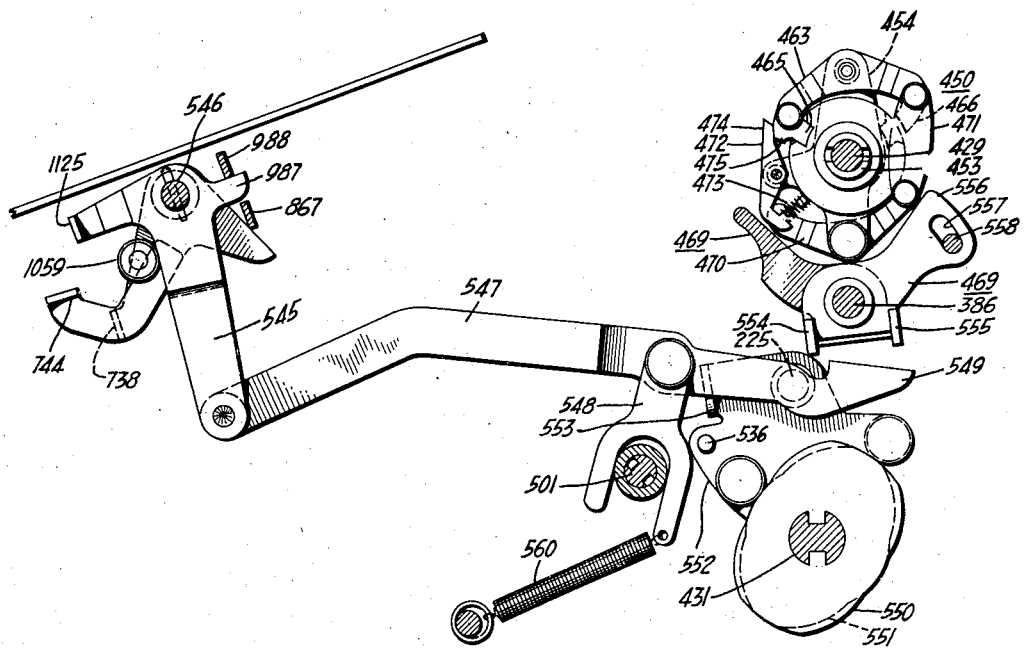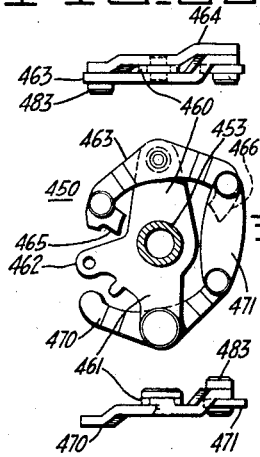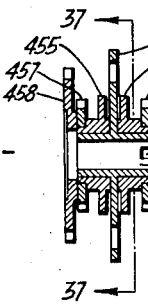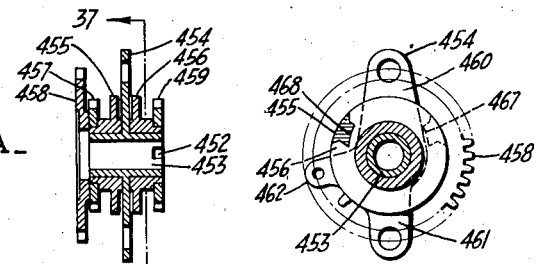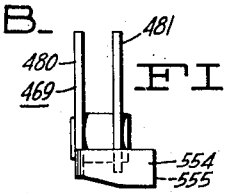

Jan. 27, 1942. H. T. AVERY 2,271,240
CALCULATING MACHINE
Filed June 12, 1936 37 Sheets-Sheet 14
FIG_39_
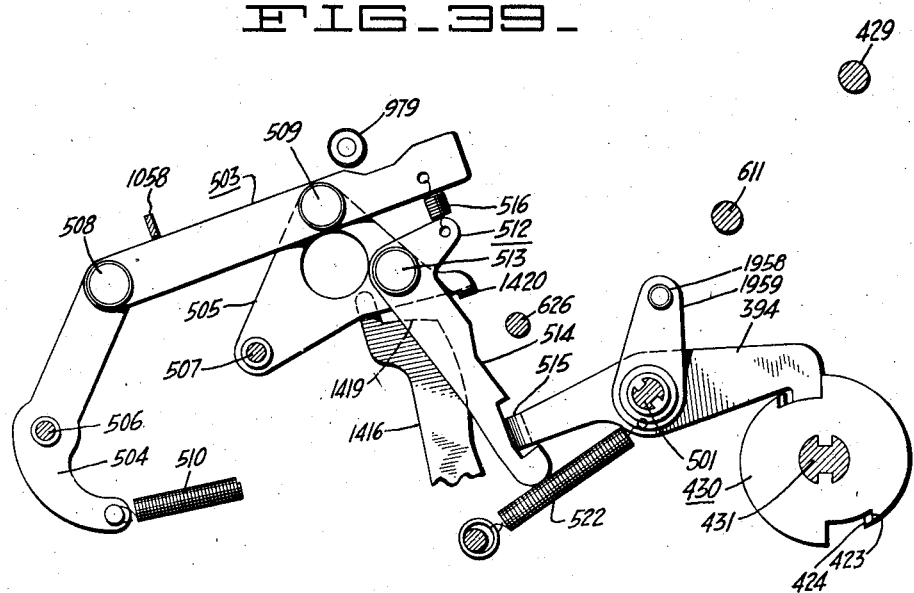
FIG_40_
FIG_41_
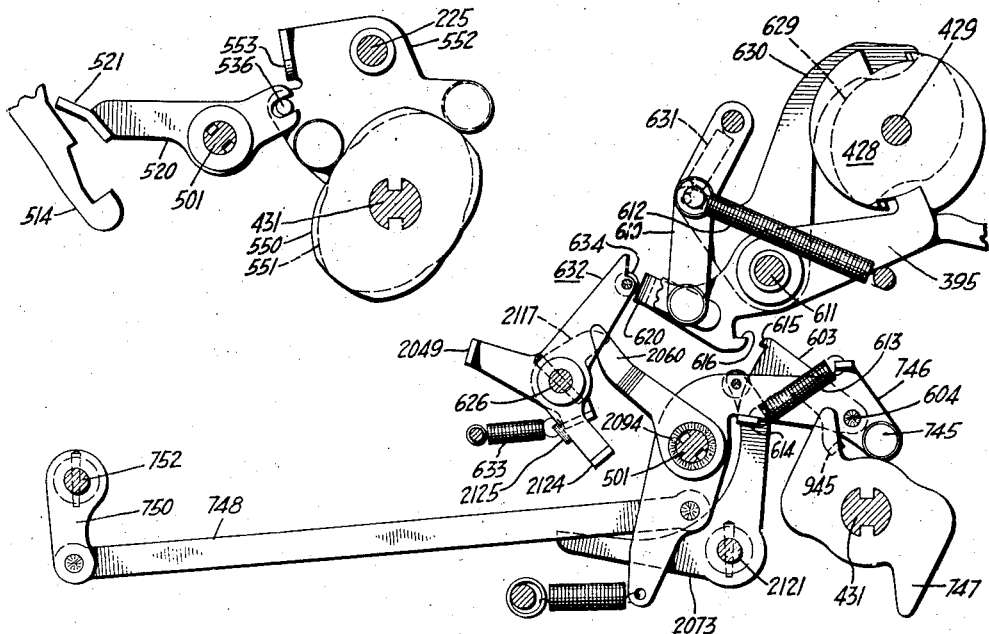
INVENTOR.
Harold T. Avery
BY
ATTORNEY Jan. 27, 1942.   H. T. AVERY   2,271,240
CALCULATING MACHINE
Filed June 12, 1936   37 Sheets-Sheet 15

INVENTOR.
Harold T. Avery
BY
ATTORNEY.

Jan. 27, 1942.                H. T. AVERY                 2,271,240
                          CALCULATING MACHINE
                         Filed June 12, 1936           37 Sheets—Sheet 17
FIG_46_
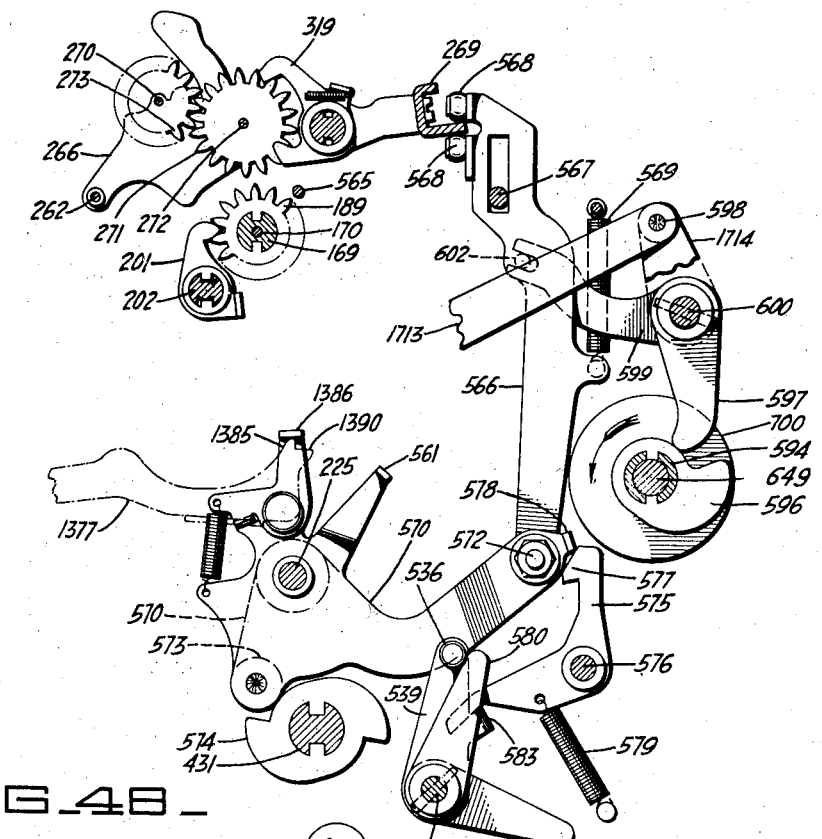
FIG_48_
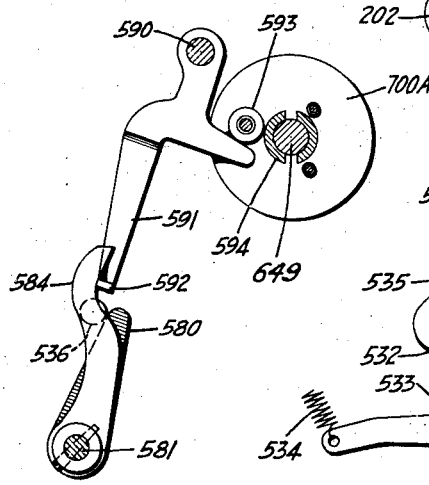
FIG_47_
INVENTOR.
Harold T. Avery
BY
ATTORNEY

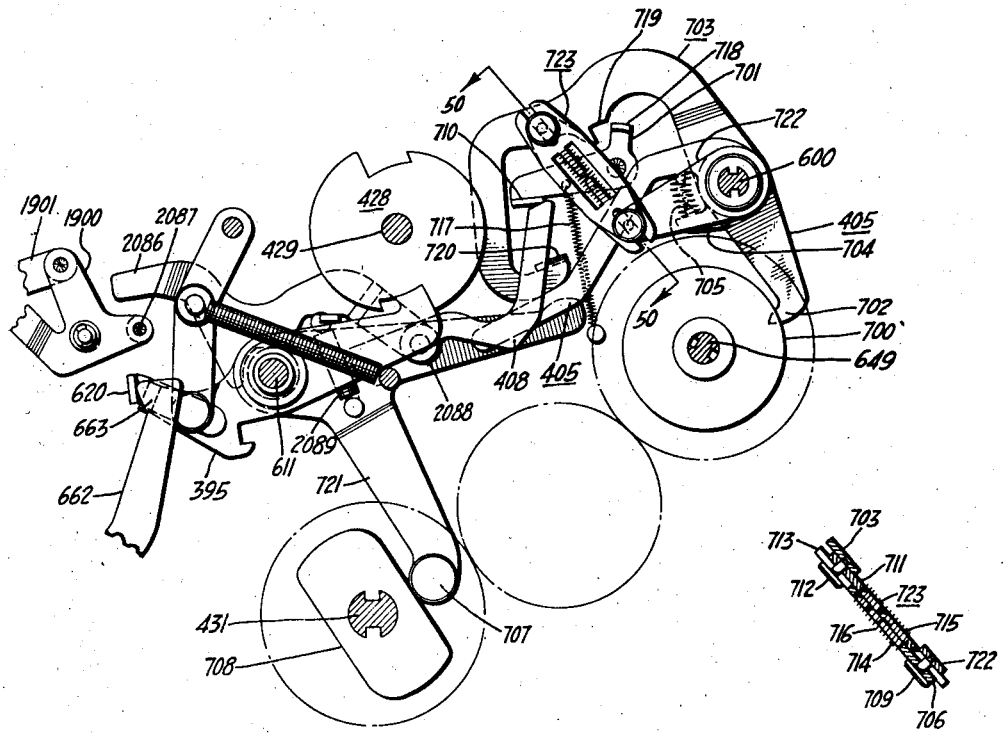
FIG. 49.
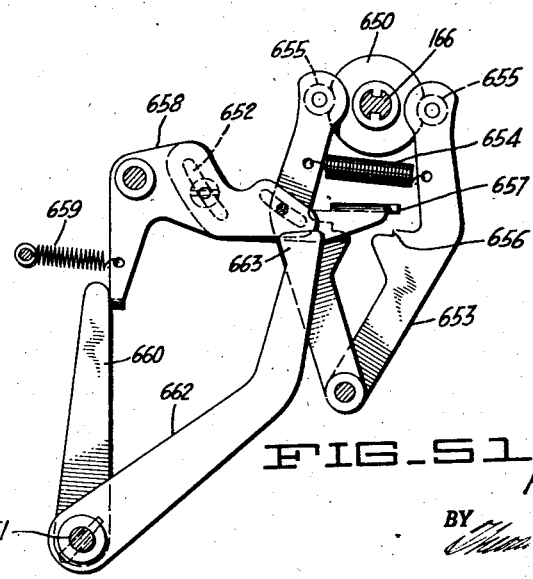
FIG. 50.
FIG. 51.
INVENTOR.
Harold T. Avery
BY
ATTORNEY

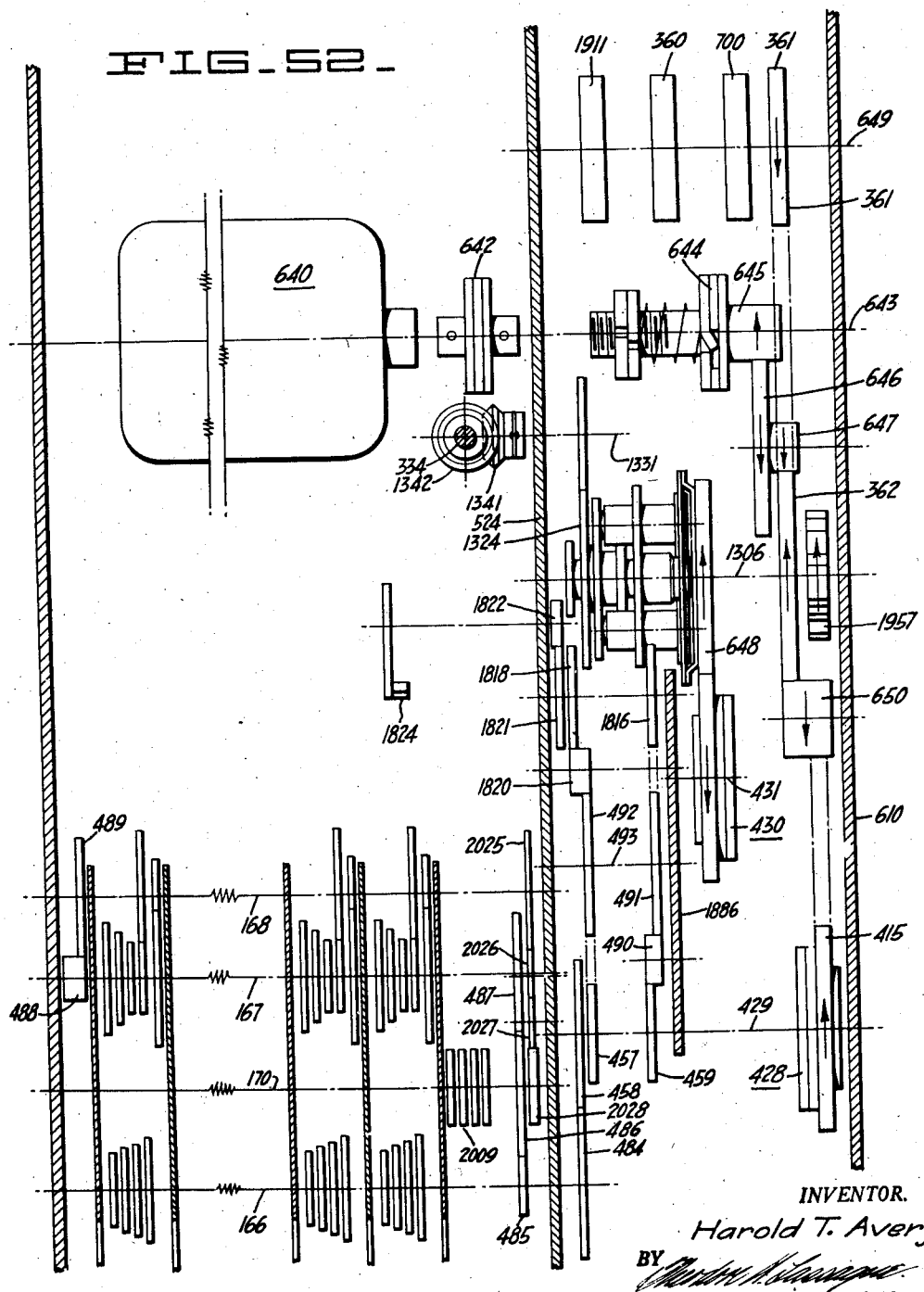

Jan. 27, 1942.   H. T. AVERY   2,271,240
CALCULATING MACHINE
Filed June 12, 1936   37 Sheets-Sheet 20
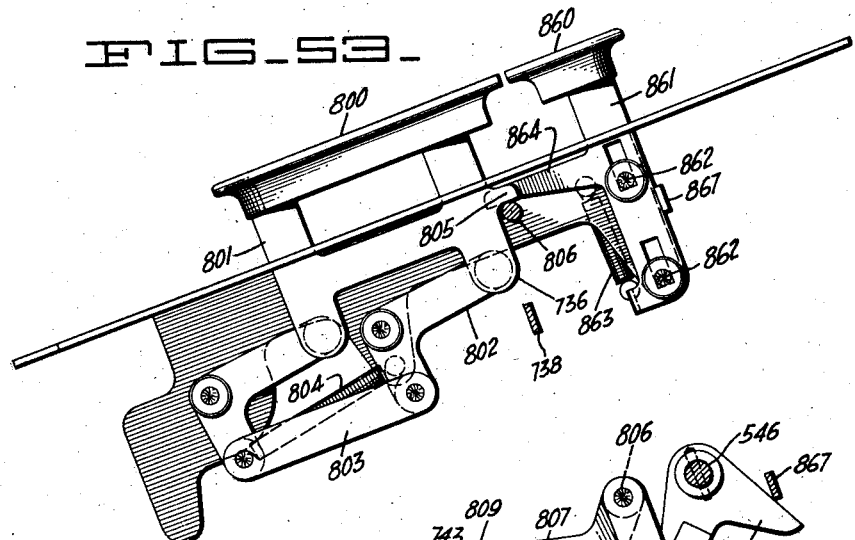
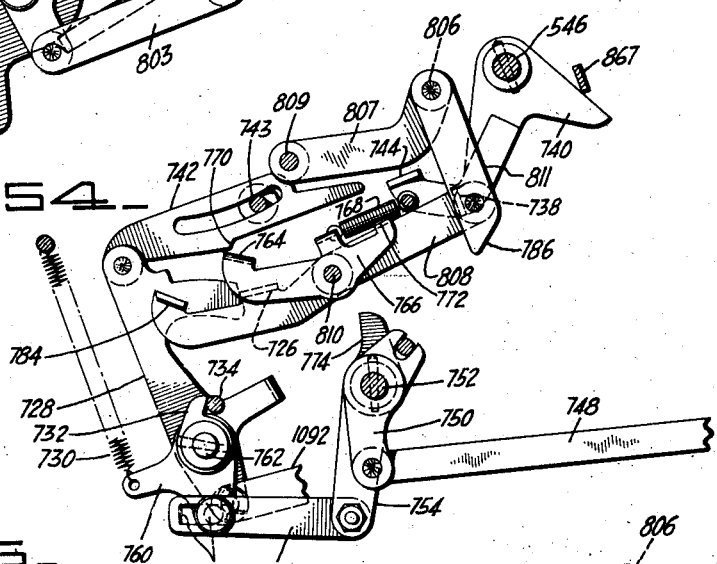
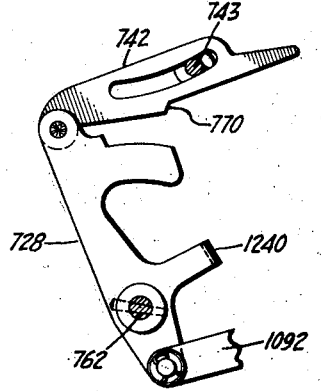
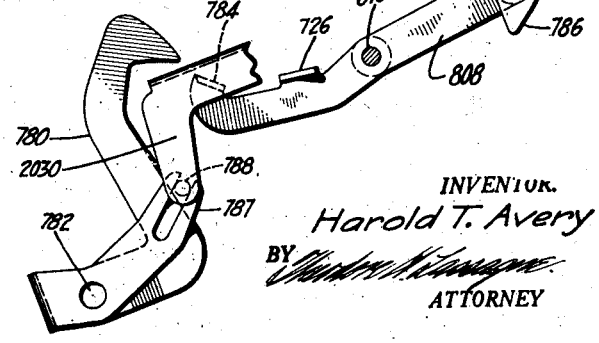
INVENTOR.
Harold T. Avery
BY
ATTORNEY

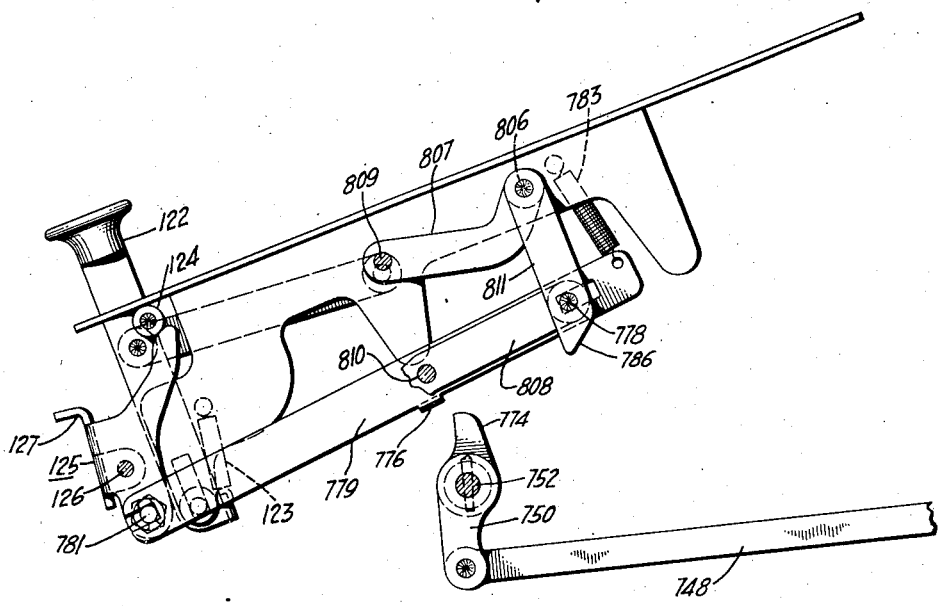
FIG-57-
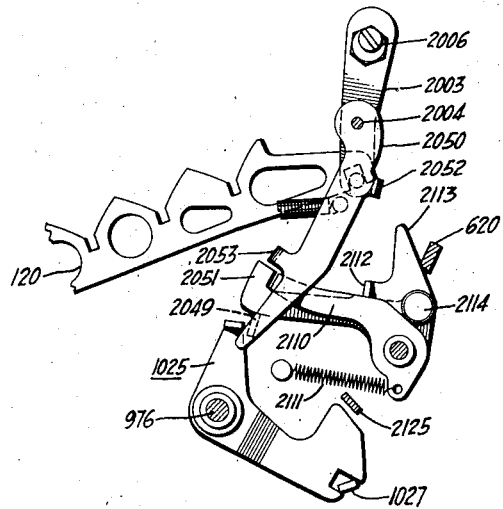
FIG-58-

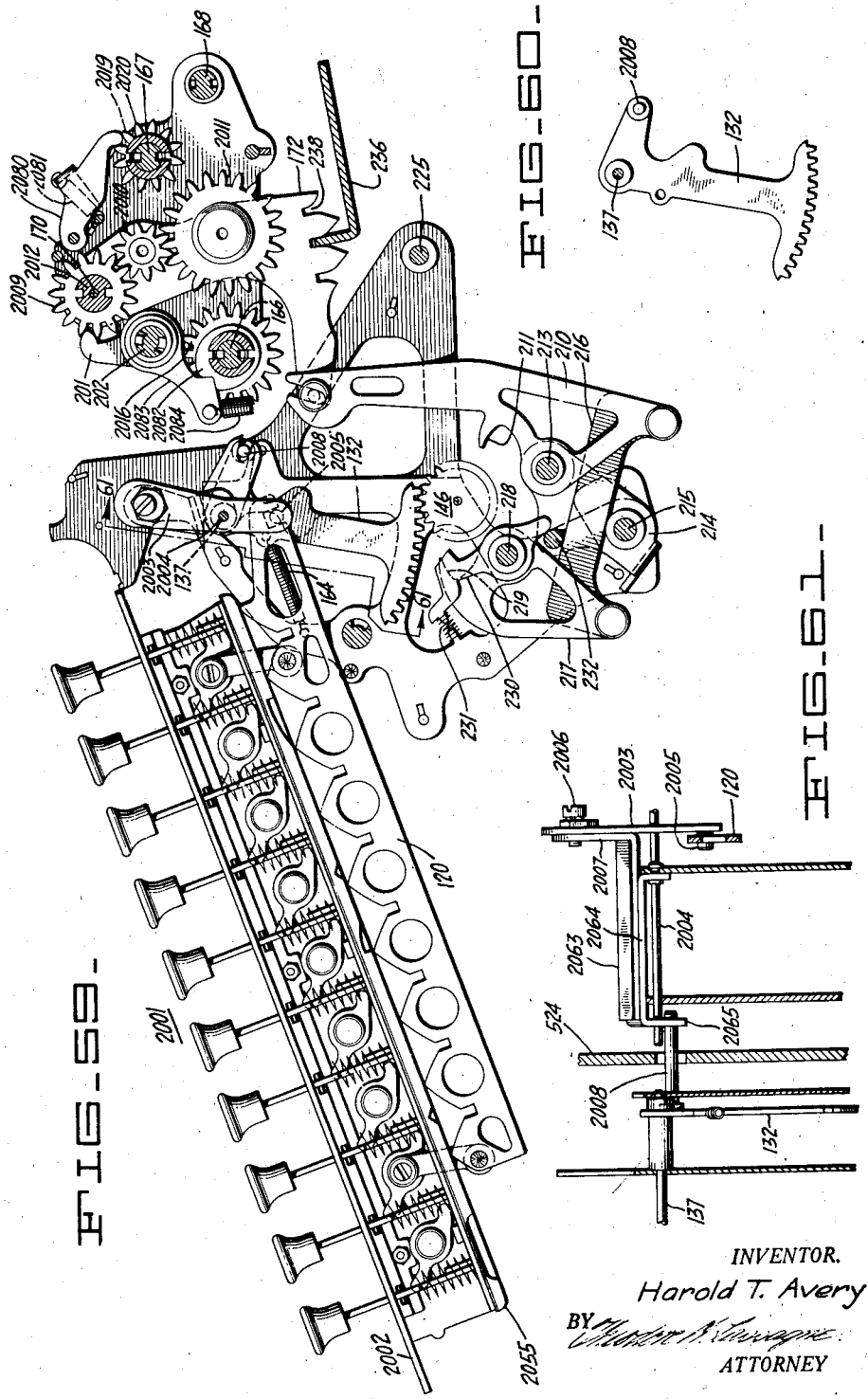

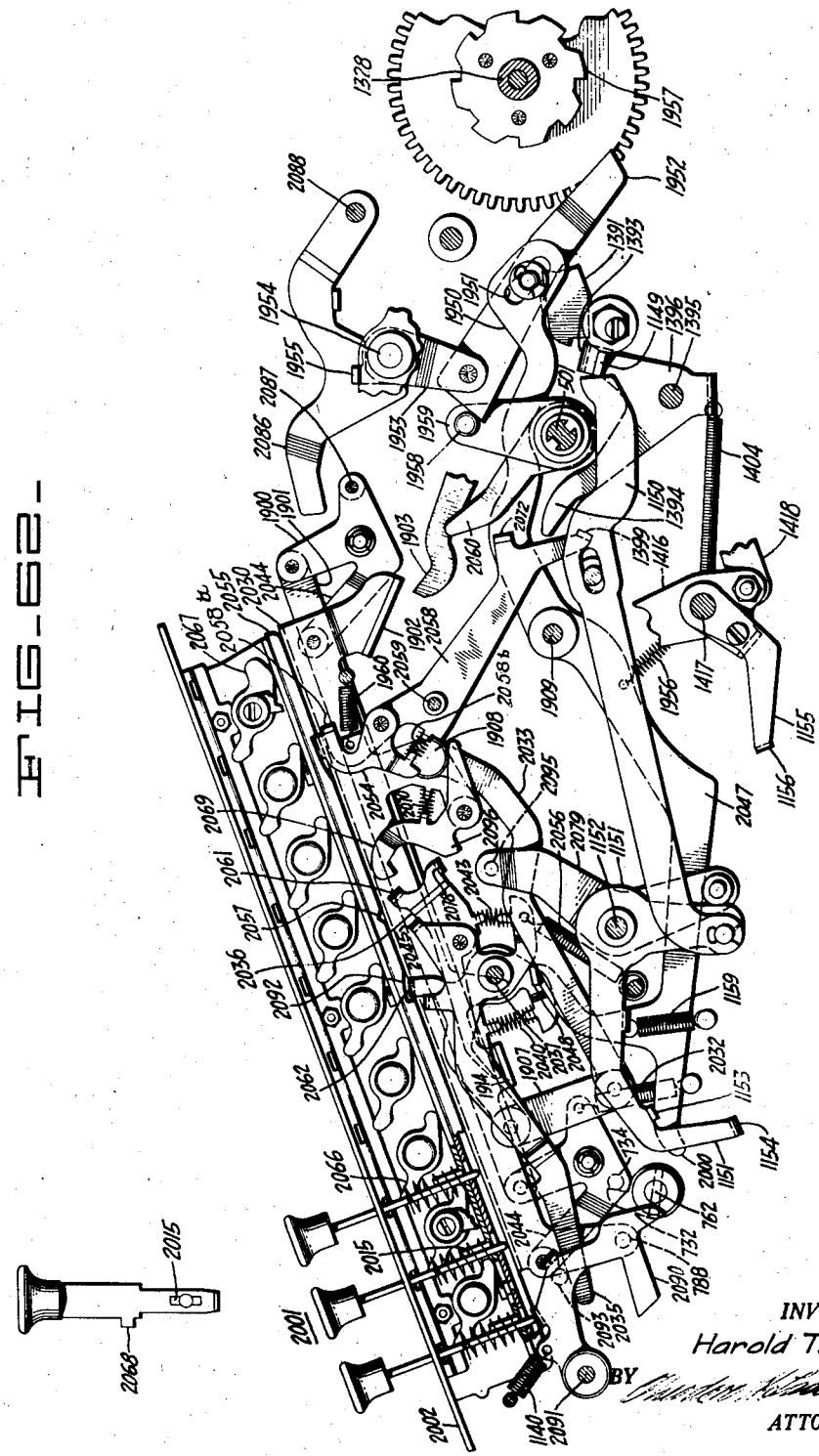

Jan. 27, 1942.    H. T. AVERY    2,271,240
CALCULATING MACHINE
Filed June 12, 1936    37 Sheets-Sheet 24
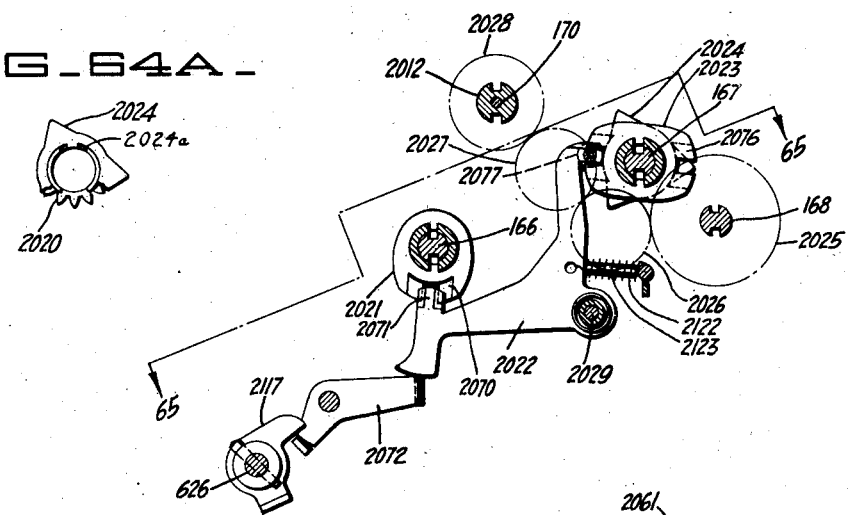
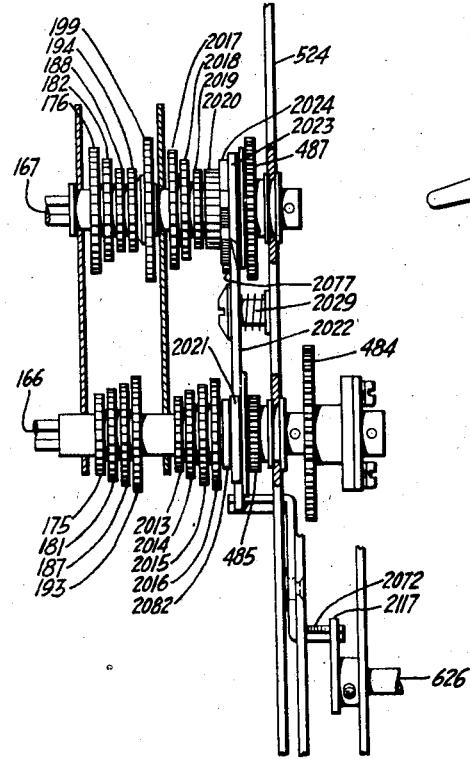
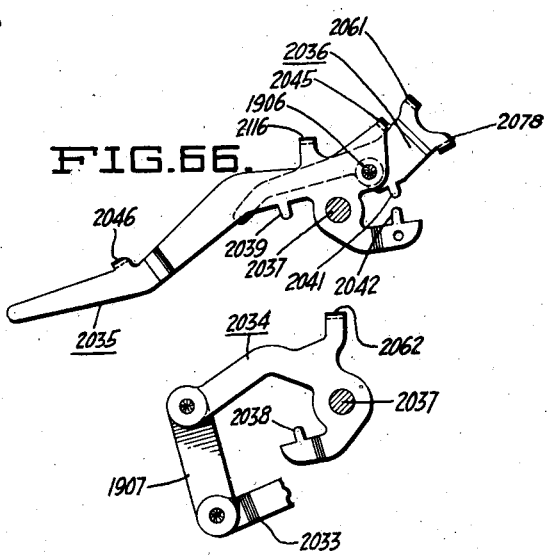
INVENTOR.
Harold T. Avery
BY
ATTORNEY Jan. 27, 1942.   H. T. AVERY   2,271,240
CALCULATING MACHINE
Filed June 12, 1936   37 Sheets-Sheet 25
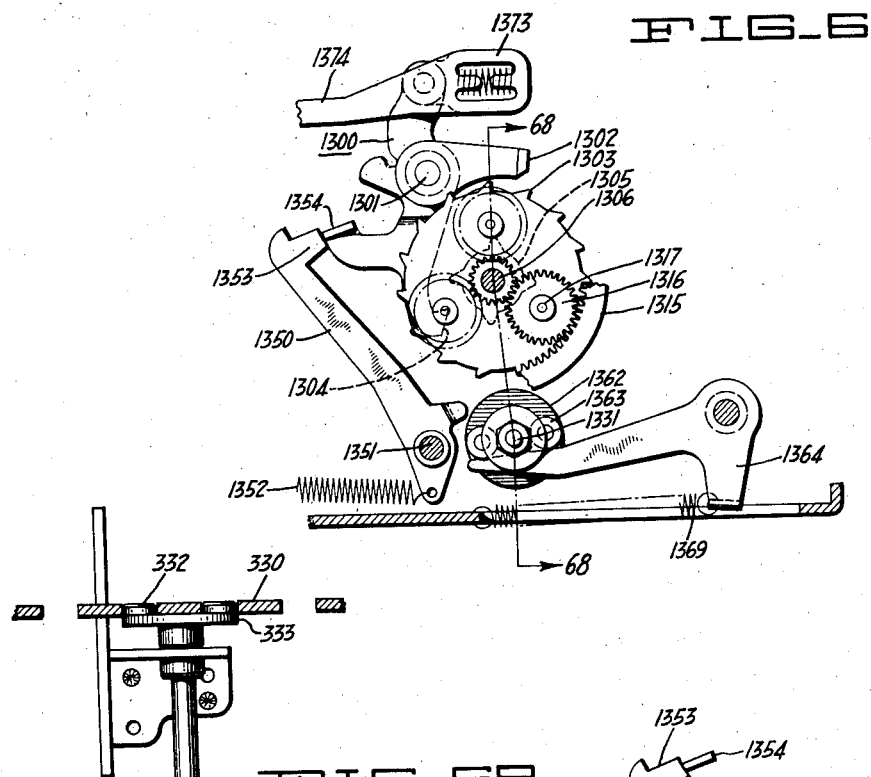
FIG-67-
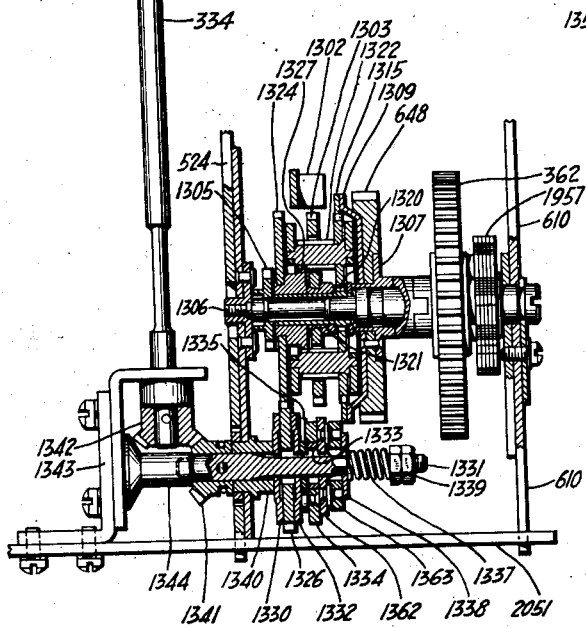
FIG-68-
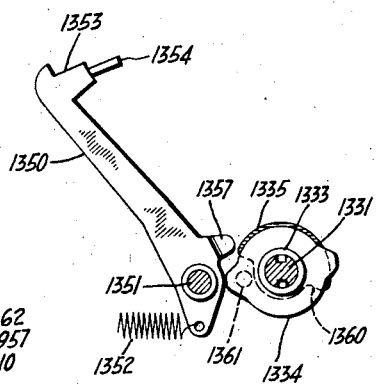
FIG-69-
INVENTOR.
Harold T. Avery
BY
ATTORNEY

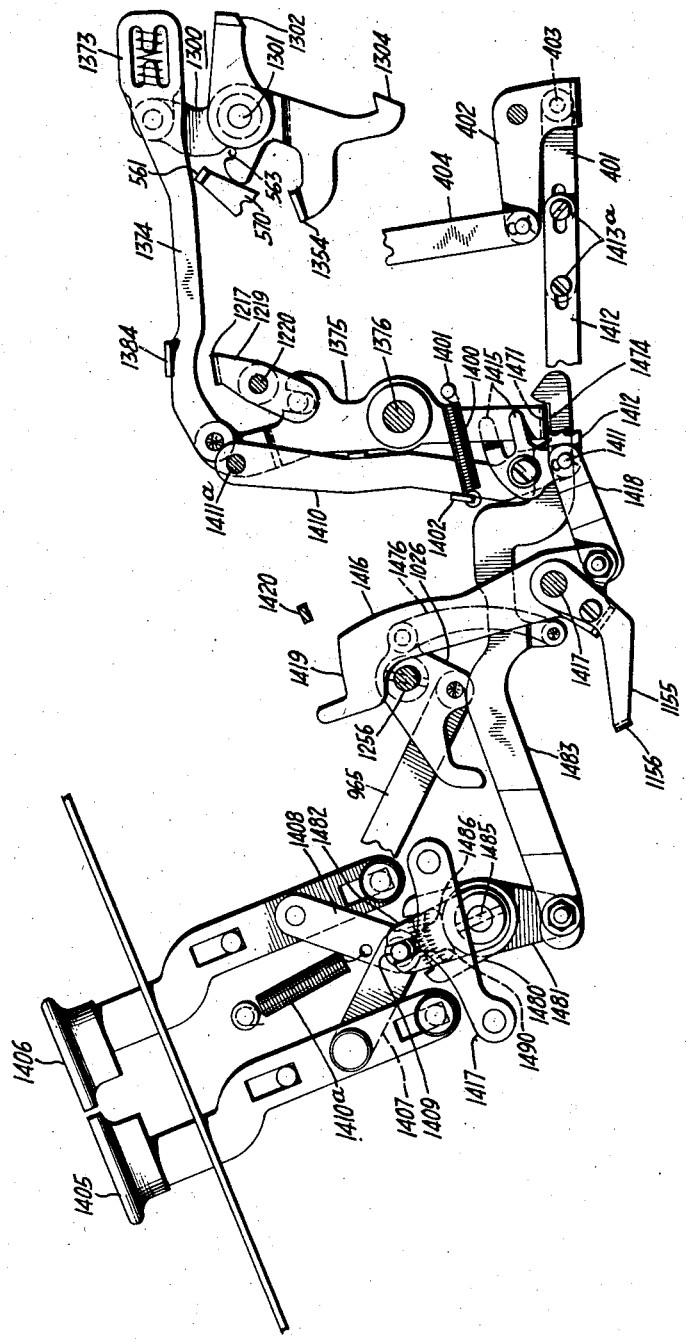

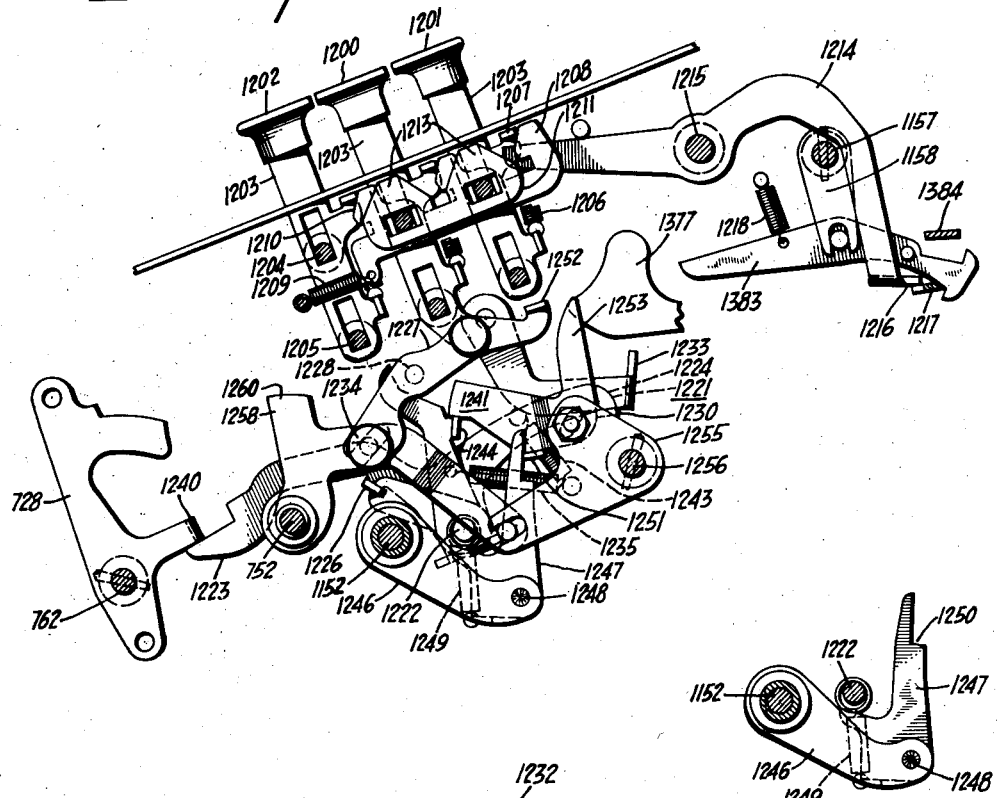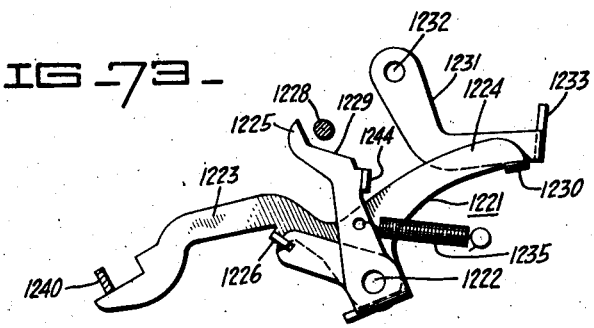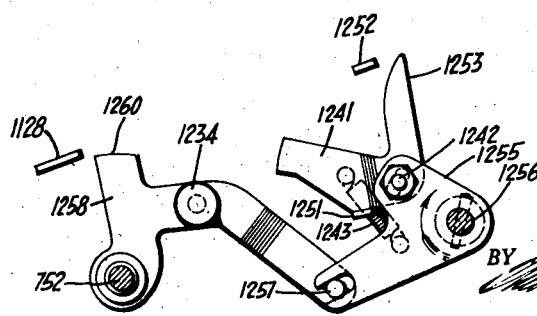

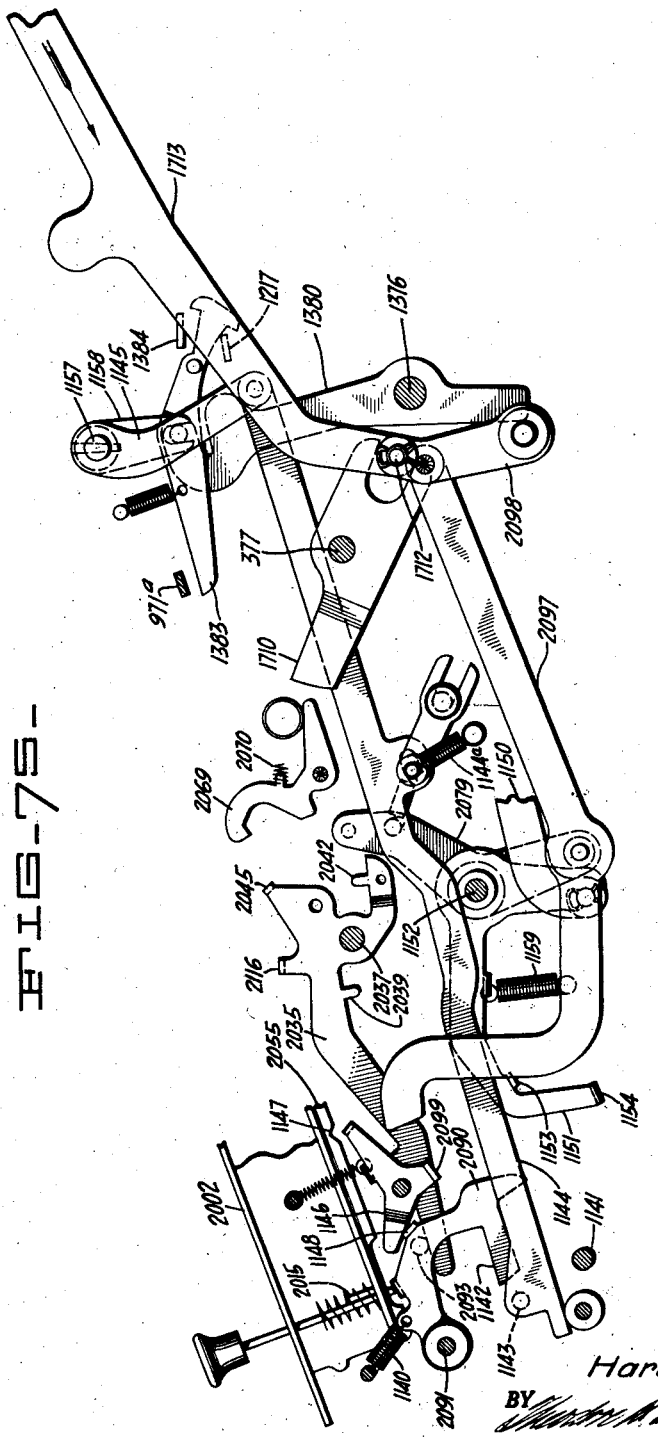

Jan. 27, 1942. H. T. AVERY 2,271,240
CALCULATING MACHINE
Filed June 12, 1936 37 Sheets-Sheet 29
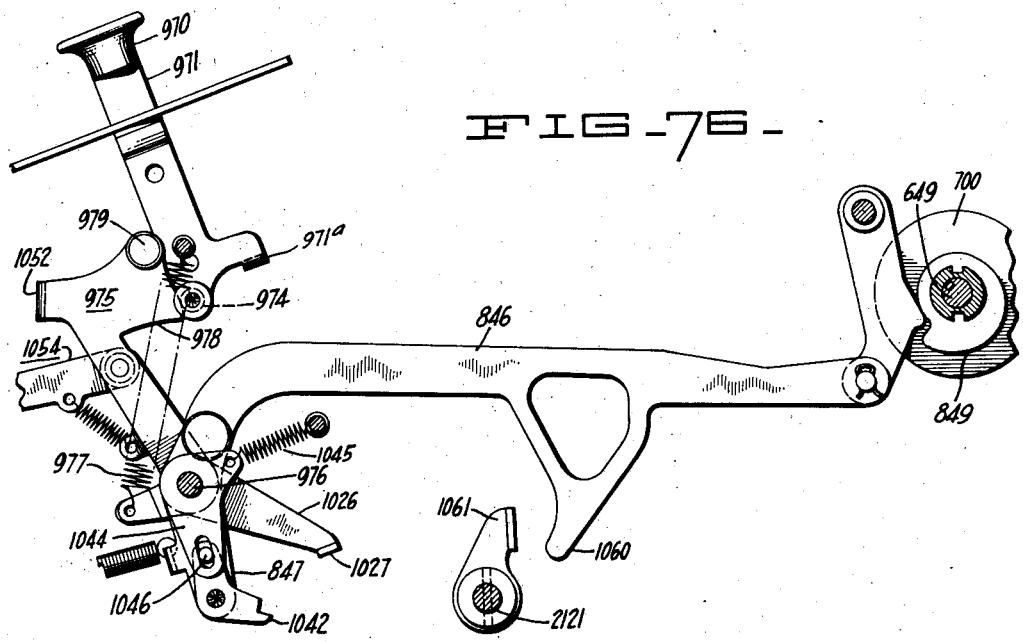
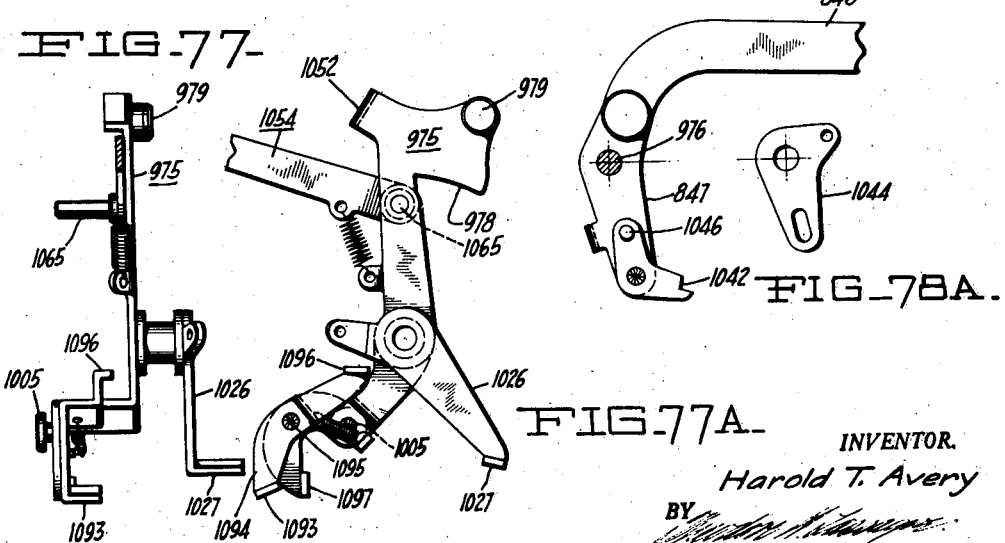
INVENTOR.
Harold T. Avery
BY
ATTORNEY

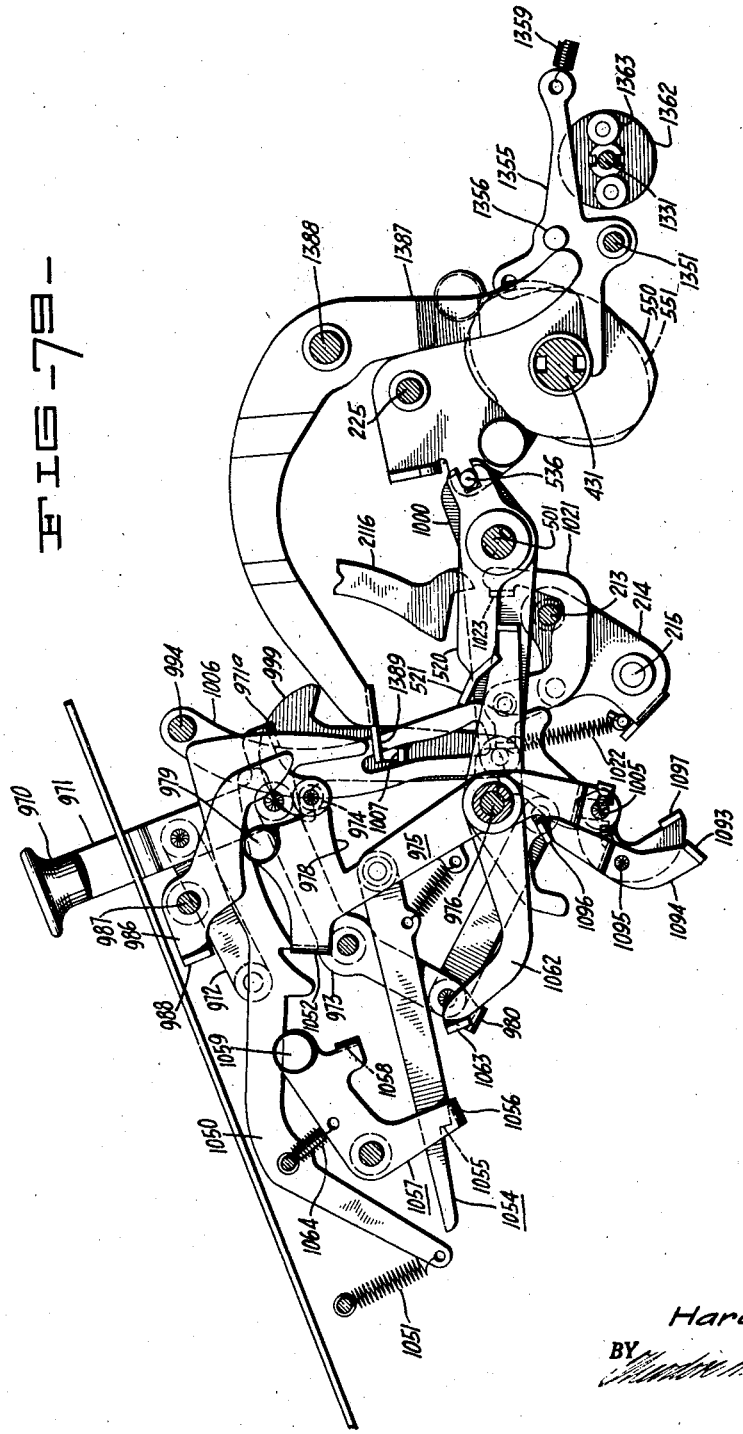

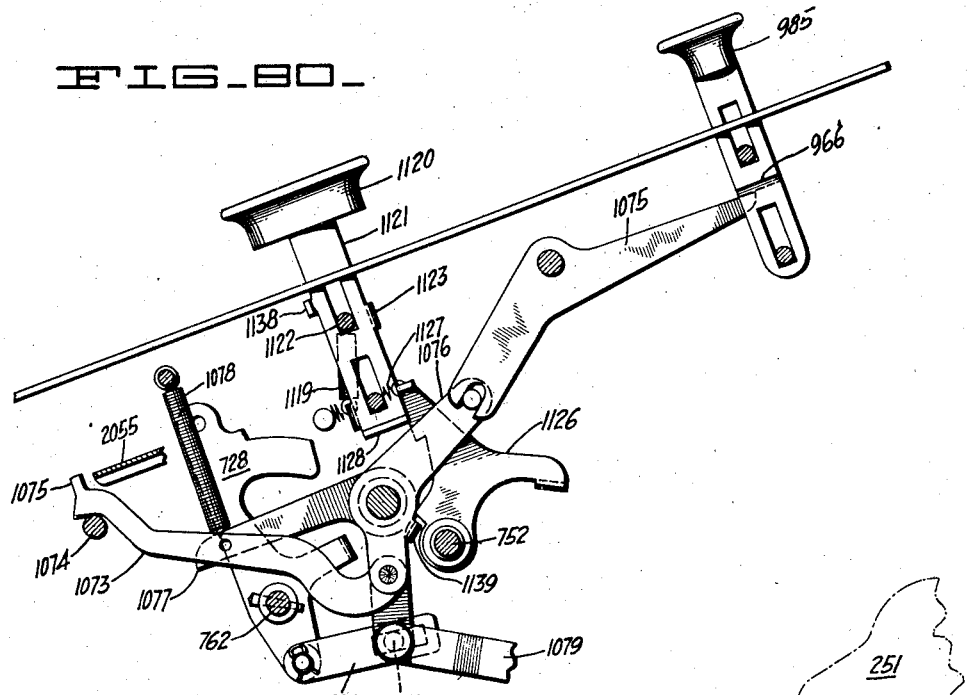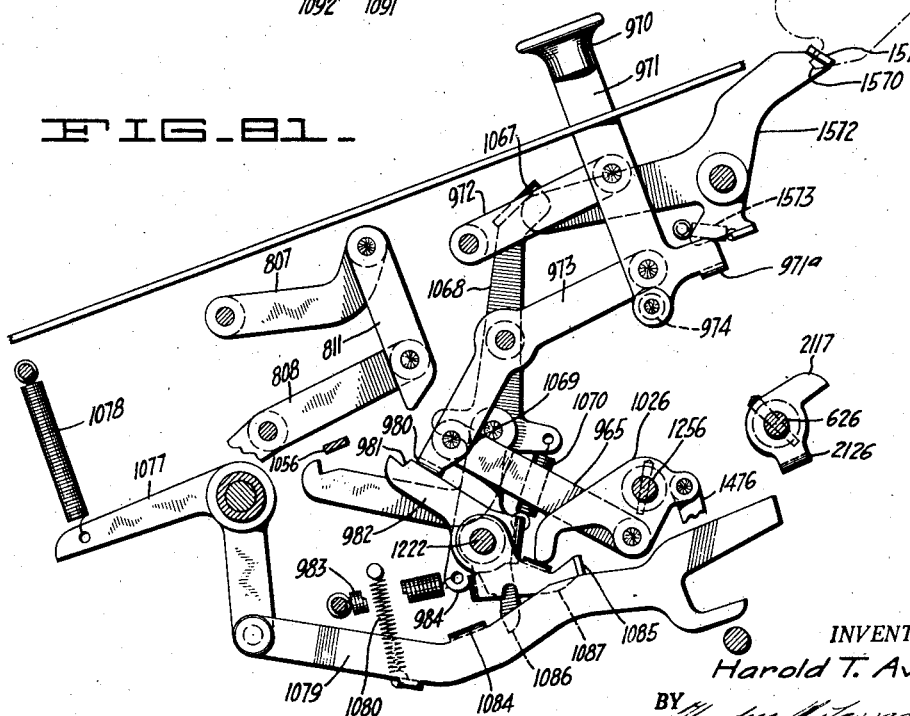

Jan. 27, 1942.          H. T. AVERY                2,271,240
                   CALCULATING MACHINE
               Filed June 12, 1936        37 Sheets-Sheet 32
FIG_82_
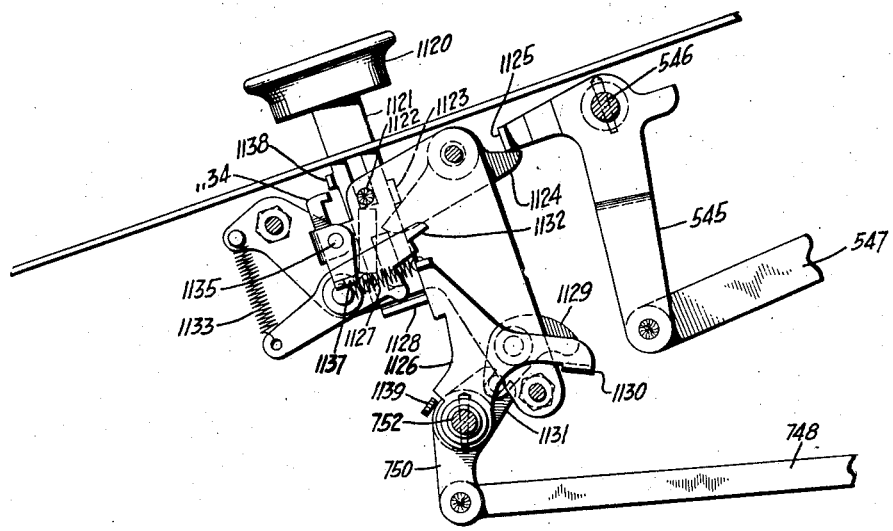
FIG_83_
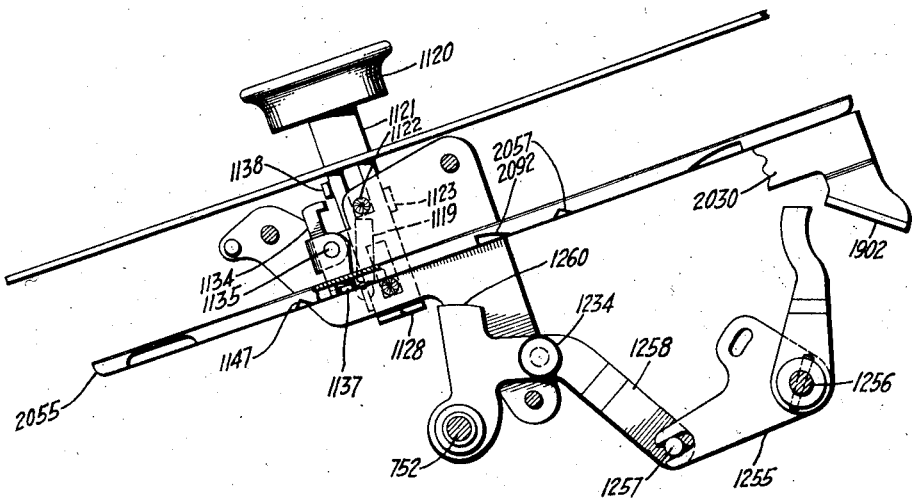
INVENTOR.
Harold T. Avery
BY
       ATTORNEY.

Jan. 27, 1942.  H. T. AVERY  2,271,240
CALCULATING MACHINE
Filed June 12, 1936  37 Sheets-Sheet 33
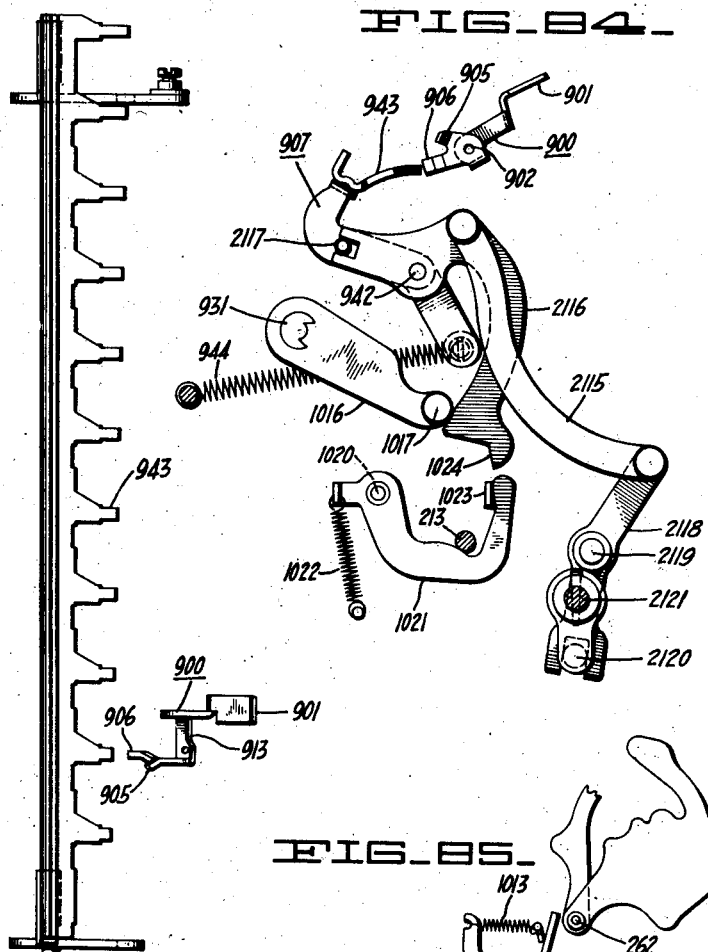
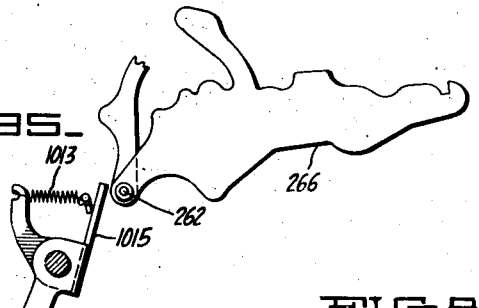
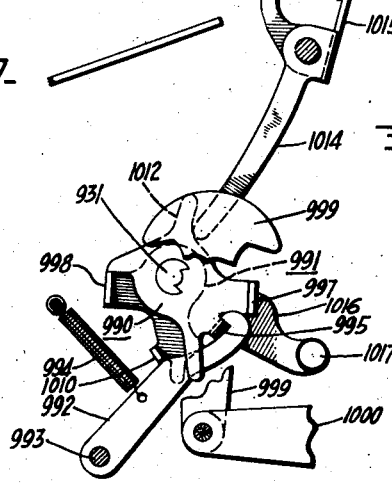
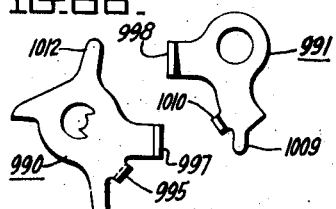
INVENTOR.
Harold T. Avery
BY
ATTORNEY Jan. 27, 1942.  H. T. AVERY  2,271,240
CALCULATING MACHINE
Filed June 12, 1936  37 Sheets-Sheet 34
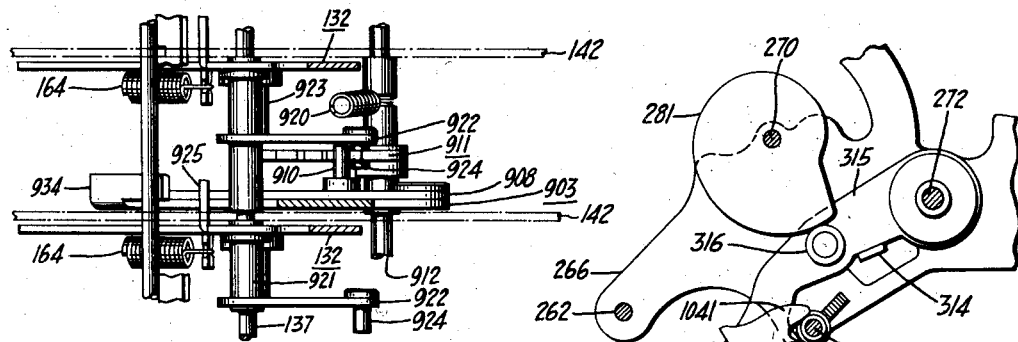
FIG_88_  FIG_89_
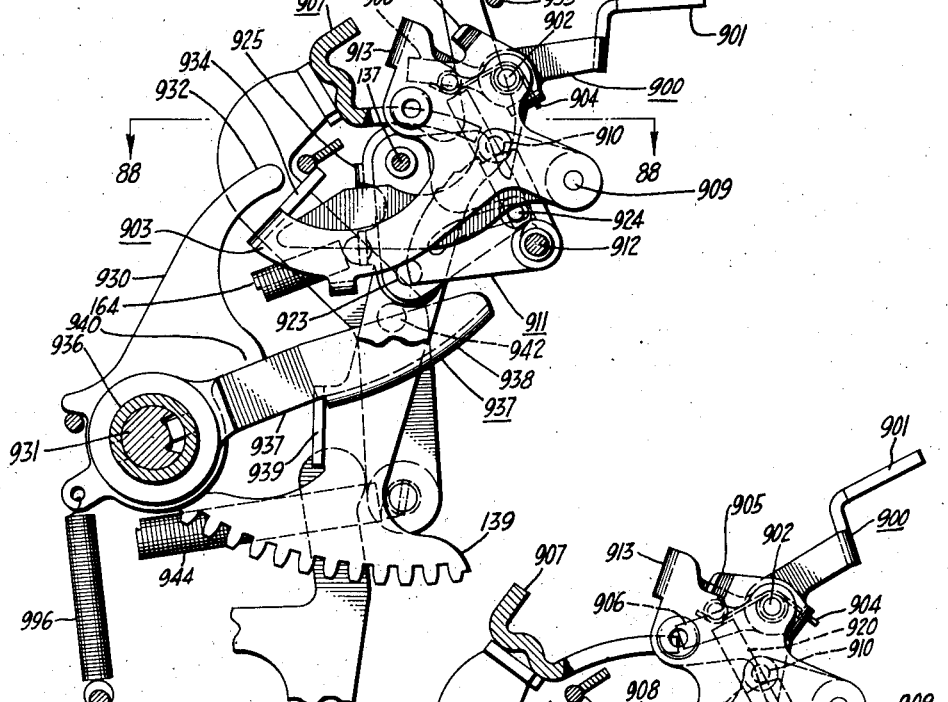
FIG_90_
INVENTOR.
Harold T. Avery
BY
ATTORNEY Jan. 27, 1942.	H. T. AVERY	2,271,240
CALCULATING MACHINE
Filed June 12, 1936	37 Sheets-Sheet 35
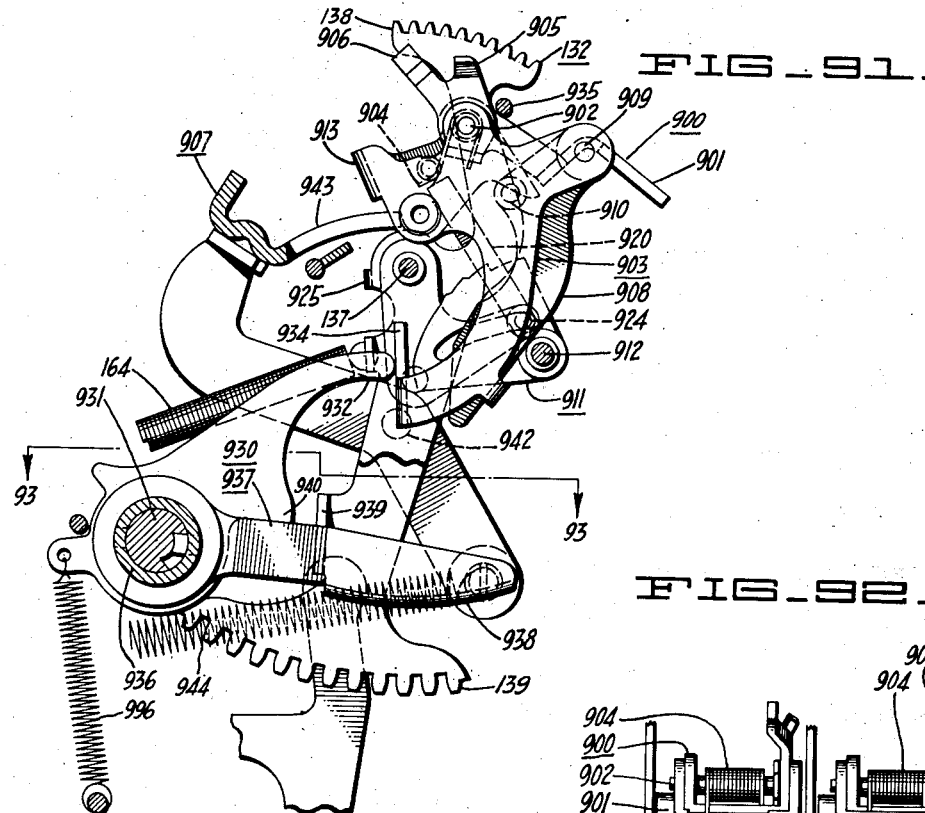
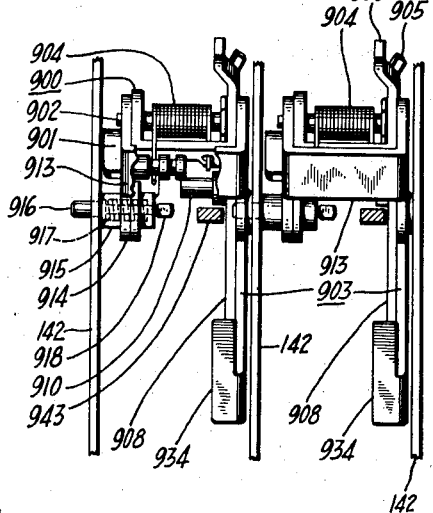
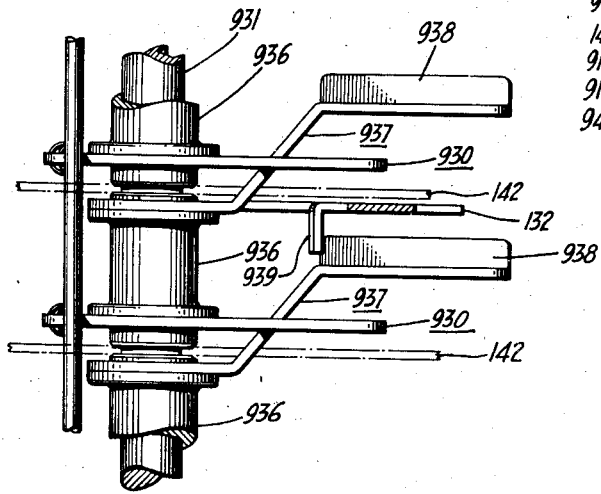
INVENTOR.
Harold T. Avery
BY
ATTORNEY Jan. 27, 1942.        H. T. AVERY        2,271,240
                   CALCULATING MACHINE
                   Filed June 12, 1936        37 Sheets-Sheet 36
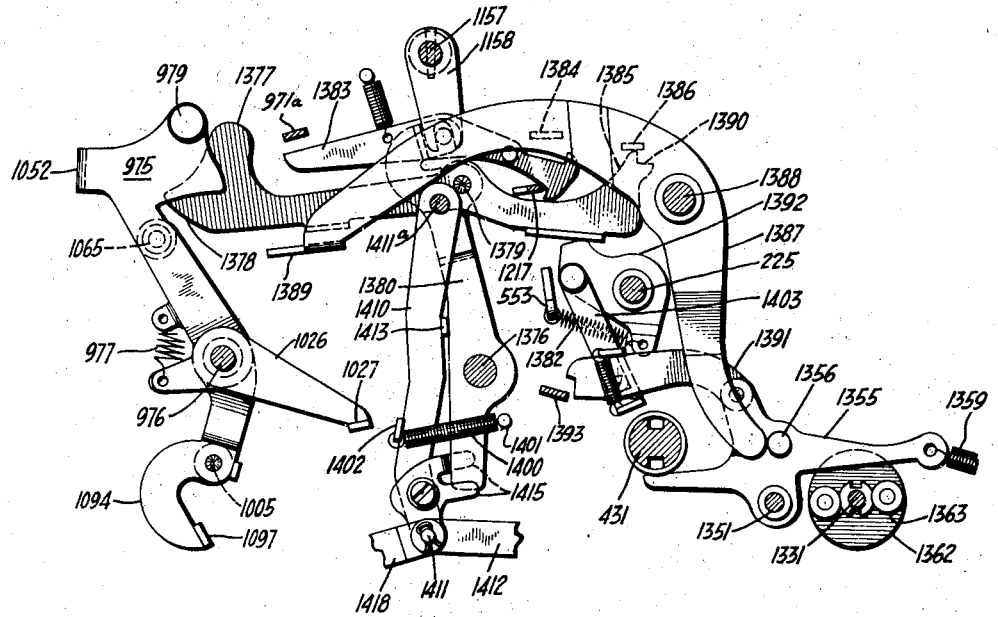
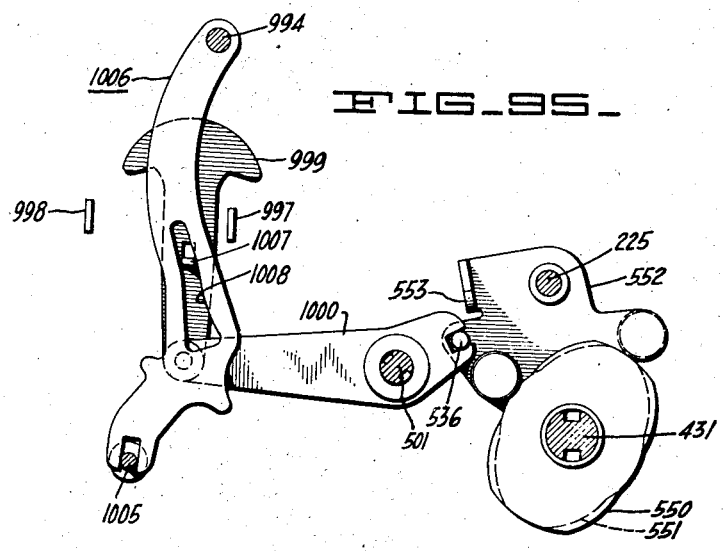
INVENTOR.
Harold T. Avery
BY
ATTORNEY Jan. 27, 1942.   H. T. AVERY   2,271,240
CALCULATING MACHINE
Filed June 12, 1936   37 Sheets-Sheet 37
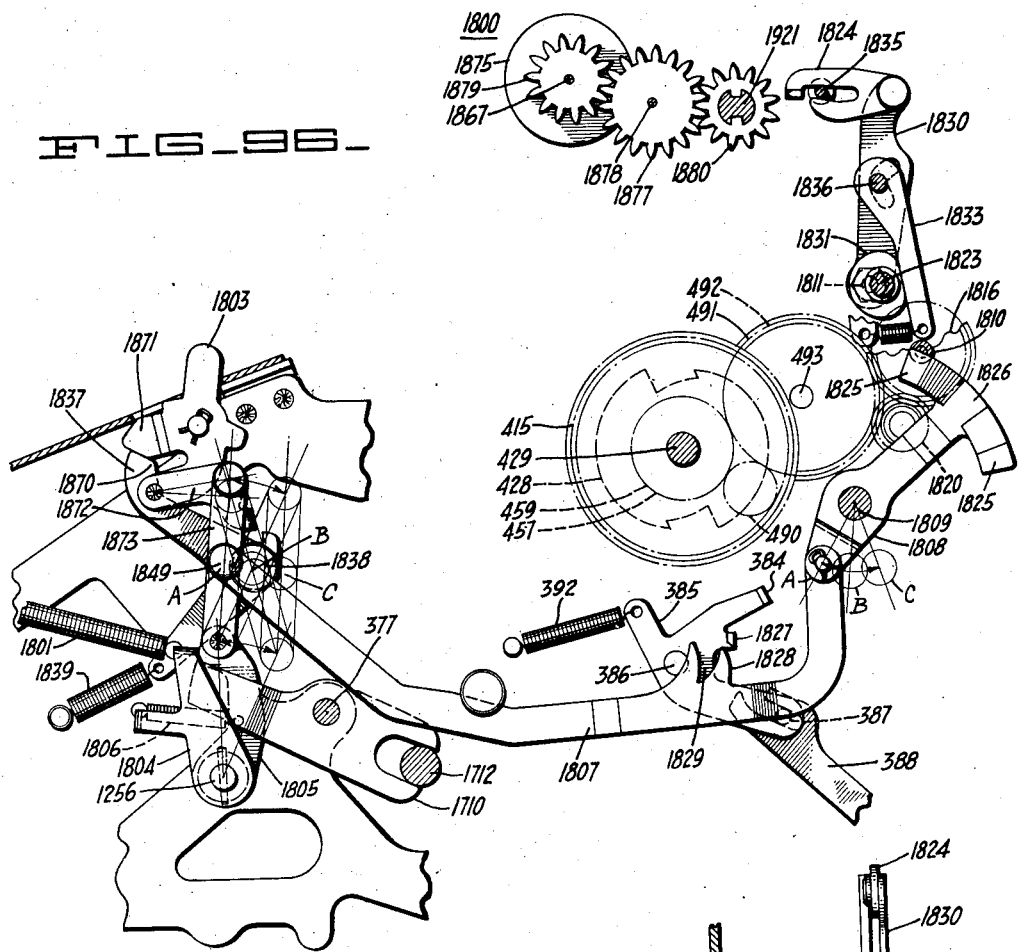
FIG_96_
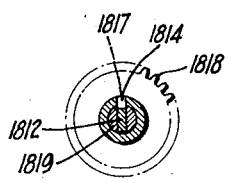
FIG_98_
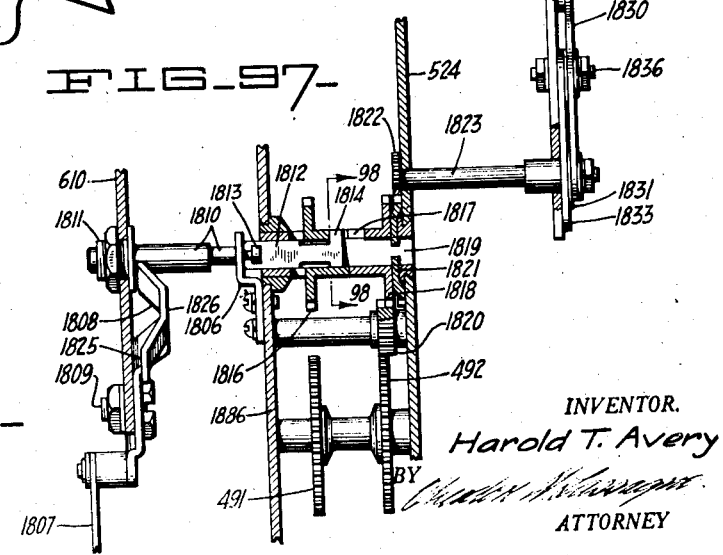
FIG_97_
INVENTOR.
Harold T. Avery
BY
ATTORNEY Patented Jan. 27, 1942

2,271,240

UNITED STATES PATENT OFFICE 2,271,240

CALCULATING MACHINE

Harold T. Avery, Oakland, Calif., assignor to Marchant Calculating Machine Company, a corporation of California Application June 12, 1936, Serial No. 84,927

8 Claims. (Cl. 235—62)

The present invention relates to calculating machines and has as its general object the provision of improvements in a high speed, quietly operating machine of the rotary type such as that disclosed in the co-pending application of Avery entitled "Calculating machines," filed December 18, 1933, Serial Number 702,949, and since matured into Patent Number 2,211,736, issued August 13, 1940, of which this case is a continuation in part.

While the rotary type machine has always had certain obvious advantages over other types, most rotary machines commercially produced have operated their registering mechanisms intermittently, giving rise to overthrowing thereof at high speeds, and in attempting to prevent such errors, noisy spring pressed pawling mechanisms have been incorporated.

The present machine overcomes such disadvantages by retaining the registering mechanism constantly in mesh with its actuators throughout the period of operation of such actuators. Since both the actuators and the registering mechanism are arrested before such engagement is broken, no auxiliary overthrow preventing devices are necessary and the noise incident to the operation of such devices is avoided. At the same time, the speed of such a machine can be much higher than that of a machine depending for accuracy upon the proper functioning of such auxiliary devices.

The provision of automatic multiplication and other controls for a machine of this type, however, presents unique problems which the present invention has overcome as fully set forth hereinafter.

The general object of the present invention is to facilitate performance of a multiplication operation in a calculating machine.

Another object is to make possible the effective depression of a multiplier selection and initiating key before operation of the machine under control of a previously depressed multiplier selection and initiating key is completed, but without the provision of complex mechanism for "storing" an entire series of multiplier digits.

Another object is to enable a multiplication control mechanism to operate additively or subtractively.

Another object is to reduce the amount of finger pressure required to depress a multiplier control key.

Another object is to require full depression of a multiplier key in order to initiate operation under the control thereof.

A further object is to adapt a multiplier control mechanism for controlling multicyclic actuation for use in conjunction with monocyclic actuation control mechanism.

Other objects will appear during the following detailed description of a preferred form of the invention, reference being had to the accompanying drawings forming a part of this specification, in which:

Figure 1 is a plan view of the machine of the present invention, showing the keyboard, carriage, and the several controls.

Figure 2 is a section in side elevation, illustrating the keyboard for selecting a value and a portion of the actuator mechanism.

Figure 3 is a section taken along the line 3—3 in Figure 2, showing the typical construction and mounting of a key.

Figure 4 is a sectional detail of a keyboard check dial.

Figure 5 is a section taken generally along the line 5—5 in Figure 2, illustrating the arrangement of the keyboard and the actuator mechanism.

Figure 6 is an end elevation of a selection cam unit.

Figure 7 is a section taken along the line 7—7 in Figure 6, showing the construction of the cam unit.

Figures 8 to 8D, inclusive, are diagrammatic views illustrating the positions of the various cams during a zero selection, and the relationship between the cams and the several sensing levers therefor.

Figure 9 is a diagrammatic view to illustrate the relationship existing between various surfaces on the cam unit.

Figures 10 to 14 inclusive, are vertical sections taken at different points through the selection unit of a single keyboard order, each section illustrating the arrangement typical for selecting two of the several values which may be set up in the said order.

Figure 15 is a section along the line 15—15 of Figure 14, showing, in section, the assembled plates disclosed in connection with Figures 10 to 14, inclusive.

Figure 16 is a front elevation of the carriage, a portion of the cover plate being broken away to show the accumulator and counter mechanisms therein.

Figure 17 is a section on the line 17—17 in Figure 16, showing the mechanisms for rocking certain shafts in the carriage.

Figure 18 is a section along the line 18—18 in Figure 16.

Figures 19, 21, 22, and 23 are sections taken through the carriage to illustrate the construction of the accumulator and counter mechanisms, the sections being taken so as to bring out the interaction and relationship between certain of the parts.

Figure 20 is a fragmentary view illustrating mechanism utilized in connection with the accumulator and counter registers.

Figure 24 is a front elevation, partly in section, of two connected dial assemblies, illustrating the manner of construction thereof.

Figure 25 is an exploded perspective view of a dial assembly.

Figure 26 is a side elevation of a dial unit.

Figure 27 is a section taken along the line 27—27 of Figure 26.

Figure 28 is a side elevation, partly in section, of mechanism for clearing the accumulator and the counter.

Figure 29 is a rear elevational view of a portion of the power transmission mechanism and its controls.

Figure 30 is a plan view of the main clutch.

Figure 31 is a side elevation of the main clutch.

Figure 32 is a side elevation of the main clutch with the retainer plate and drive gear thereof removed.

Figure 33 is a section taken along the line 33—33 in Figure 32, with the main clutch drive gear and retainer plate shown in place.

Figure 34 is a side elevation of the reverse unit and its controlling mechanism.

Figures 35, 35A, and 35B are detail views of elements of the reverse unit.

Figure 36 is a longitudinal section taken through the reverse unit.

Figure 37 is a section taken along the line 37—37 in Figure 36.

Figure 38 is a fragmentary end elevation of a reverse unit control member.

Figures 39 and 40 are side elevations of portions of the mechanism for controlling the setting clutch.

Figure 41 is a side elevation of portions of the mechanism for controlling operation of the main clutch.

Figure 42:
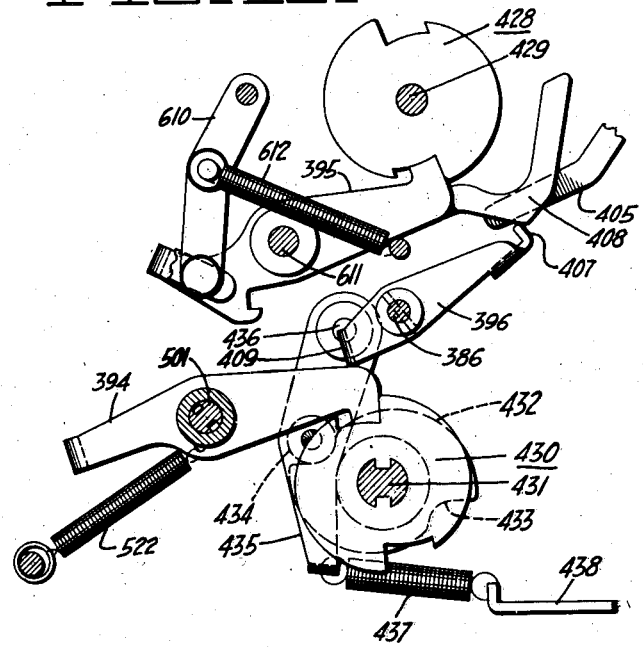

Figure 42 is a side elevation of circuit controls and other mechanism associated with the main clutch and the setting clutch.

Figure 43:
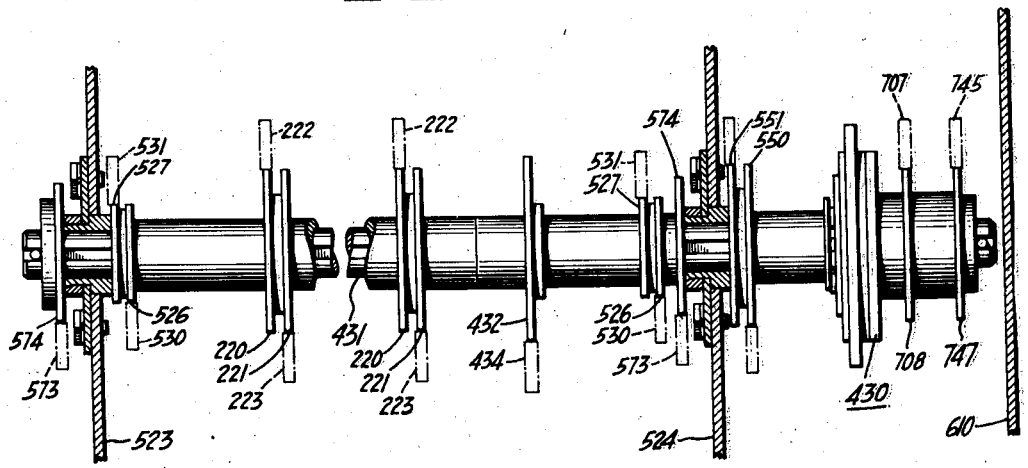

Figure 43 shows the various cams positioned upon the setting clutch shaft.

Figure 44:
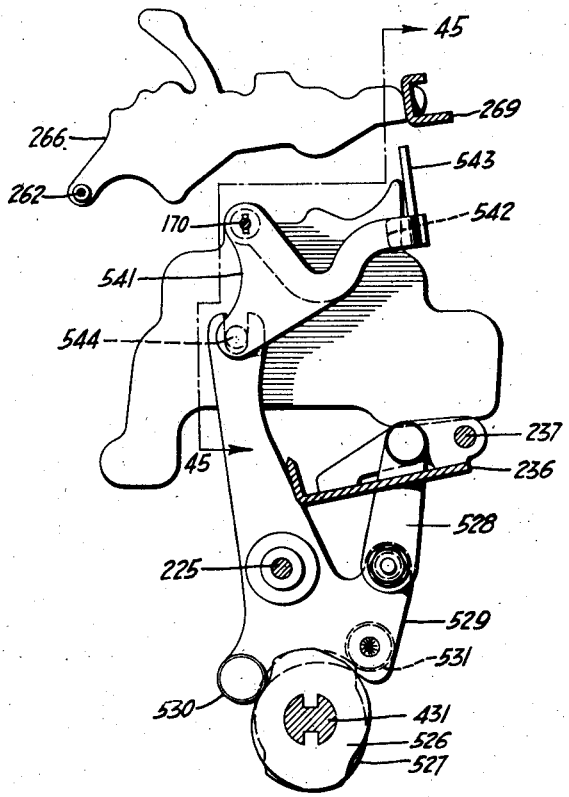

Figure 44 is a view illustrating mechanism for insuring proper alignment of the dipping carriage during calculation.

Figure 45:
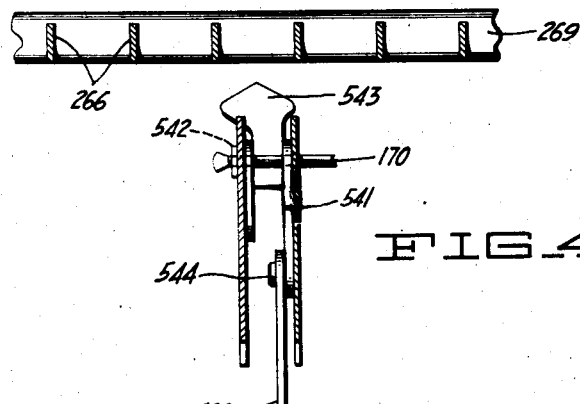

Figure 45 is a front elevation showing the centralizing means for the dipping carriage.

Figures 46 and 47 are side elevations, partly in section, illustrating the carriage dipping mechanism and certain controls therefor.

Figure 48 illustrates details of the mechanism utilized to control release of the carriage from dipped position.

Figure 49 is a detail view showing the restore clutch and mechanism for controlling this clutch.

Figure 50 is a section taken on the line 50—50 in Figure 49, illustrating the construction of the spring link.

Figure 51 is a detail view which illustrates the mechanism for centralizing the half speed shaft in the actuator.

Figure 52 is a schematic view showing the various units insofar as their relationship to the driving means therefor is concerned.

Figure 53 is a detail view which shows the construction of the supports for the addition and subtraction bars.

Figure 54 is a detail view which shows the mechanism operated by the addition and subtraction bars, as do Figures 55 and 56.

Figure 57 is a detail view which illustrates the mechanism for clearing the selection keyboard by depression of the clear key, as well as mechanism for clearing the keyboard automatically.

Figure 58 is a side elevation illustrating the mechanism for determining single or plural cycle operation, selectively.

Figure 59 is a vertical section through the multiplier unit, illustrating the manner in which selection may be made of a multiplier value.

Figure 60 is a detail view of the selection segment illustrated in Figure 59.

Figure 61 is a section taken on line 61—61 of Figure 59.

Figure 62 is a vertical sectional view of the multiplier unit.

Figure 63 is a detail view of one of the multiplier keys illustrated in Figure 62.

Figure 64 is a sectional detail showing mechanism for automatically controlling the termination of a multiplication operation.

Figure 64A is a detail of the lost-motion connection between gear 2020 and cam 2024.

Figure 65 is a section taken on the line 65—65 in Figure 64.

Figures 66 and 66A illustrate details of the construction of certain levers illustrated in Figure 62.

Figure 67 is a sectional side elevation showing certain of the mechanism utilized for effecting a power shift of the carriage.

Figure 68 is a sectional view taken in part along the line 68—68 in Figure 67, showing the construction of the shift unit and its connection to the carriage.

Figure 69 illustrates details of the control mechanisms for the shift.

Figure 70 is a sectional side elevation which illustrates the mechanism utilized in connection with the manually controlled shift keys.

Figure 71 is a vertical section illustrating the keys controlling direction of automatic and zero multiplier key shift, and also the non-shift key and mechanism employed in disabling the automatic shift.

Figures 72, 73, and 74 are detail views of the mechanism illustrated in Figure 71.

Figure 75 is a fragmentary vertical section, illustrating the zero multiplier key and the carriage shift control mechanism associated therewith.

Figure 76 is a detail view illustrating certain of the mechanism controlled by the addition and subtraction bars, as well as control of the division control member by the division key and the relation to the restore clutch mechanism.

Figures 77, 77A, 78 and 78A are fragmentary views illustrating in detail certain of the mechanism shown in Figure 76.

Figure 79 is a side elevation showing certain of the division control mechanisms.

Figure 80 is a detail view showing the stop key and the short cut key mechanisms.

Figure 81 is a view which illustrates control devices for terminating automatic division operations.

Figure 82 is a vertical section illustrating the short cut key and its associated mechanism.

Figure 83 is a similar section of the short cut key, but also illustrating the division and multiplication interlock effecting the same.

Figure 84 is a detail view which illustrates the manner of control of the division sensing mechanism and the division gate.

Figure 85 illustrates, in side elevation, mechanism for preventing a shift of the carriage during a division operation, as well as certain mechanisms for operating the shaft which controls the disabling of the division sensing mechanisms.

Figures 86 and 86A are detail views of two members utilized in connection with the rocking of the aforementioned shaft.

Figure 87 is a detail view in plan of the division control bail, commonly known as a gate.

Figure 88 is a plan view illustrating a portion of the division mechanism, particularly the means for transmitting from a lower order to the next higher order, the decimal value of the value set in the lower order.

Figure 89 is a side elevation illustrating the relation of division sensing mechanism to the accumulator mechanism and the manner of control thereof.

Figure 90 is a detail view of elements illustrated in Figure 89, showing them in position with the sensing levers blocking the division control gate.

Figure 91 is a view similar to Figure 89, showing the sensing levers locked out of operative position.

Figure 92 is a detail view in elevation of two of the division sensing units showing the method in which these units are secured between the brace plates.

Figure 93 is a sectional view taken on the line 93—93 of Figure 91.

Figure 94 is a side elevation illustrating division mechanism utilized in connection with control of the shift unit.

Figure 95 is a detail view of the parts used for releasing and restoring of the division sensing and stopping mechanism.

Figure 96 is a view illustrating control of the counter and actuation of the counter.

Figure 97 is an end elevation, partially in section, illustrating driving of the counter and the control of the counter mechanism, including the reversing thereof.

Figure 98 is a sectional view along the line 98—98 of Figure 97.

Manually set selection mechanism

The machine of the present invention is of the key set type in which means are provided for first setting one factor of a calculation upon a keyboard or equivalent mechanism, and subsequently operating the machine in a manner indicated by the character and amount of another factor of the calculation.

The mechanism for setting up the first factor may be considered as comprising a manually operated and a power operated portion, the manually operated portion being designed to be moved to a selected controlling position by the depression of keys or the setting of equivalent mechanism, and the power operated portion being designed to be brought into operation immediately prior to the operation of the calculating mechanism and to act under the control of the manually set mechanism to move elements of the calculating mechanism to the proper position to cause operation thereof to enter the value set up on the keyboard. By such a division of the function of setting the first factor into the machine, the mechanical work done by the keys and hence the resistance to their depression is considerably diminished. Furthermore, the keys can be released and started on their return to the raised position as soon as the power operated portion of the machine acts. This permits very rapid operations, for the keys are returning to position during operation of the calculating mechanism and their return is not delayed until that mechanism has operated fully. Since the keys are not relied upon to hold the calculating mechanism in proper adjustment during a calculation, the first factor of a subsequent calculation may be set up on the keyboard while the first calculation is being performed by the machine, thus speeding up the machine additionally.

In a machine designed for calculation in the decimal system, the keys are preferably arranged, as shown in Figure 1, in a series of banks of ten keys each, the number of banks provided in each machine depending upon the magnitude of the factors with which the machine is designed to deal.

As shown in Figures 2 and 3, each key section comprises the usual number of value keys 100, which are slidably mounted in a channel-shaped key frame 101 and normally maintained in raised position by suitable coil springs 102. The key stems 103 are assembled into the channel frame 101 (see Figure 2) by insertion from the top, the slot in the upper side of the channel member 101 being of sufficient width to pass the projection 104 of the key stem, but the registering slot in the lower side being of lesser width, preventing the key stem from dropping through and being also adapted to contact projection 104 to provide a limiting stop in operation of the mechanism.

After insertion of the key stems, strip 105 is secured in place by means of screws 106, thus blocking a portion of the upper slot and preventing withdrawal of the key stems. Strip 105 also carries a strip 107 of rubber or other resilient material against which projections 104 abut when the key stems 103 are pressed upward by their springs. This serves to diminish the noise ordinarily incident to the release of keys from their latching means and their return to raised position.

Each key section is mounted in the machine between members 108 and 109 which extend between the side plates of the machine. Each end of the channeled key frame 101 is slotted as at 110 (Figure 5) so that the position of the key section may be varied, each key section being secured in the desired position by the screws 111. After the several key sections have been positioned and prior to the placing of shielding plate 112, rockable flat decimal markers 113, suitably journaled between each bank of keys are positioned as shown. A knurled finger piece 114 extends through a cover member 115 so that the flat decimal marker can be rocked to expose either of its sides, the markers being shown in the two different positions in Figure 5 and in Figure 2 in a position occupied while the markers are being turned. As is well known, one side of these markers is colored to correspond with the coloring of the top of channels 101, while their other side is colored to contrast therewith so that by turning selected markers, the keyboard may be set off in any desired manner.

All the key stems are of the same length and each has a cam extrusion 116 which, upon depression of the key, pushes a slotted key locking slide 117, slidably supported on the lower side of channel 101, to the right, as viewed in Figure 2, releasing any other latched down key in the same section. Upon full downward depression of any value key stem, this slide, pressed forward by spring 118, snaps back to initial location and by overlying the upper end of extrusion 116, latches the depressed key.

The leftmost key (Figure 2) in each section, is the zero or clear key, and is provided for the sole purpose of releasing any latched down key in the same section. The stem 103 and extrusion 116 of this key are identical with the other keys of the section, but latching down of the key is prevented by the provision, on the locking slide 117, of a lip 119, the lower edge of which lies below the lowest position assumed by the top of extrusion 116. Hence, while the slide is moved to the right upon depression of this key, the lip 119 prevents it from returning leftward during the depression of the key, and latching of the key cannot be effected.

When a numeral key stands depressed and it is desired to depress a different numeral key in the same section, the first key must be released during the first part of the stroke of the second key in order to avoid interference between the respective key stems in moving the V-slot bar 120. For this reason the lower edges of extrusions 116 normally lie closely adjacent the locking slide 117. However, in order to avoid inadvertent release of keys when the person or clothing of the operator touches the zero keys, the lip 119 of each locking slide, through which it is moved by the associated zero key, is formed away from the cooperating extrusion 116 for a substantial part of its length, as indicated at 121, so that the extrusion does not move the slide until the zero key has moved through about half of its stroke. Since the zero keys do not contact the V-slot bar, this causes no interference.

Besides the individual clear keys for each key section described above, another clear key (shown in Figures 1 and 57) is provided, which, upon depression, will release every depressed key on the entire keyboard. This clear key 122, normally maintained in raised position by spring 123, carries a roller 124 which, upon depression of the key, engages an upwardly extending finger on a bail 125, sometimes referred to as a gate to rock the gate. The gate 125 extends across the full width of the keyboard and is journaled on studs 126 fixed in the frames. This gate is provided with an arm 127 having an angular portion presenting a curved face disposed directly in front of all the key latching slides 117. Whenever said clear key 122 is depressed, the gate will be rocked in a clockwise direction about studs 126, moving all slides 117 to the rear and releasing all latched keys. Under some conditions, the keyboard is cleared automatically by rocking this gate, as will be described hereinafter.

Disposed underneath the value keys "one" to "nine" inclusive, is a differentially settable bar 120 (Figure 2) which is pivotally suspended from the key section frame 101 by means of two parallel links 128 and 129. This bar 120 has nine identical notches 130, each of which has at its bottom a downwardly extending slot 131 adapted to receive the end of a key stem 103. The vertical center lines of the key stems 103 are spaced an equal distance apart. This distance, however, is slightly greater than the spacing between successive slots 131 so that each succeeding slot 131 will be spaced one increment further away from its cooperating key stem. This spacing is proportioned in such a way that depression of a value key will cam the bar 120 to the rear, a number of increments equal to the value represented by the depressed key.

The position of each key section and the relation of bar 120 to the segment member 132 may be adjusted by a screw 133 (Figure 2) locked by nut 135, and engaged by a lug 134 on the channel frame 101. The section can thus be removed and replaced repeatedly without disturbing the adjustment.

Movement of each bar 120 is utilized to set up a mechanical representation of the selected value whereby the calculating mechanism may be accordingly controlled as hereinafter set forth. A swinging segment member 132 is mounted upon a common shaft 137 which supports like members associated with other key banks. This member is provided at opposite ends with arcuate racks 138 and 139, which serve to transmit the movement of the differential bar 120 respectively to a check dial assembly 140 positioned on shaft 141 in alignment with similar dials associated with the other key sections so that the value set up on the entire keyboard may be read on a straight line of dials, and to a cam unit 146 which is positioned by such movement so as to form a mechanical representation of the number set up whereby the calculating mechanism may be accordingly controlled as hereinafter set forth.

As appears in Figure 4, each check dial assembly is positioned between plate members 142 through which shaft 141 extends. A spacer 143 is also mounted upon the shaft to preserve the alignment of the dial assemblies with the sight openings and with the rack 138.

Each selection cam unit 146 (Figures 2, 6, and 7) is composed of a gear 151, five differently shaped cams 152 to 156 inclusive, four spacers 157, and a sleeve 158. To facilitate manufacture of such broad faced cams by stamping, each one of the cams 152 to 156 inclusive is formed of two duplicate members, as appears in Figure 7.

In assembling this unit, the counterbored gear 151 is first slipped on over the sleeve 158 and slipped down against the shoulder 162 thereof. Shield 165, provided to prevent rack 139 from demeshing from gear 151, is then put in place, the cams and spacers are alternately slipped on over the sleeve, and the end of the sleeve is riveted over. The cams and gears are keyed to the sleeve so as to form a unitary structure, one of these units being rotatably mounted in each order of the machine upon the common shaft 159.

Each one of the cams has two high points 160 and two low points 161 on its periphery. The cams are staggered about the sleeve, as appears in Figure 6, and spacers 157 disposed between the various cams, provide suitable clearances for a sensing operation by cooperating feeler arms which, as will be presently described in detail, sense the juxtaposed faces of each cam after it has been positioned by the keys 100.

These cam units 146 are driven through their respective gears 151 forming a portion of each unit (Figure 2), the gear being in mesh with rack 139 on segment 132. The segment 132 and the selection bar 120 are connected by means of a hook and pin connection 163 so that the member is rotated directly about the shaft 137 upon depression of any key. Upon release of a depressed key, the return spring 164 (Figure 2) acts to return cam unit 146 associated therewith, and the check dial, to zero position.

*Power set selection mechanism*

After the setting of the mechanism heretofore described has been completed, and upon manipulation of one of the operating controls, the power operated portion of the selection mechanism is brought into operation prior to operation of the calculating mechanism, and acts, under control of the cam units 146, to move elements of the calculating mechanism to the proper position to condition it for effecting entry of the value set up on the keyboard into the accumulator.

It is an important and distinguishing feature of the present type of machine that throughout the performance of a calculation, the registering elements are continuously driven by the actuating mechanism, the entry of different amounts being effected by selecting mechanism for varying selectively, the rate at which each registering element may thus be driven.

These mechanisms comprise three shafts 166, 167, and 168 (Figures 2 and 5), hereinafter referred to as the half, quarter, and twelfth speed shafts, respectively, and common to all orders of the machine. The shafts are connected to the prime mover through gearing and a cyclic clutch, hereinafter described, so that shaft 166 rotates through 180° for each cycle of operation of the machine, and shaft 167 rotates through 90° for each cycle of operation of the machine, while shaft 168 moves through 30° for each cycle of operation. A series of sleeves 169 (Figures 2, 10, 11, 12, 13, and 15), one for each decimal order, is freely mounted on a common pivot shaft 170 disposed between the shafts 166 and 167, and each sleeve has keyed thereto several spaced gears for transmitting driving movement to the several orders of the registering mechanism, as hereinafter described.

Means are provided for selectively locking each of the several sleeves 169, or connecting each so that it will be driven by shaft 166, shaft 167, or shaft 168 at any of nine different rates with respect to the main clutch, said rates corresponding to the values delineated upon keys 100. Since this mechanism is duplicated in each decimal order of the machine, only one of these orders will be herein described in detail.

Keyed to sleeve 169 (Figure 10) is a gear 171 (see also Figures 2, 5, and 15), and mounted to freely oscillate upon a spacer mounted on said sleeve alongside said gear 171, is a selection plate 172 having rotatably mounted thereon an idler gear 173 and an idler gear 174 meshing with gear 171. Keyed to the half speed shaft 166 in radial alignment with gear 173, is a twelve tooth gear 175, while in radial alignment with gear 173, on its opposite side, is a twenty-tooth gear 176 keyed to the quarter speed shaft 167. Thus, if plate 172 be swung to the right as viewed in Figure 10, gear 173 will be brought into mesh with gear 176, whereupon the 90° rotation of shaft 167 which takes place during each cycle of operation of the machine, will drive the gear 171 five teeth, while if plate 172 be swung to the left, gear 175, upon the 180° rotation of shaft 166, will drive the gear 171 six teeth. By this means either a five or a six selection can be effected.

Also keyed to the sleeve 169 is a second gear 177 (Figures 11 and 15), and mounted for oscillation on a spacer carried by the sleeve alongside this gear is a second selection plate 178 carrying an idler 179 and an idler 180 which, in this case, meshes with the gear 177. Keyed to shaft 166, in radial alignment with idler 179, is a fourteen tooth gear 181, and keyed to shaft 167, in radial alignment with idler 179, is a sixteen tooth gear 182. Thus, when this second selection plate 178 is swung to the right, as viewed in Figure 11, its idler 179 will mesh with the gear 182 and the 90° rotation of shaft 167 in each cycle will serve to drive the gear 177 four teeth, while, when the said plate 178 is swung toward the left, idler 179 will mesh with the gear 181 and the 180° rotation of shaft 166 in each cycle will serve to drive the gear 177 seven teeth. By this means either a seven or a four selection can be effected.

Also keyed upon sleeve 169 is a third gear 183 (Figures 12 and 15), and mounted to oscillate freely upon a spacer carried by the sleeve 169 alongside this gear, is a third selection plate 184 which is a substantial duplicate of the first two above described, and carries idler gears 185 and 186, which latter idler meshes with gear 183. Keyed to shaft 166, in radial alignment with idler 185, is a sixteen tooth gear 187, and keyed to shaft 167 in radial alignment with idler 185, is a twelve tooth gear 188. Thus, when plate 184 is swung to the left, as viewed in Figure 12, its idler 185 will mesh with gear 187 and the 180° rotation of shaft 166 in each cycle will serve to drive the gear 183 through eight teeth, while, when plate 184 is swung toward the right, idler 185 will mesh with gear 188 and the 90° rotation of shaft 167 in each cycle of operation will serve to drive the gear 183 through three teeth. By this means, either an "eight" or a "three" selection may be effected.

Also keyed to sleeve 169 is a broad faced gear 189 (Figures 13 and 15), and freely mounted for oscillation upon a spacer carried by the sleeve 169 on the left side of this gear, is a fourth selection plate 190, a substantial duplicate of those previously described and carrying idlers 191 and 192 which latter idler meshes with gear 189. Keyed to shaft 166 in radial alignment with this idler 191 is an eighteen tooth gear 193, and keyed to shaft 168 to rotate gear 194 which is free on shaft 167 and in radial alignment with this idler 191, is a twenty-four tooth gear 195. Thus, if this idler 191 be swung to the left, as viewed in Figure 2, it will mesh with gear 193 and a 180° rotation of the shaft 166 in each cycle will serve to advance the gear 189 nine teeth, while if the plate 190 be swung toward the right, the idler 191 will mesh with the gear 194 and the 30° rotation of shaft 168 in each cycle, will through the twenty-four tooth gear 195, serve to advance the gear 189 two teeth. By this means either a "nine" or a "two" selection may be effected.

Mounted for oscillation upon shaft 170, immediately to the right of sleeve 169, is a fifth selection plate 196, having rotatably mounted thereon intermeshing idler gears 197 and 198 (Figure 14). Gear 198 is constantly in mesh with gear 189, while gear 197 may mesh with the twenty-four tooth idler gear 199 free on shaft 167 when the plate is swung to the right, as viewed in Figure 14. This gear is driven by twelve tooth gear 200 keyed on shaft 168 so that gear 189 will be rotated a single tooth upon a 30° rotation of gear 200 when the plate 196 is swung rearwardly.

A zero selection is effected by holding gear 189 against rotation. For this purpose, a pawl 201 (Figures 2, 5, and 14) is mounted upon and loosely keyed to the shaft 202, so that, when the plate 196 is swung to the left, the edge of plate 196 will engage tail 203 of the pawl 201 and retain said pawl in engagement with the gear 189 when the shaft 202 is rocked counter-clockwise, as will be described.

This shaft 202 extends across the machine and one pawl 201 is provided in each order. This shaft 202 is rocked counter-clockwise to a limited extent by the carriage dipping mechanism to be presently described, and, when the machine comes to rest and the carriage is raised, the shaft 202 is rocked in a clockwise direction so that the wide keyway in the shaft engages the narrower keys 204 formed on the pawls to hold the pawls in against the gear 189 while the machine is at rest. Where some value other than a zero is selected, the initial rocking of shaft 202 frees these pawls and immediately upon rotation of sleeve 169, each gear 189 rocks its pawl out of the way. However, if a zero is selected in an order, the associated plate 196 engages the tail 203 of the corresponding pawl, as previously explained, and retains the pawl in engagement with the gear 189 even though the shaft 202 has been rocked. By this arrangement, when the selection plate 196 is swung toward the left, as viewed in Figures 2 and 14, the gear 189 is locked and a zero selection is made.

Each of the plates 172, 178, and 184 includes a lug 205 which engages the adjacent plate to prevent one plate from hanging up on an adjacent plate as they swing by each other. One of the five plates of each order is positioned during a selecting operation to select a value or zero, the remaining four plates of the order being held in idle position. The value positions are positions in which the plate-carried gears mesh with gears on shafts 166 or 167, while the intermediate position is that in which no such connection is effected. Thus, by way of example, if a "six" is to be selected, plate 172 will be swung to the left in Figure 10, to engage gear 173 with gear 175, while all the other plates will be positioned in the intermediate positions in which they are shown in Figures 11 to 14 inclusive.

This simultaneous setting of the selection plates is effected by power driven mechanism which senses the cam units 146 hereinbefore mentioned. This mechanism comprises a group of five feeler arms 210 (Figures 2 and 8 to 8D), one for each of the five plates 172, 178, 184, 190, and 196, and pivotally connected thereto at studs 206. Each arm is provided with a sensing nose 211 adapted to be pressed against the associated cam with which it is in radial alignment. These feeler arms 210 are pivotally supported on a common shaft 213 supported by links 214 pivoted on shaft 215 fixed to the frame of the machine, and each feeler arm 210 is connected by a link 216 with a second feeler arm 217 pivotally mounted on a fixed shaft 218 supported in the frame, and provided with a sensing nose 219 adapted to contact the same cam at a point approximately 180° removed from the point at which it is contacted by nose 211. This sensing system is actuated by a plurality of pairs of complementary cams 220 and 221 adapted to be driven by means hereinafter described, and cooperating with rollers 222 and 223 on cam followers 224 pivoted to the frame at 225 and connected by links 226 with shaft 213.

In operation, as cam follower 224 is rocked by these cams, shaft 213 will be advanced toward shaft 218 and each set of sensing noses 211 and 219 will be moved toward the cam unit 146 with which it is in radial alignment. If a nose 211 meets a low point 161 of one of the cams, the opposite nose 219 will meet the opposite high point 160, thereby rocking the connected selection plate into its forward position, as viewed in Figure 2. If, on the other hand, a nose 211 meets a high point 160 of one of the cams, the opposite nose 219 will meet the opposite low point 161 and the selection plate to which arm 210 is attached will be moved into its rearward position, as viewed in Figure 2. If, in the third case, a nose 211 meets only an intermediate portion and does not engage either a high or a low point of a cam, the opposite nose 219 will do likewise, and the connected plate will be positively positioned in central or neutral position in which its idler will be out of mesh with the gears on both shafts 166 and 167.

To accurately position the cam unit 146 before this sensing operation, a pawl 230 (Figure 2) is mounted on shaft 218 and its lower end is urged by spring 231 against pin 232 on link 214. When link 214 is moved, the pawl is thus permitted to engage gear 151, aligning the unit 146 of which the gear forms a part, and holding it against possible displacement during sensing.

The five cams 152 to 156 inclusive, composing each selection cam unit 146, have their respective high and low points so positioned around their peripheries, and are so offset with respect to each other that, if one of the feelers 211 in any order meets either a high or a low point on one of the five cams, the other four feelers 211 in the same order will not meet either a high or a low point on their associated cams. Thus, in each sensing operation, only one of the five selection plates will be rocked either forwardly or rearwardly, the other four of said plates in that order being maintained in their intermediate, central, or neutral position. Thus, the gears carried by each sleeve 169 can be operatively meshed only by a single train with one of the gears carried on either shaft 166 or shaft 167, or else locked by pawl 201. By this means, any selection from "zero" to "nine" inclusive, is effected in each decimal order under the control of keys 100.

In Figures 8 to 8D are shown the five cams 152 to 156 inclusive in position to set up a zero. These cams respectively provide for setting values as follows: Cam 152, values 6 and 5; cam 153, values 7 and 4; cam 154, values 8 and 3; cam 155, values 9 and 2; and cam 156, values 0 and 1. In the setup shown, a zero value will be set up under the control of cam 156, nose 211 moving in to low point 161 and nose 219 engaging high point 160 to move the associated selection plate 196 to the forward position and hold pawl 201 in engagement with gear 189. All other noses engage intermediate cam faces and position the other four plates in neutral position.

It will be noted that if all cams in Figures 8 to 8D were rotated 18° clockwise, which is what would take place upon depression of a No. 1 key, nose 211 would engage a high point 160 on cam 156, nose 219 engaging the opposite low point 161, thus rocking the associated selection plate 196 to the rear engaging the No. 1 selection gear train; while on all other cams in the cam unit the noses 211 and 219 would engage the intermediate height of cam face. Similarly if all cams in Figure 8 were rotated 36° clockwise from the position there shown, which is what would take place on depression of a No. 2 key, nose 211 cooperating with cam 155 would engage a high point thereon, the opposite nose 219 a low point, and the noses cooperating with all other cams engage the intermediate height of cam face, thus rocking plate 190 to the rear to engage the No. 2 selection gear train and bringing all other plates to neutral. Similarly it will be apparent from Figures 8 to 8D how each successive step of angular displacement to the cams will bring the next succeeding selection train into operation.

It is to be noted that high points 160 correspond to the outer circle in Figure 9 and low points 161 to the inner circle, while the intermediate circle corresponds to the cam body. When the noses 211 and 219 are brought in to engage a cam, the distance they are finally spaced apart is always substantially the same, it being the relative positions of the noses with respect to the center of the cam, or shaft 159, that controls the position of the selection plates. Thus the noses either engage the surfaces represented by the outer and inner circles in Figure 9, corresponding to distance A or the distance B, in which case the associated plate is moved either forward or backward to a value setting position, or both noses engage the surface represented by the intermediate circle, corresponding to distance C, which is a neutral plate position. Distances A, B, and C are equal but are differently arranged with respect to the center of shaft 159 so that as the feeler arms engage these different sets of surfaces they act to swing feeler arm 210 about shaft 213 into one of three definite angular positions. Feeler arm 210, in turn, imparts positive selective movement to its corresponding selection plate, bringing it into one of the three positions it can occupy.

Means are provided for locking the selection plates in the relationship above described, comprising bail 236 sometimes referred to as a lock gate (Figures 2 and 44) extending across all orders in the machine. The gate is pivoted to the frame of the machine at 237 and engages one of three notches 238 in each selection plate to hold said plate against movement in either direction. All the selection plates are engaged simultaneously, the gate being operated by means which will be described in connection with the setting clutch mechanism hereinafter.

Accumulator mechanism

From the foregoing description of the selection mechanism, it is apparent that a number comprising a plurality of figures can be registered upon the several sleeves 169 by differentially driving the gears attached to these sleeves various proportionate distances. However, in order to perform any mathematical computation such as addition, subtraction, multiplication, or division, mechanism must be provided for advancing a superior registering element one extra increment whenever the next lower element has made a complete rotation. This process is known as "carrying the tens," in a machine operating according to the decimal system.

In the present machine this function is accomplished by accumulator mechanism mounted in a carriage 250 (Figures 1 and 16), the main frame of which comprises end plates 251 connected by a formed plate 252 (Figures 17 and 19) having apertures to receive lugs 253 on end plates 251 and secured at its forward end by screws 254 which extend into the end plates (Figure 17).

Mounted at even intervals between the two end plates 251 are a series of carriage brace plates 255 (Figures 16, 19, 21, 22, and 23) having lugs 261 projecting through spaced slots in the top plate 252.

The forward end of plate 252 is notched to interlock with notches in the brace plates 255 and to provide extensions 256 fitting between adjacent brace plates 255 (Figures 22 and 23). This forward end of plate 252 enters the notches in brace plates 255 in such a manner as to support the forward ends of the brace plates. Screws 258 secure ears on some of the brace plates to the top plate 252 (Figure 19). Locked spacing combs 263 (Figures 19 and 21) extend through spaced slots in each brace plate and are locked in place by rods 264, and a retaining comb 265 screwed to the top plate 252 spaces the rear edges of the plates and underlies lugs 265a on said plates, in such a manner as to support the rear ends of the brace plates 255.

Supported by the several brace plates 255, is a cross rod 262 which serves as a pivotal support for a series of plates 266 (Figures 22 and 45), one of which is mounted on said rod 262 adjacent each of the carriage brace plates 255. These plates 266 are spaced and braced adjacent their forward ends by two combs 267 interlocking with slots in each plate 255 and held in place by rods 268, and are connected at their rear ends by a common bail 269 known as the "dipping bail," by means of which the entire body of plates 266 can be simultaneously oscillated above shaft 262 during operations hereinafter described (see also Figure 45), in which description the mechanism supported by said plates 266 is referred to as the "dipping carriage."

The units of the accumulator are assembled on a shaft 270 supported by plates 266, there being one of such plates 266 between each adjacent unit. Each unit is adapted to be driven by one of the actuator gear units (Figures 2 and 15) with which intermediate gears 271 (see also Figure 19), rotatably mounted on shaft 272 and entrained with the gears 273 of the several accumulator units, may be meshed by lowering the dipping carriage, as hereinafter described. Suitable clearances are provided on the several plates 266 to permit the necessary connections between the orders of the accumulator for effecting tens transfer or carry operation.

Referring more particularly to Figures 24 and 25, it will be noted that each accumulator unit comprises a spider 274 which is rigidly secured to a sleeve 275 on shaft 270. This spider 274 carries an internal ring gear 276 on its right hand side, which is spot welded or riveted to the offset portion 277 of each of the spider arms. A right angular extension 278 of one of said arms projects toward the right from said spider, slightly beyond the right side face of a thin shell 279 fixed to the spider 274 and the internal gear 276 thereon, and serves as a zero stop in resetting operations described hereafter. The periphery of said shell 279 is sufficiently wide to accommodate the digits ranging from "zero" to "nine," arranged as shown. Integral with the sleeve 275 surrounding said shaft 270 is a sun gear 280 abutting a brace plate 266, and interposed between said sun gear 280 and the spider 274, is a snail cam 281.

The snail cam 281 and spider 274 may be relatively secured to rotate as a unit. It is preferable, however, that there be a certain amount of play in the movement of these elements. For this purpose the snail cam is secured on a sleeve 285 (Figures 24 and 27) which sleeve is mounted for rotation about a cut-away portion of the sun gear 280. A lateral extension 283 of the spider 274 projects through an enlarged aperture 288 to permit limited movement of the cam with respect to the spider. A small wire spring 289 is disposed around sleeve 285 and extends between the projection 283 and a stud 290 on the cam, urging the cam into the position shown in Figure 26. This construction has the advantage that, under certain conditions to be pointed out hereinafter, spring 289 may be temporarily overcome and the cam moved slightly without moving the rest of the functional unit just described.

The elements just described are assembled in a definite timed relation. The ring gear 276 is welded to the spider 274 after being properly located thereon by passing the lug 278 of the spider through a notch formed in the ring gear for its reception. The lug 283 locates the snail cam, and the relative position of the sun gear 280 on its integral sleeve 275 and the ring gear 276 may be found by a suitable assembly jig. Assembly by skilled mechanics is thus made unnecessary and the three units may be secured in their proper relation by riveting over the end of the sleeve 275 where it extends through the spider.

Located immediately to the right of the mechanism just described is a plate 292 fixed to the spur gear 273 which is driven by a gear 189 (Figure 15) through an intermediate gear 271 (Figure 19 and Figure 2) when plates 266 are dipped. These elements are rotatably mounted on a sleeve 293 which in turn is rotatably mounted on a sleeve 294. Plate 292, which includes an apertured ear 295 for use in timing, as will presently appear, is fixed to a plate 296 by studs 297 provided at each end of said plate, and on each of said studs is mounted a planet gear 298 meshing with the ring gear 276 carried by spider 274 and with another sun gear 299 formed integrally with sleeve 293. Thus, the spur gear 273, the plate 292, the planet gears 298, and the ring gear 276, constitute a planetary assembly which rotates about the sun gear 299 and comprises the means by which the numeral bearing shell 279 can be rotated by the actuating mechanism of the machine which drives the gear 271 as hereinafter described. Secured to the right end of the above mentioned sun gear sleeve 293 is a spider 300 carrying an internal gear 301, the spider and gear being provided with four lugs 302 which serve as assembly guides and as stops, as hereinafter described. The spider also includes four apertured ears 303 for use in timing, as will appear.

For the purpose of carrying tens, means are provided for driving the spider 274 and its associated dial shell 279 by means of the spider 274 of the next lower order independently of any movement of gear 273. This means includes the aforementioned internal gear 301 and another unit sub-assembly now to be described. Sleeve 294 which, as previously described, supports the sleeve 293 on shaft 270, is provided with a double arm member 304, one arm 305 of which is apertured, while to the other, 306, is secured a bushing 3061 in which is rotatably mounted stub shaft 307 to which are fixed planet gears 308 and 309. The planet gear 308 meshes with the internal gear 301 on spider 300 while the planet gear 309 meshes with the sun gear 280 of the adjacent lower order. Sleeve 294 includes an integral spacer 310 so that gear 308 is positioned in alignment with ring gear 301 and does not abut the spider 300, and the end of the sleeve is riveted over to secure member 304, thus providing another unit assembly. The central portion of member 304 is equipped with a gear segment 311 meshing with teeth 312 (Figure 23) formed on a lever 313 pivoted to a shaft 272 which is mounted parallel to the shaft 270 in the plates 266. Lever 313 includes an ear 314 extending to the right through plate 266 and engaging a lever 315 which is mounted on shaft 272 (Figure 22) just to the right of plate 266. Lever 315 carries a roller 316 in the same plane as snail cam 281. Lever 313 is urged clockwise (as viewed in Figure 23) by spring 317 so that the roller 316 carried by lever 315 is urged thereby into contact with the adjacent snail cam 281. In the units order the sleeve 293 may be secured directly to the plate 266 adjoining it at the right, inasmuch as there is no lower order from which tens must be carried.

This arrangement of the several accumulator units permits simultaneous digitation, i. e., entry of increments set up on the keyboard, and tens transfer operations, and is therefore of the type known in the art as "duplexing."

In operation, the gear 273 is driven by the actuating mechanism and revolves planetary gears 298 about shaft 270 as a center. Where, as in the units order, the sleeve 293 with its sun gear 299 is fixed, this revolution of gears 298 will, since they are in mesh with sun gear 299, cause them to also rotate about studs 297 and thus drive ring gear 276 ahead in the direction in which gear 273 is being driven. Since ring gear 276 is fixed to the indicia bearing shell 279, this movement will bring a figure opposite the sight opening 318 in the carriage cover indicative of the portion of a rotation given gear 273.

Whenever a given amount is thus entered in any one unit of the accumulator, one-tenth of that amount will be entered in the next higher unit by means of the carrying mechanism, providing member 304 be held in a fixed position, which is accomplished during calculation in a manner hereinafter described. The carrying mechanism which transmits the movement to the higher unit comprises sun gear 280 fixed to spider 274 which drives planetary gears 309 and 308, these, in turn, driving internal gear 301 fixed to sleeve 293 of the next higher unit in a direction opposite to that of spider 274, and, by rotating said sleeve, driving sun gear 299 integral therewith. If gear 273 and studs 297 are stationary, the movement of sun gear 299 rotates ring gear 276 in the direction opposite to that of gear 299 and therefore in the same direction as that of the lower order dial transmitting the carry. If gear 273 is moving to introduce digitation, as previously described, ring gear 276 will move by an amount equal to the resultant of that produced by the rotation of gear 299 and that produced by the rotation of gear 273, the movement of the ring gear, of course, being the resultant of the movement of the sun gear and the displacement of planetary centers. Thus the movement of any higher order dial becomes the resultant of the digitation entry into its own order and the carry movement from the next lower order. The gear ratios are in usual practice, of course, such that the carry movement received by the higher order dial is one-tenth of that of the lower order dial.

In order that this tens-carrying movement may be properly transmitted to all units of the accumulator, it is desirable that digitation gears 273 move only in accordance with values being introduced into the accumulator. To this end means are provided to prevent movement of the gears 273 except as values are being introduced. This means comprises spring pressed pawls 319 (Figure 19), freely mounted on shaft 320, each of which is adapted to engage the associated intermediate gear 271 in each order. As described above, these gears 271 mesh directly with the gears 189 of each accumulator unit and each pawl 319 therefore acts as a retaining means for one of said gears, being released during actuation, as will presently appear.

Thus, from the foregoing description, it is apparent that rotation of a numeral wheel in any order will cause the numeral wheels in the higher orders or to the left thereof, to also rotate a certain amount successively either in additive or subtractive direction, depending upon the direction of rotation of gears 273, while in all the orders of a lower value or to the right of the last order in which digitation takes place, no such fractional values are entered.

By virtue of this continuous gearing between the various orders, the dials are advanced fractions of positions so that the numerals are not in general properly lined up at the sight openings 318 at the completion of the cycle of calculation, and, in order to overcome this condition and render a readable indication of the result, mechanisms have been provided which will turn every numeral wheel to proper alignment with said sight openings directly after an actuation.

The mechanism for attaining this lineup operation of said dials comprises the snail cam 281 which is secured to the left side of each spider 274, and which cooperates with and serves to position the indirectly spring tensioned lever 315 pivoted at 272 (Figure 22). In this figure the snail cam 281 and lever 315 are shown in a position in which the roller 316 on said lever contacts with the point of greatest radius of said snail cam, which condition represents the zero position of its associated dial wheel 279. The contour of said snail cams is proportioned in such a manner that as the dial displays each higher digit up to nine the radius of the cam to the point of roller contact becomes successively smaller until the lowest radius on said cams represents the digit "9" on said numeral wheels. The values increase on the dials as well as on the cams in clockwise direction, so that for addition the dials and cams are rotated in counter-clockwise direction and for subtraction in clockwise direction, when viewing the machine from the right hand side.

Figures 22 and 23 show the snail cam 281, roller lever 315, segment lever 313, and member 304 in the positions they occupy when the dial displays zero. It will be evident that if the dials were displaying a larger digit, roller 316 would contact a shorter radius of cam 281, thereby resulting in roller lever 315 and segment lever 313 standing in position somewhat further clockwise than the positions in which they are shown in Figures 22 and 23. Thus as the size of the digit displayed by any dial increases, the segment lever 313 to the left thereof is advanced successively further clockwise, so that the upwardly extending arm 340 thereof comes successively closer to shaft 339 which is supported in carriage braces 255.

As the accumulator carriage is rocked down about shaft 262 into its lowered position extension 340 engages shaft 339 thereby rocking the segment lever 313 in a counter-clockwise direction as shaft 339 cams its way upward along the rear face of extension 340, terminating in slot 3401 at the upper end of extension 340. In this terminal position segment lever 313 is rocked just slightly further counter-clockwise than the position which it normally occupies when the dial to the right of it registers zero. It will therefore, in this position, permit roller 316 to stand just slightly clear of the maximum radius of cam 281. Thus, if the dials display zero, levers 313 are scarcely displaced by this operation, but if any dial displays a higher digit, its segment is rocked counter-clockwise by an amount substantially proportional to the digit displayed.

As mentioned above, at the completion of the lowering of the accumulator carriage, shaft 339 rests in notches 3401 of segment levers 313, thereby locking said levers against displacement and holding them in a position which allows roller 316 to lie just clear of the highest radius of cam 281.

Under these conditions member 304 is held in a fixed position and planetary pinions 308 and 309 revolve on a fixed center, so that each dial is, in general, advanced to a partial position depending on the digitation it has received and the carry from all orders to the right. For instance, if the resultant value entered is "2,375," the first dial stands between a "2" and a "3" registration, being 0.375 of the way from the "2" to the "3" registration. The next dial stands 0.75 of the way from a "3" to a "4" registration, and the next 0.5 of the way from a "7" to an "8" registration, and the next dial squarely at a "5" registration.

When the calculating is completed and the dipping carriage raised, it is desired to back up each dial by the fractional amount it stands ahead of an even registration to secure a clear registration in the sight openings. To this end, each lever 315 (Figures 22 and 23) is allowed to rock clockwise under the tension of spring 317 until roller 316 rests against snail cam 281 which, with the cam shaped as already described, allows lever 315 to rock clockwise by an amount proportional to the registration on the dial to which the cam is attached. This rocking of each lever 315 rocks each associated member 304 in a counter-clockwise direction, carrying stub shaft 307 forward by an amount proportional to the registration on the dial to the right of it, thus rocking ring gear 301 by a corresponding amount and backing up thereby the next dial to the left by an amount proportional to the registration of the next lower dial, which is the amount by which the dial stood ahead of an even position. The arrangement is therefore such that each increment of carry received from a lower order will be backed out upon completion of the calculation, unless the increcent amounts to an entire position, in which case the high portion of the snail cam standing under the roller prevents such backing out. The result is that when the dipping carriage is raised, each dial is controlled by the snail cam on the next lower order dial so that the proper figure will be squarely lined up to its sight opening.

Only the dial immediately to the right affects the backing up of a dial and the increment of carry in any one dial is not backed out entirely until that in the one immediately to the right is removed.

The carriage is supported in the machine for transverse shifting in either direction by shafts 259 and 260 which slide through suitable bushings (not shown) positioned in side frames on opposite sides of the machine.

The carriage is released for free traverse by rocking comb 330 (Figure 18) on shaft 331 out of engagement with shift mechanism, presently described, including rollers 332 mounted on the disc 333 secured on shaft 334 (Figures 18 and 68). The comb 330 is rocked about shaft 331, upon which it is supported, by means of lever 335 which extends through the cover of the carriage and carries a handle 336. Lever 335 is pulled by spring 337 against a stop 338, so that upon depression, the spring is tensioned and the comb 330 is rocked in a counter-clockwise direction out of engagement with the rollers 332. The connection between the lever 335 and the comb is made by means of an ear 329 on the lever extending into a slot in the comb. In this manner, the carriage can be freed and moved to any desired lateral position. Step by step shift of the carriage is effected by rotation of the shaft 334, each half turn of the shaft effecting one step of carriage movement. In this operation each roller 332 successively engages between the teeth of the comb 330 to advance the carriage an order at a time. Rotation of the shaft 334 in either direction for one or more steps and the control of various operating means, is described hereinafter in detail.

Accumulator clearing mechanism

It may be seen from the foregoing description that if ring gears 301 be locked against movement while segments 313 are rocked, then the teeth 312 will act to rock arms 304 and rotate planetary pinions 308 and 309 by feeding pinions 308 over the teeth of locked ring gears 301. If the gears 271 be now freed from the braking action of pawls 319, the rotation of planetary pinions 309 thus produced, can, since gears 273 are free to rotate, drive gears 280 to rotate spiders 274 and their attached numeral wheels backwardly, toward the position in which their zero digits align with the sight openings 318. If a stopping means be placed in the path of lugs 278 carried on said numeral wheels to prevent them from being driven beyond zero position, the braking pawls 319 may be restored to operative position and lock withdrawn from ring gears 301, leaving the numeral wheels 279 aligned in zero position.

This mode of operation is used to reset the accumulator to zero, by means of any suitable operating device, such as, for instance, that described in the aforesaid application.

General calculations drive

Power for the various operations of the machine is supplied, under the control of the various control keys of the machine, through the main clutch 428, the setting clutch 430, the restore clutch 700, and the presently described shift unit. To drive these units, a motor 640 (Figure 52) is mounted within the frame of the machine, and regulated by a suitable speed governing device. A flexible coupling 642 connects the motor drive shaft 643 to an overload release device, as, for example, adjustable slip clutch 644. A pinion 645, driven by the slip clutch, drives the main clutch 428 through a transmission system including gear 646 carrying gear 647 meshed with gear 362, which is in turn engaged with idler 650, which in turn engages and drives the gear 415 on the main clutch. The main clutch 428, when engaged, results in selective directional driving of the half, quarter, and twelfth speed shafts (see also Figure 2) under the control of the reverse unit which engages either gear 459 or gear 457 with the power drive as will be described hereinafter. Thus, as appears under the description of the reverse unit, gears 459 and 457 are selectively driven through the main reverse unit, to drive the half, quarter, and twelfth speed shafts in either of two directions.

The setting clutch gear 430 is driven by gear 648 on the same shaft with gear 362 in the main clutch train. Gear 362 also drives a gear 361 on shaft 649 upon which is positioned the restore clutch 700. The shaft 649 therefore rotates whenever the motor operates.

Clutch construction

The construction of the main clutch and the setting clutch, previously mentioned, is substantially identical with the exception that while the main clutch 428, shown in Figures 30 to 33 inclusive, has its driven side keyed to a sleeve rotatably mounted on a stationary supporting shaft 429, the setting clutch 430 has its driven side keyed directly to its supporting shaft 431 (Figures 42 and 43). With this difference in mind the structure of the setting clutch can be understood from the following description of the main clutch structure.

The driving side of the clutch comprises an annular gear 415 mounted on an annular laterally extending flange 416 of disc 417, the disc being capable of being driven by the gear, as will presently appear, and the gear being connected to the prime mover through transmission mechanism (see also Figure 52). The driven element of the clutch comprises a wedge disc 418 keyed to a sleeve 419. The flange 416 of disc 417 has three apertures spaced equally about its periphery and having rollers 420 therein, and wedge disc 418 has three cooperating flat areas 421 immediately adjacent the three rollers. Each roller floats between the adjacent flat 421 and the inner periphery of the annular gear 415 and rolls freely when the clutch is not transmitting power.

In operation, when the clutch is not engaged and the motor is in operation, gear 415 is rotated but wedge disc 418 and disc 417 are held against rotation by a clutch dog 395 (Figure 32), which is provided with a nose 422 adapted to enter one of the notches 423 on disc 417 and one of notches 424 in disc 418.

In machines of the character herein considered, speed in operation is important and it is desirable that the clutch engage and transmit power immediately upon operation of dog 395 to release discs 417 and 418.

To accomplish this, the discs 417 and 418 are urged in opposite directions about their rotational axes so that the rollers 420 will jam instantly upon release of the clutch dog and full power will be transmitted to the clutch. A spring 425 is seated at one end on a shouldered pin 426 on the disc 417. The opposite end of the spring 425 seats over a nose 427 formed in a recess of a plate 439 which plate, as illustrated in Figure 31, is secured to the disc 418 by pins 440. Upon release of the clutch dog 395, the spring 425 causes relative rotation of the discs 417 and 418 with consequent jamming of the clutch rollers.

It is to be noted that the described clutch 428 has a normal cycle consisting of half a revolution so that if clutch dog 395 is raised, even for an instant, and then released, the clutch and the elements it drives will make half a revolution before the nose 422 can again engage the notches 423 and 424 to open the clutch, stop and lock the mechanism.

When the clutch engages in the manner previously described, the disc 417 rides a certain angular distance in advance of the driven side of the clutch. When the clutch is to be disengaged, therefore, this disc 417 is stopped by nose 422 of clutch dog 395 before the driven side engages the nose. The momentum of the moving parts and the action of the spring pressed centralizers, serves to advance the driven side from this position, the advance immediately breaking the wedging effect of rollers 420 and declutching the driven side. However, the driven side is thus advanced a slight angular distance, and allows the nose 422 to drop into notch 424 in the driven disc 418, the notch retaining the driven side against rebound and definitely locking it in its full cycle position.

In Figure 42, a centralizer cam 432 is shown on the setting clutch shaft. As appears in said figure, this cam includes two pockets 433 into one of which spring pressed roller 434, carried upon arm 435 is adapted to be pressed. Arm 435 is hinged on pin 436 and is pulled by spring 437 extended betwen the arm and a portion of the frame, to cause the roller 434 to position the cam very definitely.

Setting clutch

The present machine employs a setting clutch and mechanism driven thereby to effect various operations incident to the commencement of a calculation under the power of the motor. In this way the operator is not required to furnish the power requisite to such operations by manipulation of a control key. This improves the accuracy of the operator and quickens operation since the operator is not required to exert as much effort as with a machine requiring heavy pressure to manipulate its keys.

Operation of the setting clutch 430 (Figure 39) is under the control of the machine operator, particularly through the instrumentality of various operation control keys presently described. The control of the clutch 430 is such that, immediately upon depression of one of said keys, the clutch is engaged, clutch dog 394 being raised to release the clutch, start the motor, and permit shaft 431 to be driven. Normally, however, the clutch dog 394, which is supported on shaft 501 and keyed thereto, is held in engagement with the clutch by spring 522.

To permit operation of the setting clutch by any one of the control mechanisms hereinafter described, an operating bar 503 (Figure 39) is provided which is adapted to be directly or indirectly operated by any of them. Bar 503 is supported on the right side of plate 524 by means of levers 504 and 505 pivoted to the plate 524 at 506 and 507, respectively, and to the bar at 508 and 509, respectively, and is normally held in raised position by spring 510, exerting tension on the lower end of lever 504.

So that lowering of the bar 503 may rock the clutch dog 394, a bellcrank 512 is pivoted to the lever 505 at 513, and provided with a notched arm 514 which overlies a lateral extension 515 on clutch dog 394 when the bellcrank is in the position in which it is normally held by a spring 516 tensioned between the other arm of the bellcrank and bar 503.

To limit operation of the setting clutch to a single cycle, since this is all that is required to operate the mechanisms actuated by clutch 430, means are provided for returning the clutch dog 394 to cause disengagement of the clutch after half a revolution of the clutch and shaft 431, even though the control key initiating operation of the clutch 430 is held in depressed position. This includes devices for releasing the clutch dog 394 from hooked arm 514 so that the spring 522 may move the clutch dog to effect disengagement of the clutch 430.

The mechanism for effecting this operation includes the reverse cams 550 and 551 (see also Figure 34) on the setting clutch shaft 431, and the rock plate 552 which is rocked by these cams. A crank 520 (Figure 40) is rockable on shaft 501 and is provided with a lateral projection 521 at its forward end adapted to engage the arm 514 and rock the bellcrank 512 against the tension of spring 516 about pin 513 to release the lateral projection 515 of the clutch dog 394. The opposite end of the crank 521 is bifurcated to embrace a pin 536 on the rock plate 552.

Upon operation of clutch dog 394 by arm 514, the clutch 430 is immediately engaged and shaft 431 is rotated. Cams 550 and 551 thereupon rotate and rock the rock plate 552 which, through the pin 536 thereon and crank 520, effects release of the clutch dog 394 which, under the tension of spring 522, is moved to stop the clutch 430 and the shaft 431 upon completion of half a revolution.

The setting clutch, under the control of the operation control keys of the machine, operates the power set selection and locking system, and effects the dipping of the accumulator carriage. The main clutch, for driving the actuator, is also operated by the setting clutch, the two clutches being interlocked so that another setting clutch operation can not be initiated during operation of the main clutch.

For these purposes, the setting clutch controls the operation of a shaft 431, which, in Figure 43, is shown extended between the left side plate 523 and the center plate 524. Upon this shaft are mounted in succession from left to right, the first dipping mechanism cams, the first set of selection lock gate cams, the several selection setting cams, of which three sets are usually employed, the shaft centralizer cam, another set of selection lock gate cams, the second dipping mechanism cams, the center plate; and, on the other side of the center plate, the main reverse cams, the setting clutch proper, the restore clutch conditioning cam, and the main clutch starting cam, at the end of the shaft.

Selection lock

The setting clutch 430 is effective to operate the previously described locking gate 236 (Figures 2 and 44) which is pivoted to the frame of the machine at 237 and adapted to engage one of the three notches 238 in each selection plate to hold said plates against movement in either direction.

The selection mechanism is thus unlocked to permit the sensing system to operate, and relocked after the sensing system has operated.

The timing of release and locking of selection plates is such that at the beginning of the operation of setting clutch 430, all selection plates are released to permit setting by the sensing system including feeler arms 210 and 217, as previously described. The moment setting is accomplished, due to rotation of shaft 431, and cams 526 and 527 thereon, the locking gate is immediately positioned to lock the plates in the selected position until the beginning of the next setting clutch operation.

The lock gate 236 is moved into position to engage one of the three notches 238 by links 528 (Figures 2 and 44) which extend at opposite ends of gate 236 to the cam followers 529 pivoted on shaft 225 and carrying rollers 530 and 531 which are in engagement with complementary cams 526 and 527, respectively, and effect the requisite movement of lock gate 236 at the correct cyclic times, since the lock gate operates both before and after the previously described sensing system has operated. The cams 526 and 527 constitute a pair, one such pair being mounted upon shaft 431 adjacent the ends of the locking gate 236 (Figure 43). Since the setting clutch controls rotation of the shaft 431, the proper sequence of operation is served, cams 526 and 527 being suitably contoured to this end. The selection lock is also effective to lock a selected multiplier value, as will appear hereinafter.

*Selection sensing*

Operation of the sensing system, which, as previously described, comprises (Figure 2) feeler arms 210 and 217, and selection plates positioned by said arms in accordance with the sensing of the cams in cam unit 146 by feeler arm sensing noses respectively 211 and 219, is effected by complementary cams 220 and 221 on the setting clutch line shaft 431.

The setting clutch 430, immediately upon release, is effective to rotate shaft 431 through half a revolution and early in this cycle releases the locking gate 236. Cams 220 and 221 (Figures 2 and 43) thereupon operate cam follower 224 through rollers 222 and 223, to move link 226 and actuate the feeler arms as hereinbefore described to sense cam unit 146 and position the selection plates in one of the three possible positions in accordance with the setting of said cams. After locking gate 236 has been moved back into locking position by cams 526 and 527, the cams 220 and 221 move the rock lever 224 and its cooperative mechanism to remove the feelers from contact with the sensing cam unit 146. The sensing plates are thus retained against displacement until the beginning of another setting clutch cycle.

*Main reverse unit*

For reversing the direction of drive of the elements driven by the main clutch, particularly the direction of rotation of the half, quarter, and twelfth speed shafts, as well as the drive to the presently described counter actuator, a selectively settable drive reversing unit is provided. This reverse unit 450 (Figures 34 to 38, inclusive) is mounted on the fixed main clutch support shaft 429 and is driven (Figures 30, 33, 34, and 36) from the main clutch by a sleeve 419 rotatable on shaft 429, which sleeve is keyed to the driven side of the clutch and has projections 451 engaging slots 452 in the end of sleeve 453 of the reverse unit.

The unit 450 includes a clutch plate 454 integral with sleeve 453 (Figures 36 and 37) which rotates on the fixed shaft 429. Notched drive discs 455 and 456 are rotatably mounted on sleeve 453 on opposite sides of plate 454 and disc 455 has rigidly secured thereto gears 457 and 458, while disc 456 has a gear 459 fixed thereto.

Driving connection between clutch plate 454, rotated by the main clutch, and either gears 457 and 458 or else gear 459 is secured selectively by effecting a driving connection between the plate and either of the discs 455 and 456. Clutch plate 454 includes three arms 460, 461, and 462. Hinged on opposite sides of arm 460 are a two-armed dog 463 and a member 464. The dog has radially shaped extensions 465 and 466 at each end thereof (Figures 34 and 35), which are cooperatively positioned with respect to notches 467 and 468 respectively in the discs 455 and 456 (Figure 37). When extension 466 is in engagement with notch 467 in disc 455, a driving connection is established between plate 454 and disc 455, while if extension 465 is engaged with the notch 468 in disc 456, a driving connection is established between plate 454 and disc 456.

Selective engagement of notches 467 and 468 by the dog 463 is secured by a reverse unit control member 469 (Figures 34 and 38) adapted to engage either lever 470 or dog 463 (Figure 34). Lever 470 is hinged on arm 461 of the plate 454 and is secured to dog 463 by link 471 connected to opposite arms of the dog 463 and lever 470. The other arm of the dog 463 engages pawl 472 (Figure 34) which is hinged on arm 462 of plate 454. Pawl 472 is urged in a clockwise direction by spring 473 positioned between plate 454 and one end of the pawl. The tail 474 of the pawl overlies the end of dog 463 when the unit is in the position shown in Figure 34 with foot 465 in notch 468. When the unit is in the opposite position and foot 466 is in notch 467, tail 474 of the pawl 472 abuts face 475 on the dog to lock the dog 463, the tension of spring 473 being sufficient to urge the dog into one of the two disc engaging positions.

Since the reverse clutch unit 450 rotates with the main clutch, a half turn constitutes a cycle and the unit always stops with either the ratchet dog 463 or lever 470 over the control unit 469. The arms of both the dog and the lever are formed to cooperate with offset plates 480 and 481 (Figure 38) of the control plate 469, said arms carrying projections or integral lugs 483 (Figures 35 and 35B) to engage the offset plates.

The unit described provides a connection between the main clutch and the half, quarter, and twelfth speed shafts (Figure 52) in the following way. If gears 457 and 458 are driven by plate 454, movement will be transmitted to drive the half speed shaft directly through gear 484 engaging gear 458, in a one to one ratio therewith. The quarter speed shaft is driven off gear 485 on the half speed shaft at a two to one reduction by idler 486 and gear 487 on the quarter speed shaft. The twelfth speed shaft is driven at a three to one reduction by gear 488 on the quarter speed shaft, driving gear 489 on the twelfth speed shaft.

When gear 459 is driven by plate 454, the twelfth, quarter, and half speed shafts are driven in the opposite direction. Instead of gears 457 and 458 being driven directly from the main clutch, a gear train, including idler 490 engaging gear 459, is used. This train includes gear 459, idler 490, gear 491, and gear 492 secured to a common sleeve 493 and driving gear 457, thus rotating gear 458 in the opposite direction.

*Control and operation of main reverse unit*

Subtraction operations are accomplished by reversing the direction of rotation of the half, quarter, and twelfth speed shafts. Means are therefore provided (Figure 34) which may condition the main drive for reverse operation automatically by operation of the setting clutch 430. These include the previously described reverse unit.

A pendular lever 545 is capable of being acted upon by various control means and operating means hereafter described to cause actuation of the reverse unit and change its setting. The pendular lever 545 is hinged on shaft 546, and a reverse unit controlling bar 547 is pivotally connected thereto and supported adjacent its opposite end by a link 548 having a bifurcated end slidable about setting clutch dog shaft 501. The reverse unit control bar 547 has an upturned end 549 underlying the reverse unit control member 469 hinged on shaft 386, so that whenever shaft 431 is rotated by the setting clutch, and cams 550 and 551 rock plate 552, shelf 553 on said plate will engage and raise the reverse control bar 547 to bring the upper face of its upturned end 549 into contact with one or the other of lugs 554 and 555 (Figure 34) on the reverse unit control member 469.

The reverse unit control member 469 includes a portion 556 having a radial slot 557 therein through which shaft 558 extends to limit the swinging movement of the control unit when it is being set by movement of link 547. Spring 560, as shown in Figure 34, is normally effective to position lever 547 in its rearward position so that it will be raised by cams 550 and 551, upon rotation of the setting clutch 430 and shaft 431, to engage lug 555. The reverse clutch is thereupon conditioned by member 469 to drive the calculating mechanism in the adding direction.

If the pendular lever 545 is moved to draw reverse bar 547 forward, by any of the controls hereinafter described such as the subtraction bar, or any of the minus setting mechanisms, the upturned end 549 of lever 547 is placed beneath cross-tie 554 so that, when the cams 550 and 551 are rotated, the reverse unit control member 469 conditions reverse unit to drive the calculating mechanism in the subtractive direction.

*Carriage centralizer*

Dipping of the accumulator carriage, including rocking of the plates 266 about shaft 262 to bring gears 271 into mesh with gears 189 (Figure 46) has been previously mentioned. To ensure that the carriage, when thus dipped, will mesh with the gears 189 and is properly aligned, means are provided for centralizing the carriage into its proper lateral position upon dipping. This lateral location of the carriage is preferably effected in advance of the carriage dip as is particularly necessary in division operations. The mechanism for this purpose is illustrated in Figures 44 and 45. A U-shaped member 541 is supported for pivotal movement about shaft 170, swinging between adjacent plates of the selection unit and being provided with a guide lip 542 overlying one of said plates. At the outer end of the U-shaped member 541 a V-shaped extension 543 is secured so that upon upward movement it will slip between adjacent carriage brace plates 266 and insure proper lateral adjustment of the carriage before it has begun its downward movement. This carriage centralizer is connected by means of a pin and slot connection 544 with an upwardly extending arm of the cam follower 529 which controls operation of the selection locking mechanism. Thus, upon downward movement of the selection locking gate to release the selection mechanism, the U-shaped member 541 is moved in a counter-clockwise direction moving the element 543 upwardly between the plates 266. As the selection lock gate is thereafter moved into selection locking position and the dipping of the carriage begins, member 541 starts downward movement therewith, preventing lateral movement of the plates 266 as they are lowered into position.

*Carriage dipping*

After selection has been made of the values to be entered into the machine, and operation of the sensing system has occurred, which includes the previously described release by the setting clutch 430 of the selection plates by lock gate 236, the sensing in each order of the machine of cam units 146 by noses 211 and 219 on feeler arms 210 and 217, and the movement of the selection plates in each order to position the several idler gears followed by the locking of the selection plates; entry of the values into the accumulator is effected.

As previously described, the accumulator is supported by (Figures 18 and 46) a series of plates 266 connected by a common bail 269 and pivotally mounted for dipping movement on shaft 262. After selection, plates 266 are rocked about shaft 262 to bring gear 271 in each order into contact with intermediate gear 189 (Figure 15) keyed to sleeve 169 together with gears 171, 177, and 183. This group of gears 171, 177, 183, and 189, being keyed to a common sleeve 169 in each order, are rotated as a body at a certain speed and for a certain distance according to the value selected, as has been described in connection with Figures 2, 5, and 10 to 15, inclusive. Dipping of the carriage also results in the release of gears 271 from the braking action of pawls 319, each pawl being carried down into engagement with shaft 565 (Figures 5 and 46), whereby the pawls are rocked clockwise to release gears 271.

Meshing of intermediate gear 271 with gear 189 in each order, results, upon rotation of gears 189, in the selected value being placed in the accumulator. To secure dipping of the carriage at the correct cyclic time, means operated by the setting clutch are provided for dipping the carriage and thus permitting transfer of the value selected.

The means for dipping the carriage, from that position in which it appears in Figures 2, 19, 21, 22, 23, and 46, to bring gears 271 into mesh with gears 189 and then elevate the carriage at completion of the calculation, comprise two vertical sliding links 566 (Figure 46) slidable over pins 567 on opposite sides of the machine. Each link is provided with rollers 568 engaging bail 269, the links being urged upwardly by a spring 569. Links 566 are pivoted to cam followers 570 and 571 by eccentric studs 572 so as to provide for adjustment of the engagement of gears 271 and 189. Cam followers 570 and 571 carry rollers 573 in engagement with cams 574 on setting clutch line shaft 431 so that the links 566 are positively pulled down by the operation of the setting clutch.

Means are provided for latching the carriage in its lower position during engagement of gears 271 and 189. This means includes latch levers 575 (Figure 46) in the form of bellcranks pivoted at 576 and each having a nose 577 formed at the upper end thereof to engage the lower edge of lateral extensions 578 on cam levers 570 and 571. The latch levers 575 are urged to engage the extensions 578 by springs 579. When the carriage is dipped the extensions 578 ride over the nose 577 and are latched therebeneath thus retaining the carriage in its lowered position until the latch levers 575 are operated to release the carriage in a manner presently to be described.

Rocking of shaft 202 to release pawls 201 from gears 189 is accomplished in time with the dipping of the carriage so that release of the gears 189 is properly coordinated with the meshing of gears 271 with gears 189. Keyed to the shaft 202 on each side of the machine are depending levers 586 (Figure 47) slotted to receive pins 587, carried at the upper ends of rock levers 588. The levers 588 rock upon shaft 225 and are provided at their lower ends with rollers 589 for engagement by the cam 574.

When the setting clutch rotates the cam 574 to rock the cam levers 570 and 571, the pawls 201 are thus released except in those orders in which a zero has been set up, as has been previously explained. A detent mechanism such as the conventional one illustrated in Fig. 47 which comprises a lever 532 pivoted on a shaft 533 and urged clockwise by a spring 534, such movement thereof being limited by a stop (not shown), which lever cooperates with a nose 535 formed on the rocking lever 588 to retain it in either of the positions in which it is capable of being set, so that pawls 201 will not reengage gears 189 until the restore clutch operates, as hereinafter described.

Means are provided for releasing the dipping carriage latch lever 575 after the end of main clutch operation. These include (Figure 48) levers 580 and 584 secured to shaft 581, and cooperating with a lever 591, pivotally supported on shaft 590 and provided with an extension 592 lying against lever 584. A second extension of lever 591 is adapted to be engaged by a roller 593 fixed between a supporting disc 700A fixed to sleeve 594 rotatably mounted on shaft 649. This sleeve is driven by a separate clutch operated only as an incident to the termination of operations, and known as the "restore clutch."

When the main clutch dog 395 is moved to stop and release main clutch 428 (Figure 42), as will be described hereinafter, the restore clutch starts operation and roller 593 is rotated. This rocks lever 591 clockwise to move lever 584 and so rocks levers 580 and 539 (Figure 46) to release the latched-down carriage through the rocking of the levers 575 by lateral extensions 583 of levers 539.

As a further incident to the movement of the shaft 581, roller 536 (see Figures 46 and 47) engages a cam surface 537 on the lower edge of the rocking levers 588 thereby rocking these levers to cause reengagement of the pawls 201 with the gears 189.

The sleeve 594 of the restore clutch 700 carries another cam 596 (Figure 46) which is employed to prevent the carriage from rising too rapidly. Lever 597, fixed to shaft 600, bears against this cam and lever 599 also fixed to shaft 600 is joined by a pin and slot connection 602 to one of the links 566 so that the rate of rise of the carriage under the pull of springs 569 is no greater than that permitted by movement of cam 596.

Main clutch operation

The main clutch is engaged and its operation initiated by the setting clutch. Thus, when any one of the operation control keys is depressed, and the setting clutch is started in operation, as has been previously described, the main clutch is automatically engaged, and may be held engaged for one or more cycles of operation, depending on the operation called for by the key depressed.

The main clutch structure has been described, it being of the roller clutch type as disclosed in connection with Figures 30 to 33 inclusive. The main clutch 428 is fixed to a rotatable sleeve 419 mounted on the fixed shaft 429 which is positioned between frame plates 524 and 610 of the machine (Figure 52). The clutch is controlled by clutch dog 395 (Figure 41) rockably mounted on shaft 611 and urged into engagement with the main clutch by spring 612, tensioned between a frame stud and the left end of the dog through toggle linkage 610.

The rocking lever 746 is fulcrumed on shaft 501 and carries a roller 745 in engagement with the cam 747 carried by the setting clutch shaft 431, as has been described. This rocking lever carries a member 603 pivoted thereon at 604 and urged to rock clockwise with respect to the rocking lever by spring 613, movement between the lever and member being limited by an ear 614 on the member 603 engaging the lower edge of the lever 746. The member 603 is provided with a nose 615 which may engage a notch 616 on clutch dog 395 with a hooking action to prevent disengagement of these two parts. The movement of member 603 counterclockwise about shaft 501 serves to rock dog 395 toward the end of the half rotation of setting clutch shaft 431, the dog being rocked clockwise, and engagement of the main clutch 428 follows. Further rotation of cam 747 permits return of the rocking lever 746 to the position shown in Figure 41 and permits clutch dog 395 to contact with and stop the clutch when it is freed from the holding means, hereinafter described, which can selectively latch the dog 395 for a plurality of cycles. The hinging of member 603 to the rocking lever 746 permits the setting clutch to operate without opening the main clutch in certain phases of the division operation as hereinafter described.

Main clutch control

To provide for controlled continuous rotation of the main clutch for multiple operation, a latch 632 pinned to shaft 626 and urgd clockwise by spring 633, has a notch at its upper end to engage under a lateral projection 620 on the tail of the main clutch dog 395. A roller 634 is carried by the latch 632 in a position to form the engaging face of the notch, thus facilitating engagement and disengagement of the clutch dog therewith. The clutch dog will be so latched out of engagement with the clutch only on multicyclic operation, but for operation performed in one cycle of the main clutch, such as addition, subtraction, and multiplication with the number "1" as a multiplier, means hereinafter to be described will prevent the latch 632 from entering under the tail of the main clutch dog.

Addition bar mechanism and operation

The addition bar 800 is ordinarily used for securing a single additive operation but may be used for multiple addition as hereinafter disclosed. The bar is capable of initiating operation of the motor, the setting clutch 430, the main clutch 428, and the several functions and operations controlled by these clutches, including the operation of the restore clutch at the conclusion of main clutch operation, and this irrespective of whether or not the operator maintains the bar 800 depressed or permits it to be returned after or during the single cycle of operation.

This bar (Figures 1 and 53) is provided on the right hand side of the machine and is mounted upon the control plate. The bar proper is carried by a frame 801 which is supported by parallel link mechanism formed by bellcranks 802, both pivoted upon the frame plate. One end of each of these bellcranks is joined to the frame 801 while the other end is connected by link 803. Spring 804 is tensioned between one of the bellcranks and the frame of the machine, to hold the bar in raised position. The frame 801 includes a projection 805 overlying a pin 806 which is carried by another parallel link mechanism (Figure 54) comprising arms 807 and 808, respectively carried by studs 809 and 810, and a connecting link 811.

Depression of the plus bar 800 moves the pin 806 downwardly and thus, through the member 811, imparts rocking movement to the lever 808 about its pivot 810 until a shelf 726 on said lever to the left of said pivot, is moved upwardly out of engagement with the face of a hatchet-shaped lever 728. The hatchet-shaped lever 728 (Figures 54 and 55) is normally urged by a spring 730 to swing shaft 762 to which it is pinned, clockwise. A short lever 732 is likewise pinned to the shaft 762 and therefore swings with the lever 728 to move the pin 734 (also shown in Figure 62) to open the setting clutch and effect an additive operation through mechanism hereinafter to be described in connection with multiplication.

The machine is normally conditioned for positive operation but to insure against its being set for negative operation when the plus bar is depressed, the lower right hand corner 736 (Figure 53) of the frame 801 contacts a lug 738 to rock control lever 740 (Figure 54), which positively moves the lug 738 to its additive position.

A link 742 (Figures 54 and 55) is pivoted to the upper end of the hatchet-shaped lever 728 and supported for sliding movement by a pin and slot connection 743. Thus, upon operation of the hatchet-shaped lever above described, a finger at the right hand end of the lever 742 will be caused to overlie a shelf 744 formed on the control lever 740 thus preventing rocking movement of the control lever to its negative position during plus bar operation. Upon operation of the minus bar, the right hand end of the link 742 will underlie the lug 744 similarly locking the mechanism to prevent operation of the plus bar.

The hatchet-shaped lever 728 is recocked under influence of a cam 747 (Figure 41) on the setting clutch shaft which cam engages a roller 745 carried by a lever 746 mounted on shaft 501 rocking this lever counter-clockwise to effect rightward movement of a link 748 pivoted to a lever 750 which is pinned to the shaft 752. A lever 754 (Figure 54) also pinned to the shaft 752, is connected through a link 756 and a pin and slot connection 758 with the lower end of a lever 760. The lever 760 is pinned to the same shaft 762 to which the hatchet-shaped lever 728 is pinned. The pin and slot connection 758 permits free clockwise movement of the hatchet-shaped lever, but causes this lever to be rocked counter-clockwise or recocked upon rotation of the setting clutch cam just described.

The hatchet member, upon being recocked, is carried slightly beyond its original position until a shelf 764 (Figure 54) on a pawl 766 pivoted on the shaft 810 and urged in a clockwise direction by a spring 768 engages with a shoulder 770 on the bottom edge of the link 742. Since the link 742 is connected with the upper end of the hatchet-shaped lever 728, this lever is held in its extreme counter-clockwise position until such time as the shelf 726 is permitted to return to its locking position relative to the hatchet-shaped lever. Thus, in the event that the plus bar is held down too long, the parallel links 807 and 808 will rise freely upon release of the plus bar without any possibility of the shelf 726 being intercepted by the hatchet-shaped member. As the link 808 rises its upper edge engages an ear 772 on the tail of the pawl 766, thus releasing the shelf 764 from the shoulder 770 and permitting the hatchet member to move to its original position where it is blocked by the shelf 726. Before the hatchet member is recocked the shelf 726 overrides its upper edge to form an interlock preventing rising of the parallel links 807 and 808 and pin 806 which might otherwise occur prematurely.

After the selecting operation, as heretofore described, has been completed, and as the main clutch is being engaged by operation of the setting clutch operated cam, the keyboard is automatically cleared by the mechanism illustrated in Figures 54 and 57.

The parallel link assembly, comprising members 807, 808, and 811 (see Figure 57) which is depressed by depression of the plus bar 800, as hereinbefore described, comprises a pin support 778 for one end of a link 779 which has a slot adjacent its right hand end embracing said pin, and a bifurcation formed at its left hand end embracing a pin 781 on the keyboard clearing gate 125 which, as previously described, is also capable of manual operation by the keyboard clear key 122 to release all depressed keys. A spring 783, tensioned between one end of link 779 and a frame stud, normally urges the link 779 and the parallel link assembly to a raised position.

When the link 779 is lowered by depression of the plus bar 800, a lug 776 on said link is carried into the path of a lever 774 pinned to the shaft 752 to swing therewith in a counter-clockwise direction under influence of the link 748 which is operated, as described above, from the setting clutch line. The leftward movement thus imparted to the link 779 rocks the key control gate 125 to release automatically all depressed keys.

The plus bar is locked against depression after operation of the multiplication unit has begun. To accomplish this a lever 780 (Figure 56) pivoted at 782, is adapted to rock in a clockwise direction so that the head thereof overlies a shelf 784 on the extreme left hand end of the link 808. As this end of the link 808 must rise upon depression of the plus bar, the plus bar is locked out of operation until the lever 780 is withdrawn. In order that the lever 780 may be rocked in a clockwise direction, it is formed with a U-shaped cross section and has a bifurcated tail 787 embracing a pin 788 which pin is moved downwardly upon operation of any multiplier key as will more clearly appear under the description of the multiplication unit. The plus bar may be depressed concurrently with any multiplier key however, in which event shelf 784 will pass above the upper end of lever 780.

To prevent depression of the division key when the plus bar is depressed, and likewise to prevent operation of the plus bar during division operations, the following interlock is provided. The lower end of the link 811 (Figure 56) is provided with an inclined edge 786 for co-operation with the upper edge of lever 973 (see Figure 81) which is raised upon depression of the division key, as will be hereinafter described. Thus, if the plus bar is depressed, the inclined edge 786 blocks operation of the division key and likewise, upon depression of the division key, the lever 973 blocks the lower end of the link 811 to prevent operation of the plus bar.

Subtraction bar mechanism and operation

The subtraction bar 860 (Figures 1 and 53) is utilized for effecting a single cycle of negative operation or for repeated subtraction in connection with the multiplier keys. As appears in Figure 53, this bar is mounted upon a stem 861 supported by pins 862 in suitable slots therein and held in its raised position by a spring 863. The stem 861 is provided with a projection 864 which overlies the pin 806 and operates the mechanism associated with that pin which has been described at length under the operation of the addition bar 800. As has been disclosed, depression of the addition bar 800 positions the reverse unit disclosed in connection with Figures 34 to 38, inclusive, by rocking control lever 740 (Figure 54) in a counter-clockwise direction, if necessary, so that the machine will be conditioned for positive drive. Opposite movement of the lever 740 to condition the machine for negative operation, is effected by an ear 867 (Figures 53 and 54) on the subtraction bar which engages with the lever 740 upon downward movement of the subtraction bar to rock said bar in a clockwise direction.

This clockwise movement of the lever 740 which conditions the machine for negative operation, raises the lug 744 on said lever to such a position that the link 742 will underlie the same upon release of the hatchet-shaped lever 728, as has been described in connection with the addition bar mechanism.

The operation of the machine under control of the subtraction bar 860 is substantially the same as operation under control of the addition bar 800, the principal difference being that, owing to the reversal of the drive, the value set up in the keyboard will be subtracted rather than added to the value represented in the accumulator.

Motor control

Upon opening of the main clutch by movement of its clutch dog 395 (Figure 42), of the setting clutch by movement of its dog 394, or of the restore clutch by movement of its dog 405, the shaft 386 is rocked by lever 396 which is pinned thereto. Lever 396 includes a lateral extension 409 overlying the setting clutch dog 394, while the opposite end of the lever underlies an extension 408 of the main clutch dog 395. If, under the control of mechanism to be presently described, the main clutch dog is held open, the shaft 386 will be maintained rocked in a clockwise direction. Upon the setting clutch dog or the restore clutch dog being moved to a clutch opening position, the shaft 386 is immediately rocked, or is held in rocked position, depending upon the sequence of operations which occurs.

Bellcrank 385 (Figure 28), freely supported on shaft 386, is provided with a pin 387 lying within the bifurcated end of lever 388. This lever 388 is pivotally supported on shaft 389 and carries an extension 390 of insulating material, which is normally pressed by spring 392 against one of a pair of resilient contact arms 391 to spread the contacts and maintain the motor circuit open. When arm 388 is moved counter-clockwise, the motor circuit is closed until clockwise rocking of the lever occurs, when the motor circuit is opened, spring 392 biasing the lever 388 to keep the circuit open.

Upon rotation of shaft 386, as by movement of either the main clutch dog 395 or the setting clutch dog 394 which rocks lever 396 as hereinbefore described (Figure 42), arm 397 on lever 393 fixed to shaft 386 is moved, to engage shelf 384 on lever 385 and move arm 388 to cause contacts 391 to close.

The arm 388 can also be actuated to permit the contacts to close, if they are not already closed, by any one of the several carriage shift controlling means through link 401 engaged with bellcrank 402 by means of the pin 403. The bellcrank is pivoted to a link 404 which is in turn pivoted adjacent its upper end with lever 393 so that clockwise rocking of the bellcrank results in clockwise rocking of lever 393 which, through its arm 397 rocks bellcrank 385 to effect closing of the circuit by means of arm 388. All other controls are free to open and close the circuit without operating link 401.

A previously described operation of the machine includes an opening of the main clutch dog by the presently described setting clutch. In this operation, the setting clutch remains open for only one cycle of operation, the main clutch being opened during that cycle and remaining open under the control of the operating means initiating the operation. It therefore follows that the shaft 386 is initially rocked by the opening of the setting clutch, but is retained in rocked position by the later opening of the main clutch and the consequent clockwise movement of dog 395 around its supporting shaft.

Centralizing of half speed shaft

The half speed shaft 166 is centralized so that the gears thereon, upon coming to rest, are located in one of two predetermined positions. As shown in Figure 51, the half speed shaft is provided with a cam 650 having two diametrically opposed indentations thereon. This cam is provided at the end of the shaft adjacent to the outside face of the left frame plate. Pinned to this frame plate are a pair of arms 653 urged together by a spring 654 and having rollers 655 at their upper end riding the periphery of the cam 650 for cooperation with the diametrically opposed indentations thereon.

To reduce noise and friction during multicycle operation of the machine, means are provided for locking the centralizing means out of operation. Shoulders 656 are provided on the inner edges of the arms 653 and a lateral projection 657 may be moved between these shoulders to maintain the arms 653 in such a position that the rollers 655 thereon will be prevented from entering the depressions of the cam 650. This lateral projection 657 is formed at one end of a bellcrank 658, the end of the bellcrank being made in two sections joined together by means of pins cooperating with arcuate slots such as illustrated at 652 to permit adjustment of the position of the lateral projection 657. A spring 659 urges the bellcrank in a clockwise direction, and its movement in this direction is limited by an ear formed at its lower end and engaging with arm 660 pinned to a shaft 661 at the left hand side of the machine. This shaft extends from the left hand frame plate of the machine through the machine to a position adjacent the main clutch operating dog at which point a lever 662 (Figure 49) is also pinned to the shaft 661. A nose 663 formed at the upper end of the lever 662 is engageable by a lateral projection 620 carried by the main clutch dog 395. When the main clutch is opened by movement of the main clutch dog 395 in a clockwise direction, the projection 620 releases the lever 662 which is rocked counterclockwise under influence of the spring 659 pulling upon the bellcrank. This brings the lateral projection 657 between the projections 656 on the arms 653. Thus, whenever the main clutch is held open for more than a single revolution, the arms 653 are latched apart and the centralizing means on the half speed shaft does not operate. This materially reduces the noise, since the centralizing of the shaft at high speed multicyclic operations is unnecessary and, in actual operation, produces some noise.

When the main clutch dog is released and is free to contact and stop the main clutch, the projection 620 on the clutch dog engages nose 663 and forces bellcrank 658 counter-clockwise to remove projection 657 from between the arms 653 before the main clutch dog contacts the clutch.

The half speed shaft, the quarter speed shaft, and the twelfth speed shaft are, as previously described, geared together. It will be apparent, therefore, that the centralizing means above described will be effective upon the quarter and twelfth speed, as well as upon the half speed shaft.

Restore clutch

The restore clutch 700 (Figure 49) is employed to effect the release of the carriage latch member 515 (Figure 46) and to control the rate of the return of the carriage from its dipped position, as well as certain functions hereinafter described in connection with multiplication and division operations. This clutch is jointly controlled by the dipping carriage and by the main clutch dog, in such a way that whenever the carriage is in its lower position and the main clutch dog 395 is seated home in the notch of the main clutch, the restore clutch will open and complete one cycle of operation.

The lowering of the carriage creates a spring bias tending to move the clutch release dog away from the restore clutch and permit engagement of the restore clutch, but as this dog is normally latched by member 701 (Figure 49), the spring is prevented from becoming effective until completion of the main clutch cycle. The raising of the carriage is initiated and controlled by the restore clutch and this carriage movement is utilized to reverse the spring bias on the restore clutch release dog so as to tend to return it home so that as the restore clutch cycle is finished, the clutch release dog is spring pressed into the full cycle notch of the clutch housing, bringing the restore clutch to rest upon the completion of one cycle of operation.

The clutch particularly employed is similar to that disclosed in the patent to Friden, Number 1,643,710, previously referred to. This clutch, which is mounted upon and driven by shaft 649 (Figures 28 and 49), is directly controlled by an extending nose 702 on a clutch release dog in the form of a bellcrank 405 which is freely supported on a shaft 600. For controlling the clutch release dog, an M-shaped member 703 is provided which has one foot rockably mounted on the shaft 600, and a lug 704 thereon, supporting a spring 705 compressed between itself and the left arm of bellcrank 405.

An arm 722 keyed to the shaft 600, and thus rocked by dipping movement of the carriage, is resiliently connected to the M-shaped member 703 by a link unit 723 shown in detail in Figure 50. As appears in this figure, the link structure includes a first link member 706 secured by a pin 709 to the arm 722, and another link 711 secured by pin 712 to the M-shaped member 703, the other ends of each link being slotted as at 713 to receive the pins 709 and 712, respectively. Each link has a cut out portion into which two tenons 714 and 715 extend, the respective tenons being of different lengths so that a column support is provided for the spring 716, slipped over the adjacent tenons in each link, so that when the unit is pulled apart, the spring is compressed. Likewise, when the overall length of the unit is reduced, the spring is also compressed so that the spring tends to maintain the link at a given and constant length while being continuously supported by the overlapping tenons.

As the setting clutch rotates, the main clutch dog 395 is withdrawn from contact with the main clutch and an extension 408 on said dog is withdrawn from beneath a latch member 701 pivoted on a frame plate, thus permitting said latch member to be rocked counter-clockwise by its spring 717 tensioned between one end thereof and the frame. An ear 718 on said latch member is thereby brought into the notch 719 of the M-shaped member 703 to prevent counterclockwise movement of 703 until the main clutch has been disengaged by reseating of its dog 395 in one of the full cycle notches of the clutch 428.

The lowering of the dipping carriage, however, tends to engage the restore clutch even before the main clutch engages, and a second restraining means is provided to prevent such operation.

The left foot of M-member 703 is provided with a shelf 720 overlying one end of a bellcrank 721 which is rockably supported on shaft 611. The other end of bellcrank 721 is provided with a roller 707 lying against the periphery of a cam 708 on the setting clutch shaft 431. On rotation of the setting clutch, therefore, the bellcrank 721 is rocked and shelf 720 is raised by the end of the bellcrank to rock the M-shaped member 703 slightly clockwise about the shaft 600. This raising of the member 703 not only insures that the lug 718 of the latch member 701 will engage in the notch 719 properly when the main clutch is engaged, but provides for the situation, occurring in certain division operations, when operation of the setting clutch does not cause engagement of the main clutch. In this situation the latch member 701 is not permitted to rock and the cam 708 serves to delay operation of the restore clutch until near the end of the setting clutch cycle. The reason for this delay will appear in the description of the division mechanism hereinafter.

As the setting clutch continues to rotate, the dipping carriage is lowered and shaft 600 is rocked counterclockwise by arms 599 (see also Figure 46) keyed thereto and connected with the carriage lowering links 566. Arm 722 (Figures 29 and 49) keyed to the shaft 600, is thus lowered, and since the M-shaped member 703 is held by the latch member 701, the link unit 723 is lengthened and its spring 716 compressed.

The parts remain so positioned until the main clutch dog 395 is permitted to reseat in the notches of the clutch discs, whereupon the extension 408 thereof strikes the ear 710 of the latch member 701, rocking it clockwise and removing its lug 718 from the notch 719 of member 703. Spring 716 is then permitted to expand, shortening the link unit 723 and rocking the member 703 counter-clockwise to carry the left leg (Figure 49) of member 703 down against the leftwardly extending arm of bellcrank 405 and move the restore clutch dog 405 to cause engagement of the clutch.

Operation of the restore clutch thus initiated, causes the dipping carriage to rise, as previously described, rocking arm 722 clockwise by virtue of its connection therewith. Movement of the arm 722 is, in this operation, transmitted directly through the link unit 723 to rock member 703 clockwise, and to compress spring 705 until the nose 702 of the restore clutch dog 405 can reenter the aperture of the housing to disengage the clutch, whereupon the mechanisms are brought to rest in the position shown in Figure 49.

*Automatic multiplier unit*

The machine of the present invention includes a bank of automatic multiplier keys 2001 which is shown in Figure 1 adjacent to the right hand side of the machine, and under control of which automatic positive and negative multiplications can be effected. This unit includes a key section 2002 (Figures 59 and 62) which is quite similar to that employed for setting a factor of a calculation, and disclosed in connection with Figure 2.

In the present machine, the key section 2002 is placed adjacent to the right hand side of the machine, as appears in Figure 1. However, the mechanism set thereby is placed adjacent to the multiplicand keyboard and between the said keyboard and the division, plus, and minus keys in Figure 1. The key section 2002 (Figure 59) includes the usual differentially settable bar 120 which is set by the multiplier keys of the "2" to "9" values to move the selection segment member 132 mounted on shaft 137. The machine being normally conditioned for single cycle operation, no control of the multiplier selection by the "1" key is necessary. The member 132 is substantially like the same member disclosed in Figure 2, except that it does not have the upper segment arm there shown for setting a check dial.

The mechanism for swinging the member 132 is illustrated in Figures 59, 60, and 61. A lever 2003 is pivotally mounted on a shaft 2004 which extends to the left from the key section 2002. A pin 2005 connects the lower end of lever 2003 with differentially settable bar 120 and on its upper end lever 2003 is pivoted by an eccentrically adjustable pin 2006 to a lever arm 2007. This lever arm 2007, as appears in Figure 61, is integral with an arm 2063 welded to a bail member 2064 pivotally mounted on shaft 2004. One end of the bail member is extended to form another lever arm 2065 having a bifurcated end embracing pin 2008 mounted upon the multiplier selection segment 132. Thus the lever 2003 and the lever 2065 are in effect joined as a single lever to rock together about the common axis of the shaft 2004 so that movement of the bar 120 will impart proportional movement to the selection segment 132.

As has been disclosed in connection with the manually set selection mechanism, the swinging member 132 is likewise effective to rotate a selection cam unit 146 similar to that described in detail in connection with Figures 2, 6, 7, 8 to 8D, and 9.

The multiplier unit also includes sensing members 210 and 217 (Figure 59) which, in the same way as has been disclosed in connection with the earlier described power set selection mechanism, are effective to sense the setting of the present cam unit 146 and, when the selection gate 236 is released to position plates 172, 178, 184, and 190, cooperating with driven gears 2009 (Figures 52 and 59) driving idler 2010 which in turn drives gear 2011. The gears 2009 are keyed to sleeve 2012 supported by shaft 170, and the sleeve 2012 is in turn driven by the twelfth speed shaft 168 (Figure 64) through a gear train including gear 2025 on the twelfth speed shaft 168, idler gear 2026, and idler gear 2027, driving gear 2028 on the sleeve 2012. Since the twelfth speed shaft is rotated whenever the main clutch is open, gears 2011 (Figure 59) are driven thereby through idlers 2010 carried on the settable plates 172, 178, 184, and 190. As has been developed in connection with the previously described power set selection mechanism, any one of the group of plates may be selectively moved to engage the gear 2011 carried thereby with gears which, in this case, are carried by sleeves rotatably mounted on the half or quarter speed shafts. Movement of these gears is utilized to control the number of cycles of operation of the main clutch and thereby to effect a positive or negative multiplication in all operations wherein the multiplier value is two or more. As will presently appear, rotation of the driven sleeve is utilized to disengage the main clutch after the predetermined number of main clutch cycles has occurred.

The driven sleeve rotatably mounted upon the half speed shaft 166 (Figure 65) carries gears 2013, 2014, 2015, and 2016 connected thereto as a unit. The driven sleeve rotatably mounted upon the quarter speed shaft 167 carries gears 2017, 2018 and 2019 connected together as a unit. These gears are mounted upon the half and quarter speed shafts for the sake of convenience and are not connected thereto, the shafts providing merely a convenient support. Gear 2020 is also rotatably mounted upon the quarter speed shaft but is not connected to the sleeve carrying gears including 2017, 2018, and 2019. As typical of the gears which may be used, the gears 2013 to 2016 respectively include gears having twelve, fourteen, sixteen, and eighteen teeth, while the gears 2017 to 2020 inclusive, include gears having twenty, sixteen, twelve, and twelve teeth, respectively. The ratio of these gears to the gears driving them is such that gears 2013 to 2019 inclusive respectively provide selection ratios extending from a "nine" multiplier to a "three" multiplier, while the gear 2020, as will presently appear, provides in combination with other mechanism, the "two" selection.

Depending upon the selection which has been made, one of the plates is swung either to the right or to the left, as viewed in Figure 59, to engage one of the gears in the group 2013 to 2020 inclusive. The three other plates remain in that position shown in Figure 59 in which gears 2011 are not meshed with any gear in the group 2013 to 2020 inclusive.

A single cam member 2021 (Figures 64 and 65) is attached to the sleeve carrying gears 2013 to 2016 inclusive and, as will presently appear, is adapted to rock a bellcrank 2022 universally pivoted on the frame by means of a loose fitting pin and spring connection 2029 so as to open the main clutch and stop the machine as hereinafter described, after the cam member 2021 has made a single rotation in either a clockwise or a counter-clockwise direction. Thus, for example, gear 2014, which is that providing for seven main clutch actuations, and controls a positive or negative multiplication by the value "seven," makes one rotation while the main clutch is making seven rotations. Since member 2021 is connected to the unit which includes gear 2014, it will likewise make one rotation and at the end of this rotation is effective to rock the bellcrank 2022.

A double cam member 2023 (Figures 64 and 65) is included in the same unit with gears 2017, 2018, and 2019, and is effective upon half a rotation in either clockwise or counter-clockwise direction, to rock the same bellcrank 2022. Thus, for example, gear 2018 is effective to control the multiplication, either positive or negative by the value "four," the main clutch making four rotations. During the four main clutch rotations, gear 2018 and the member 2023 make but half a rotation, the direction depending upon positive or negative multiplication. At the end of this half rotation, the member 2023 is effective to rock the bellcrank 2022. Gear 2020, providing for multiplication by the value "two," is connected to the triangular member 2024 adapted to cooperate with a roller 2077 on the upwardly extending arm of bellcrank 2022. This member is adapted, when gear 2020 is being driven, to rock the bellcrank 2022 during the second cycle of main clutch operation.

Interlocking means are provided to prevent inadvertent simultaneous depression of adjacent multiplier keys. These means comprise levers 2066 (Figure 62) centrally pivoted to the key section frame intermediate the key stems. The left hand ends of the interlock levers 2066 underlie lugs 2068 (see Figure 63) formed on the key stems, so that depression of any key will rock its associated lever counter-clockwise. This brings the left hand end of the interlocking lever 2066 down upon the right hand end of the interlocking lever 2066 associated with the next lower key and brings its right hand end up beneath the left hand end of the lever 2066 associated with the next higher key; thus, when the number "3" multiplier key is depressed, both the number "2" key and the "4" key are locked against being depressed. The lever 2066 between the number "8" and "9" multiplier keys, has an enlarged end 2067 to operate directly against lug 2068 on the stem of the number "9" key, this being necessary because there is no locking lever above the number "9" key.

Depression of any value key from "1" to "9" inclusive in the multiplier unit, is effective to effect engagement of the setting clutch, and is also effective to initiate motor operation by closing of the main switch.

The multiplier key section also includes a bar 2030 (Figure 62) which is in a position to be engaged by the stem of any key of from "1" to "9" value inclusive, and is mounted for parallel movement by swinging levers 2044 pivotally connected to its opposite ends. A spring 2032 connected to an extension of the forward lever 2044, urges these levers clockwise, thus normally maintaining the bar 2030 in a raised position. The levers 2044 carry extensions 1900 between which extensions is pivoted a stabilizer link 1901. This stabilizer link swings with the bar 2030 to prevent any play in the pivotal connection thereof which might result in other than perfect parallel movement upon depression of the various multiplier keys which contact the bar 2030 at spaced points throughout its length.

In order to close the main switch and initiate motor operation upon depression of a multiplier key, the bar 2030 is provided adjacent its right hand end with an underlying shelf 1902. The shelf 1902 is engageable upon downward movement of the bar 2030 with a lever 1903 which, as shown in Figure 28, is pivoted at 1904 and has a tail underlying a shelf 1905 on the link 404 pivoted to lever 393. The lever 1903 is rocked counter-clockwise upon depression of the bar 2030, thus rocking the levers 393 and 385 clockwise to close the main switch through the medium of the link 388 in the manner heretofore described.

The mechanism for opening the setting clutch upon depression of any multiplier key from "1" to "9" includes a link 2033 (Figures 62 and 66) which is pivoted at its right hand end at 1908 to an ear of the bar 2030, and is supported adjacent its left hand end by a link 1907 depending from a lever 2034, included in a lever system which comprises lever 2034, lever 2035, and lever 2036. The levers 2034 and 2035, as shown in detail in Figures 66 and 66A, are pivotally mounted upon a common pin 2037 supported by a depending portion of the key frame. The lever 2036 is pivoted at 1906 to the lever 2035. Levers 2034 and 2035 include, respectively, projections 2038 and 2039 between which a spring 2040 is compressed to urge the levers apart. Similarly, lever 2036 includes a projection 2041 while lever 2035 includes a projection 2042, between which projections spring 2043 is compressed. A lug 2045 on lever 2035 limits the movement of lever 2036 and a lug 2116 on lever 2035 limits the movement of lever 2034 with respect thereto. Lever 2035 also includes an ear 2046 which lies beneath the bar 2030 and which is forced downwardly when the bar 2030 is depressed upon operation of a multiplier key. Depression of the "0" multiplier key also rocks lever 2035 downwardly by means of a lever 2090 which underlies the zero key stem, being pivoted at 2091, and carries a pin 2093 overlying the left end of lever 2035.

It is desired to cause engagement of the setting clutch upon complete depression of any "1" to "9" multiplier key, and to prevent the initiation of operation before depression of such a key has been fully completed. Therefore, the final trip-off of the setting clutch might be placed under control of the key latching mechanism which does not operate until a key is fully depressed. However, in the present machine the key latching mechanism also operates when the zero key is depressed, under which condition it is not desired to operate the setting clutch, so the trip-off of the setting clutch is placed under joint control of the bar 2030 and the key latching mechanism.

Setting clutch operation is initiated by lowering of the link 2033 (Figure 62) by means presently to be described. The link 2033 underlies an ear 2048 formed on an upwardly extending arm of a long lever 2047 pivoted at 1909 and urged to swing counter-clockwise about its pivot by a spring 1956. The lever 2047 has a rearwardly extending arm 1950 provided with a slot 1951 embracing a pin carried by a floating interponent 1952 which is supported at one end by link 1953 freely pivoted on a stud 1954 on the control plate, an ear 1955 being provided on the link 1953 to abut the top edge of the control plate to limit the clockwise swinging movement of the link.

When the link 2033 is lowered, it permits the lever 2047 to be swung counter-clockwise by its spring 1956, raising the interponent 1952 to a position where it may be engaged by a ratchet wheel 1957 secured to the rotating shaft 1328 of the carriage shift mechanism, hereinafter to be described.

The ratchet 1957 will thereupon kick the interponent 1952 sharply to the left so that its opposite end strikes a stud 1958 on a lever 1959. The lever 1959 (as also shown in Figure 39) is keyed to shaft 501 with the setting clutch dog 394 and secured relative to the dog so that such rocking movement of this lever will free the dog from the clutch.

The opposite ends of link 2033 are lowered by different means; but, as will presently appear, the leverages are so arranged that the lowering of either end alone will not permit the lever 2047 to rock counter-clockwise sufficiently to operate the setting clutch dog through the means described.

As a multiplier key of any value from "1" to "9" is depressed, the underlying parallel bar 2030 (Figure 62) is depressed lowering the right end of link 2033 which is connected thereto at 1908. The lever 2035, having ear 2046 (see also Figure 66) underlying bar 2030, is also rocked by this movement and compresses spring 2040, rocking lever 2034 slightly, and causing the lug 2062 engaging notch 2092 in the latch bar, to move the latch bar 2055 to the left until it abuts the lug 2015 of the moving key, arresting further movement of lever 2034 and causing spring 2040 to be further compressed. This movement is sufficient to carry notch 2057 out of the path of lug 2061. As the lug 2015 of the key is moved below latch bar 2055, spring 2040 is permitted to expand rocking lever 2034 to simultaneously bring the latch bar over the lug 2015 and lower the left end of link 2033 which is connected thereto by link 1907. Both ends of the link 2033 being now lowered, lever 2047 may be rocked sufficiently by its spring 1956 to cause engagement of the setting clutch. The latch bar 2055 holds the depressed key down and all other keys up until it is retracted.

In order to effect the release of the locked multiplier keys it is necessary to provide means which will be operated upon operation of either the setting clutch shaft 431 or the carriage shifting mechanism (Figure 68) to retract the latch bar 2055. In view of the fact that the operator may depress a second key before the machine has completed the operation initiated by the first key depressed, and may be pressing down upon a third key before the second is released, special adaptation of the latch bar operating means to the peculiar requirements of such operation is necessary.

Retraction of the bar 2055 to unlock the keys is effected by a lever 2058 (Figure 62) pivotally mounted at 2059 and adapted to receive a clockwise oscillation upon operation of either the setting clutch line or the carriage shifting mechanism. As the setting clutch shaft 431 (Figure 41) receives a half rotation at the commencement of a multiplication operation, cam 747 fixed thereon rocks the cam follower lever 746 journaled for rocking movement on shaft 501 by means of a sleeve 2094 to which there is also fixed an arm 2060 (see also Figure 62) adapted, upon such movement, to engage an ear 2072 on the lever 2058. During each carriage shifting operation, as will hereinafter appear, lever 1396 (Figure 62) receives a counter-clockwise oscillation, and this lever is provided with an arm 1394 adapted to engage a second ear 1399 on lever 2058.

Adjacent the upper end of lever 2058 there is pivoted thereto, an extension 2054 having a laterally formed portion engaging in a notch in latch bar 2055. A stiff spring 2058a compressed between the lever 2058 and its extension 2054 normally holds the extension against a stop 2058b formed on the lever, so that the lever and its extension ordinarily function as a unit. However, if lever 2058 receives an excessive stroke, the forward ends of the slots in latch bar 2055 will be brought against the key stems and spring 2058a will then yield. Spring 1960 normally urges lever 2058 clockwise and prevents latch bar 2055 from drifting into locking position.

Means are also provided to prevent relocking of a key in depressed position in the event it is held down until after the releasing mechanism described above has functioned. Lever 2036 (Figures 62 and 66) pivoted to lever 2035 at 1906 is provided with an ear 2061 adapted to engage in a notch 2057 in bar 2055 as the latter is moved to the right by lever 2058, and to restrain the bar from returning to key locking position so long as the key is held depressed. It will be recalled that lever 2035 is rocked counter-clockwise about its pivot 2037 by downward movement of the parallel bar 2030, and this movement thereof is transmitted through spring 2043 to lever 2036.

It will be observed that should the operator be pressing down upon a locked up multiplier key, it would depress during the instant when notch 2057 is being moved the slight extra distance to the right which is necessary to insure engagement thereof by ear 2061, and nothing heretofore described would prevent ear 2061 from engaging in notch 2057 so as to prevent the proper functioning of bar 2055, which is to lock the subsequently operated key in depressed position. To prevent such misfunctioning there is provided, a pawl 2069 (Figure 62) pivoted on a depending portion of the parallel bar 2030 and pressed against a limit stop provided by impingement of the tail of the pawl against pivot head 1908, by a spring 2070 compressed between the pawl and the parallel bar.

Pawl 2069 moves slightly upwardly and then downwardly with the parallel bar 2030 in such an operation as postulated above, and engages an ear 2078 on lever 2036 to rock said lever about its pivot on lever 2035, compressing spring 2043 and preventing engagement of ear 2061 in notch 2057. The key lock bar 2055 is therefore free to move leftwardly to lock the key in depressed position.

Obviously the pawl 2069 must release lever 2036 before the next oscillation of key release lever 2058; however, in order to insure against relocking of the same key in the event it is being held down by the operator. This releasing action is effected by a lever 2079 (Figure 62) rockably mounted on shaft 1152 and provided adjacent its upper end with a pin 2095 adapted to engage the edges of a pointed extension 2096 on pawl 2069 to rock said pawl and release lever 2036 therefrom.

Lever 2079 (see also Figure 75) is operated by the carriage dipping mechanism through link 2097 pivoted to the lower arm of lever 2079 and connected to link 1713 through a supporting link 2098 pivotally mounted in the frame. Referring to Figure 46, it will be seen that said link 1713 is pivoted at 598 to arm 1714 keyed to shaft 600 to which there is likewise keyed a bifurcated arm 599 embracing pin 602 on the carriage dipping links 566 operated by cams 574.

These cams 574 effect a release of lever 2036 from pawl 2069 before the retraction of lock bar 2055, which it will be recalled is effected by cam 747 (Figure 41), and the ear 2061 of lever 2036 will therefore be freed to restrain a return of the lock bar during a setting clutch operation initiated by depression of a key the release of which it is desired to insure. Where a key is being pressed down by the operator during a setting clutch cycle initiated by another key, it is not freed to go down until after the rocking of pawl release lever 2079 by the carriage dip cams and slightly before the completion of the retraction of the lock bar 2055 by the main clutch opening cam. Lever 2036 therefore will be restrained by pawl 2069 so that lock bar 2055 may move to the left and lock the key in depressed position.

The pivotal connection between link 2097 (Figure 75) and lever 2079 engages the depending arm of lever 1151 (see also Figure 62) as the carriage is dipped, rocking lever 1151 clockwise and carrying an ear 1154 thereon to a position directly beneath the extreme forward end 2000 of the lever 2047 thus preventing counter-clockwise movement of said lever for the purpose of bringing the interponent 1952 into cooperative relation with the ratchet 1957 to initiate setting clutch operation until the carriage rises. The shift interlock hereinafter described then holds lever 2047 until carriage shifting is completed.

In order to accelerate upward movement of the multiplier keys without adding to the difficulty of depressing them, an additional force is temporarily applied to them at the time of their release by the locking bar. Pivoted on cam follower 721 (Figure 49) at 2088 is a member 2086. Spring 2089 tensioned between the said member and the cam follower normally holds the former against shaft 611 as an end stop, but rocking movement imparted to the assembly by cam 708 carries the end of member 2086 down upon a pin 2087 fixed to lever 1900 supporting the parallel bar underlying the multiplier keys. Member 2086 may thus be lifted clear of shaft 611 and spring 2089 extended by cam 708 to urge the depressed multiplier key upwardly.

The latch bar returning mechanism above described is able to overcome spring 2040 and rock lever 2035 to raise the left end of link 2033 so that the setting clutch cannot be engaged a second time by the key held down.

When a multiplier key above the "1" key is depressed, the V-slot bar 120 (Figures 58 to 60) moves toward the right with the result that lever 2050 which hangs from shaft 2004 (Figure 58) and is spring urged to the left, is rocked by lever 2003 engaging its projection 2052. This removes ear 2053 from over the upturned end of the lever 2051 so as to permit spring 633 (Figure 41) to rock lever 632 and its roller 634 to latch the main clutch dog 395 until its release by the trip-off devices hereinafter described. The lever 2051 normally prevents latching of the main clutch dog through its contact with ear 2049 on the tail of latch 632.

To prevent lever 2050 from being displaced by depression of a higher multiplier key after the "1" key has been depressed, a blocking lever 2110 (Figure 58) is urged upwardly by spring 2111. The blocking lever 2110 is normally held down (as shown in Figure 58) by an ear 2112 on a bellcrank 2113 pivoted at 2114 to the lever 2051. The lug 620 on the main clutch dog 395 (see also Figure 41) engages the bellcrank 2113 when the main clutch is not in operation. When the main clutch dog is released, the lug 620 thereon moves upwardly permitting spring 2111 to swing the blocking lever 2110 into its blocking position behind the ear 2053 on the lever 2050. Lever 2051 is urged in a clockwise direction by a spring identical to the spring 2111 and disposed directly behind the spring 2111 (as viewed in Figure 58).

To stop the machine after a predetermined number of multicyclic operations have occurred, cams 2021, 2023, and 2024, and bellcrank 2022 are employed. As appears in Figure 64, the right hand face of cam 2021 has a lateral cam face at 2070, so that at the beginning of a clockwise or counter-clockwise rotation of cam 2021 the tip 2071 of the universally pivoted bellcrank 2022 is moved aside and rides along the outside face of the cam until the high point thereof has been passed, when the bellcrank end is moved back into cooperative relation with the peripheral face of the cam by spring 2122 which includes a pin 2123 therein to act as a guide for the spring and to centralize lever 2022. As the cam approaches the end of its rotation, the bellcrank is rocked in a counter-clockwise direction. This rocks lever 2072 clockwise about its pivot and rocks lever 2117 counter-clockwise. Lever 2117 is pinned to shaft 626 which, as appears in Figure 41, is the same shaft to which the main clutch dog latching lever 632 is pinned; thus, this counter-clockwise movement of lever 2117 also rocks the lever 632 in a counter-clockwise direction to release the main clutch dog.

The inside face of cam 2023 (Figure 64) is provided with similar cam faces, as appears at 2076, so that a roller 2077 on bellcrank 2022 first rides about the outside face of that cam and then onto the peripheral surface of the cam to ride over the high point thereof, irrespective of whether the cam is rotating in a clockwise or a counter-clockwise direction. When a "2" selection is made, and cam 2024 is rotated by gear 2020, the cam follower 2022 follows the periphery of the triangular-shaped cam 2024, under the pull of spring 2122, and rocks levers 2072, 2117, and shaft 626 upon riding over the high point of the cam 2024. Either of these operations releases the main clutch dog latch and stops the machine as hereinbefore described.

Back lash in the gear train driving gear 2020 ordinarily insures such trip-off during the second cycle, but a lost-motion keyed connection between cam 2024 and its gear 2020 as shown at 2024a, is preferably provided.

To prevent rotation of gears 2017, 2018, and 2019, when a selection is made on any one of gears 2013, 2014, 2015, 2016, or 2020, a pawl 2080 (Figure 59) is provided which is held by spring 2081 in engagement with one of the gears in the group of 2017 to 2019, inclusive. A similar pawl is provided in connection with gear 2020 so that when a selection is made with any one of the gears of the groups 2013 to 2016 inclusive, or 2017 to 2019 inclusive, gear 2020 is held.

Another pawl 2083 (Figure 59) is associated with the group of gears 2013 to 2016 inclusive, through a notched cam 2082 which cam is keyed to the sleeve which supports said gears. A spring 2084 normally urges this pawl downwardly so that it will be received by a notch in the cam 2082 to hold the gears 2013 to 2016 inclusive in a centralized position when they come to rest. A pawl 201, loosely keyed on shaft 202, cooperates with gear 2009 in the same manner as the other pawls 201 cooperate with gears 189, as has been described in connection with Figures 2 and 14.

Multiple addition and subtraction operations can be secured by depressing the addition bar or the subtraction bar simultaneously with depression of a multiplier key. The effect of depressing the addition bar and subtraction bar is to prevent a carriage shift operation from following the multiple operation, and to clear the keyboard so that thereafter other values can be entered. The disabling of the shift at the end of a multiple addition operation will be presently described in detail. The clearing of the keyboard has been previously described in connection with the addition bar.

Depression of the zero key is effective to rock member 2090 secured to shaft 2091 to initiate operation of the shift mechanism, in the manner presently described. While this movement also depresses lever 2035 and thereby causes movement of link 2033 to some extent, the operating parallel bar 2030 is not depressed and link 2033 is not moved to the extent necessary to cause operation of the setting and main clutch. Movement of lever 2035, however, brings extension 2062 into notch 2092 in the key locking bar 2055 to move the bar and lock the value keys when the zero key is depressed.

The lever 2090 which is rocked downwardly by depression of the zero key, is normally urged upwardly by a spring 1140, and its lower end engages with a stop 1141 (see Figure 75) to limit its downward movement. An extension 1142 on the lever 2090 engages a pin 1143 on a long link 1144 which is pivoted at its opposite end to a lever 1145. The lever 1145 depends from, and is keyed to a shaft which initiates the carriage shift, as will hereinafter be described.

If the zero key were to be held down until the latch bar 2055 returned to its latching position it might be permanently latched down by engagement of its extrusion 2015 under the latch bar. In order to prevent this, a pivoted spring-urged lever 1146 (see Figure 75) is provided with an ear at its right hand end to engage with a notch 1147 in the lower edge of the latch bar. A shelf 1148 on the lever 2090 normally holds the lever 1146 out of engagement with the latch bar, however, permitting it to come into engagement therewith only upon depression of the zero key which lowers the lever 2090. Thus, when the zero key is depressed, the lever 1146 engages with the notch 1147 to prevent the latch bar from moving to its latching position, and upon release of the zero key, the lever 1146 is rocked in a clockwise direction to free the latch bar from this restraint.

If the zero key is depressed while the machine is running out a multiplication initiated by another multiplier key, however, it must be locked down until the carriage shift which it is to initiate has taken place. Link 2097 (Figure 75) which is displaced to the left by the dipping of the carriage is adapted to engage an ear 2099 on latch 1146 to prevent the latter from engaging in notch 1147 under these circumstances and lock bar 2055 may therefore lock the zero key down until it is retracted as an incident to the carriage shifting operation upon rocking of lever 2058 (Figure 62) by arm 1394 of member 1396. This takes place at the very end of the shift operation following the multiplication so that a second shift will follow if the zero key has been latched down.

To insure the occurrence of a single additional shift rather than a plurality of successive shifts upon depression of the zero key, the link 1144 is raised to permit its pin 1143 to ride over the top edge of the extension 1142 on the lever 2090, thus letting the shift mechanism return to its neutral position. This raising of the link 1144 is accomplished through lever 1396 (see Figure 62) which, as will appear under the description of the shift mechanism, is rocked in a counter-clockwise direction upon each shift initiated by the zero key. This lever 1396 has an ear 1149 engaging the right hand end of a floating link 1150 to move this link to the left and rock a lever 1151 which is pivotally supported on a shaft 1152. The lever 1151 is urged counter-clockwise by spring 1159 and has a downwardly depending arm pivoted to the floating link 1150 so that its rocking thereby will be in a clockwise direction.

An ear 1153 adjacent the left hand end of the lever 1151 (see also Figure 75) underlies the link 1144 to engage with said link and lift it to a position where its pin 1143 will override the extension 1142, as stated above.

The short cut multiplication mechanism is under control of a key 1120 (Figures 1, 80, 82, and 83) positioned just to the left of the multiplier key (Figure 1). This mechanism is employed to effect negative multiplication operations and thus make possible a reduction of the machine operations necessary to perform multiplication where the multiplier contains numbers greater than "5." For example, a multiplier such as "48" normally requires depression of the "4" key and the "8" key with twelve ensuing main clutch cycles to complete the operation. To accomplish a short-cut with this multiplier, the operator may depress the "5" key to result in multiplication by "50" and then depress the short-cut key and the "2," obtaining the same product with but seven main clutch cycles.

The short-cut key 1120 has a slotted key stem 1121 guided for vertical reciprocation on pins 1122 and normally urged upwardly by a spring 1119. An ear 1123 on the short-cut key stem engages a lever 1124 (Figure 82) to rock the same upon depression of the key to impart rocking movement to the pendular lever 545 through an ear 1125 formed on an extension thereof. This lever 545, as previously described and as shown in Figure 34, conditions the main reverse unit for negative operation.

The short-cut key is latched down by a pawl 1126 which is urged in a counter-clockwise direction by tension spring 1127. This pawl engages a shelf 1128 formed at the lower end of the key stem and is released to permit return of the short-cut key at the end of the setting clutch cycle by means of a lever 1129 which is rocked against an ear 1130 on the tail of the pawl, the lever 1129 being engaged through a pin and slot connection with a lever 1131 pinned to the same shaft 752 to which the lever 750 is pinned. The shaft 752 is rocked by the lever 750 through link 748 which operates from the setting clutch line as appears in Figure 41. In the event that the operator is riding the short-cut key during the unlatching of the pawl 1126, a blocking lever 1132 urged clockwise by a spring 1133 moves in front of the upper end of the pawl 1126 to retain it in its unlatched position. This insures return of the short-cut key whenever the operator removes his finger from the same and during return the shelf 1128 at the lower end of the key stem engages and moves the blocking lever 1132 counter-clockwise permitting the pawl 1126 to resume the position wherein it will again latch the short-cut key the next time that it is depressed.

A blocking lever is provided to prevent depression of the short-cut key while a multiplier key is depressed and likewise to prevent latching down of a multiplier key and starting of the machine, if the short-cut key is only partially depressed. This blocking lever 1134 (see Figures 82 and 83) pivots about a pin 1135 and has an ear 1137 at its lower end engaging a notch in the multiplier key latch bar 2055. Upon depression of a multiplier key the latch bar travels to the left and swings the blocking lever 1134 so that its hook-shaped upper end underlies an ear 1138 formed on the edge of the short-cut key stem. This prevents depression of the short-cut key and also prevents latching down of the multiplier key if the short-cut key is partially depressed. The multiplier keys are rendered ineffective by partial depression of the short-cut key, because the ear 1138 lies in the path of the head of the blocking lever 1134, thus preventing left hand movement of the multiplier key latch bar 2055 which must occur upon depression of the multiplier key before operation of the machine can be initiated. When the short-cut key is fully depressed, the ear 1138 lies below and out of blocking position with respect to the head of the blocking lever 1134.

When the short-cut key is depressed, it is latched down as has just been described, until the end of the setting clutch cycle. In the event that the short-cut key should be depressed inadvertently, it would be obviously undesirable to require a setting clutch operation to effect its release. Therefore, release of the short-cut key under such conditions is placed under control of the stop key 985 (see Figure 80) which is effective to move a lug 1139 to engage and rock the pawl 1126, releasing the short-cut key from its depressed position. The additional functions and operations of the stop key will be described in detail under the description of the division mechanism.

It will be observed that if a multiplier key 2001 is partially depressed at the time the addition bar 800 or the subtraction bar 860 is depressed, the locking slide 2055 will be blocked by the extrusion 2015 and the left end of link 2033 (Figure 62) will not be lowered. Link 2047 therefore cannot lower sufficiently to initiate a setting clutch operation, although there is no interference with the depression of the bars 800 and 860 (Figures 53 and 54), and they may be latched in depressed position by engagement of the upper portion of lever 728 under ear 726. With the parts so positioned, spring 730 will depress pin 734 as soon as the partially depressed multiplier key is either fully raised or fully lowered so as to permit lock bar 2055 (Figure 62) to move further leftward, and the setting clutch operation will then ensue. If the multiplier key is raised the operation following will be merely that initiated by the depresed bar 800 or 860 alone, but if the key is depressed, a multiple addition operation such as has been previously described, will follow.

*Shift mechanism*

Power driven means are included in the present machine for shifting the carriage 250, either to the right or to the left. The controls for this shift permit an automatic one step shift of the carriage after each automatic multiplication or division operation until the last carriage position is entered; a one step shift controlled by depression of the zero multiplier key (Figures 1 and 75); as well as means disabling the shift during multiple addition or subtraction operations (Figure 71). There is also a non-shift key 1200 which functions to disable the shift mechanism, except in division, and a pair of keys 1201 and 1202 which control the direction of shift during automatic shift operation in multiplication.

Movement of the carriage by the power driven mechanism is immediately under the control of a member 1300 (Figures 67 and 70) supported on a shaft 1301. This member is connected by a link 1374 to a lever 1375 which is rocked counterclockwise or clockwise about shaft 1376, to move member 1300 likewise. The link 1374 includes a flexible connection comprising a spring unit 1373, similar in construction to the unit 723 of Figure 50, to insure against misoperation by depression of a shift key for one direction while the shift is functioning in the opposite direction. When member 1300 is moved clockwise, hooked arm 1302 on a common sleeve therewith is positioned in engagement with toothed wheel 1303 to cause shaft 334 (Figure 68) to be rotated to shift the carriage to the right. When member 1300 is moved counter-clockwise, it positions its point 1304 in engagement with star wheel 1305 to cause shaft 334 to be rotated to slide the carriage to the left. The engagement of the toothed wheel 1303 or of the wheel 1305 results in the selective turning of the shaft 334 through the following mechanism.

A gear 362 (Figure 68), driven by idler 647 (see also Figure 52), is secured to a shaft 1306 which is positioned between the center and right side frames. Gear 648, also driving the setting clutch, is also secured relative to shaft 1306 by a member 1307, which is keyed to the hub of gear 362. Member 1307 is secured by rivets to the gear 648, the same rivets fixing a spider 1309 to said gear.

An internal ring gear 1315 is welded to the spider 1309. This gear is in mesh with three planetary gears 1316 (see also Figure 67), riveted to one end of shafts 1317 which have gears 1322 formed intermediate their ends. These shafts extend through openings provided in the toothed wheel 1303, a plate forming bearings for their outer ends and the gears 1316 thereon also mesh with a sun gear 1320. The sun gear 1320 is formed upon an end of sleeve 1321 to which star wheel 1305 is keyed, shaft 1306 being turned down to receive the sleeve 1321. Gears 1322, formed on the shafts 1317, mesh with sun gear 1327 to which is secured gear 1324.

Gear 648 is always rotated when the motor is rotating, so that the ring gear 1315, planetary gears 1316, and their associated gears 1322 turn idly. If the toothed wheel 1303 is held, however, by hooked arm 1302, revolution of the planetary gears 1316 and 1322 is prevented and the planetary gears serve to rotate the sun gear 1327 and its associated gear 1324 to turn gear 1326 with which gear 1324 is in mesh. If, however, the star wheel 1305 is held by point 1304 rocking into engagement therewith, sun gear 1320 will be held stationary and the planetary gears 1316 and 1322 will both revolve and rotate with the internal ring gear 1315 whereby the gear 1324 will be driven in the opposite direction and the rotational direction of gear 1326 is utilized to effect a shift of the carriage in either direction.

The gear 1326 is rotatably mounted on a shaft 1331 between friction discs 1330 and 1332 keyed to said shaft. Sleeve 1333 is also rotatably mounted on the shaft 1331 and supports a cam 1334 thereon (Figures 68 and 69) while a centralizer disc 1335 is keyed to the shaft 1331. Spring 1337 is compressed between washer 1338 and lock nuts 1339 on the threaded end of shaft 1331. This construction provides for the support of gear 1326 on the shaft 1331 and for a friction drive connection effected by discs 1330 and 1332 which are keyed to shaft 1331 and pressed against the gear 1326 by spring 1337 bearing against the washer 1338, the centralizer cam 1335, and the spacer 1333.

The shaft 1331 is supported in a suitable bearing 1340 provided in the left control plate 524 of the machine. A bevel gear 1341 is fixed on the end of the shaft and meshes with bevel gear 1342 mounted on the lower end of vertical shaft 334. Shaft 334 is supported in an adjustable angle bracket 1343 secured to the base plate of the machine and carrying a sleeve bearing 1344 riveted to the angle bracket and which supports an end of the shaft 1331.

When link 1374 is first moved to either the right or left, latch lever 1350 (Figure 67) is released from against ear 1354 to rock about shaft 1351 under the pull of spring 1352 and seat its projection 1353 either above or below ear 1354 on member 1300 so that the member 1300 is latched, and rotation of the unit commences.

Upon rotation of shaft 1331, lever 1350 is moved by cam 1334 (Figure 69) to release the ear 1354 at about the middle of the cycle.

It is noted that the cam 1334 includes two opposite steep rises over which the nose 1357 rides. Upon clockwise rotation of the cam from the position shown in Figure 69, the nose 1357 rides over one of these at about the middle of the cycle. To secure the same cyclic time of operation of the lever 1350, the cam 1334 is free on the shaft and is driven by the centralizer disc 1335. As appears in Figure 69, this disc includes two shoulders 1360 on opposite sides thereof. Upon counter-clockwise rotation of the centralizer disc 1335 from the position shown in Figure 69, pin 1361 on cam 1334 is engaged immediately and the cam is rotated. However, upon clockwise rotation of the centralizer disc, the pin 1361 is engaged by the notch in the opposite side only after the centralizer has rotated nearly half a revolution so that the rocking of the arm 1350 and disengagement of the ear 1354 occurs at the correct cyclic time.

A centralizer disc 1362 (Figures 67 and 68) carries two rollers 1363 against which an arm of bellcrank 1364 bears under the pull of spring 1369 so as to centralize the drive unit as well as the shaft 334 on the carriage proper.

In automatic division and multiplication operations, except when the carriage is in the left end position, link 1374 is moved to the left (Figure 67) to engage point 1304 with the star wheel 1305 to secure an automatic shift of the carriage one step to the left after the operation has been completed. The operation of link 1374 in division will be described presently, while the construction of the mechanism associated with the link and its movement in automatic multiplication operations is here disclosed.

The link 1374 (Figure 70) is extended between member 1300 and lever 1375 pivotally mounted on shaft 1376. A lever 1377 (Figure 94), having a cam edge 1378 adjacent its left end, is secured by a pin 1379 to a lever 1380. The lever 1380 is pivotally supported on shaft 1376. The lever 1380 also carries a dog 1383 having a shoulder formed thereon to engage extension 1384 on the link 1374 (Figure 70). The right hand end of lever 1377 is formed with nose 1385 which normally lies below and against a tripping ear 1386 (Figure 46) operated by the carriage dipping and raising devices so that when the said ear is moved to the right (Figures 46 and 94) a spring 1382, acting through a lever 1392, may raise lever 1377 so that its nose lies to the left of the ear 1386. This counter-clockwise movement of lever 1377 is limited by a shoulder 1390 which engages with the extension 1386. Upon the following restore clutch operation and raising of the carriage, the cam levers 570 are rocked in a counter-clockwise direction and extension 1385 pushes lever 1377 to the left so that the dog 1383 may pull link 1374 to the left and thus engage point 1304 with star wheel 1305 and start a shift of the carriage to the left, the dog 1383 having been raised to engage the extension 1384 by the shift direction control key 1201 (Figure 71) through mechanism presently to be described. Ear 1386 is pivotally mounted on one of the cam followers 570 and urged counter-clockwise against a stop by a stiff spring which is interposed merely to permit yielding rather than distortion of parts under certain locking conditions.

To ensure that the shift is limited to a single step, lever 1377 is rocked clockwise and is disengaged from extension 1386. It will be recalled that during the shift operation cycle, cam 1334 (Figure 69) operates to move lever 1350 in a counter-clockwise direction to remove lever 1350 from engagement with extension 1354.

A lever 1355 (see Figure 94) pivoted on a shaft 1351 and urged to swing clockwise by a spring 1359 is engageable by the rollers 1363 on the disc 1362 upon rotation of said disc, whereupon it will be swung in a counter-clockwise direction. A leftward extension of the lever 1355 engages with the setting clutch shaft 431 to limit the clockwise movement of said lever and thus control the time at which it is engaged by the roller 1363 to impart its counter-clockwise rocking movement. Upon counter-clockwise movement of the lever 1355, a stud 1356 thereon engages with the downwardly extending tail of the bellcrank 1387, thus causing the shelf 1389 thereon which lies beneath lever 1377 to move upwardly and rock lever 1377 clockwise to release its nose 1385 from extension 1386. The member 1300 is thus freed from restraint and can be released and centralized as previously explained. The above described shift occurs automatically after each multiplication operation, unless the control is disabled as hereinafter described.

Since during the shift operation, the setting clutch, the main clutch and the restore clutch are not operating, the circuit to the motor is not closed by their controls. The shift mechanism includes means for closing the circuit independently of these. Rocking of lever 1380 about shaft 1376 is effective to move links 1412, 401, bellcrank 402, and link 404 (Figures 28 and 94) to close contacts 391 in the motor circuit. Lever 1410 hangs from a pin 1411a adjacent to lever 1380 and the end of lever 1410 is connected by pin 1411 to a link 1412. The links 1412 and 401 are joined by the screws 1413a extending through slots in each of the links so that the overall length of the links can be adjusted.

When the lever 1380 (Figure 94) is moved in a counter-clockwise direction, it engages against extension 1413 on lever 1410 to rock that lever in a clockwise direction and pull links 1412 and 401 to the left whereby member 402 is moved in a clockwise direction to permit the contacts 391 to engage and close the motor circuit, as has been described in connection with Figure 28.

A pair of guide fingers 1415 are adjustably secured to the lower end of lever 1410 and the uppermost of these guide fingers is formed with a shoulder against which the lower end of lever 1380 abuts. Thus when lever 1380 is moved in a clockwise direction, it engages this shoulder and rocks lever 1410 also in a clockwise direction, whereby links 1412 and 401 are pulled to the left to permit closing of the contacts (Figure 28).

Movement of lever 1410 thus closes the circuit upon operation of any of the shift controlling means. Since the carriage is only shifted when the main clutch and setting clutch are not in operation, and since the operation of the setting clutch and main clutch is controlled by depression of the main operating bar, an interlock is provided to prevent depression of the main operating bar and consequent operation of the setting and main clutches whenever the shift mechanism is operating. To this end, a lever 1416 (Figures 39 and 70) is pivotally mounted on shaft 1417 and is connected by link 1418 to the end of lever 1410. Whenever lever 1410 is rocked in a clockwise direction, lever 1416 will be rocked likewise in a clockwise direction to bring its upper edge 1419 beneath extension 1420 on the main operating bar link 505 to temporarily block lowering of the main operating bar until the circuit is opened and the shift has consequently come to an end. The lever 1416 then recedes permitting setting clutch operation to proceed if the main operating bar has been released in the meantime.

The member 1300 is disengaged and centralized at the end of the shift operation by member 1410. This member is rocked clockwise about its pivot 1411 by lever 1375 (Figure 70) so that spring 1400, which extends between pin 1401 on a frame member and extension 1402 on member 1410, is tensioned. When link 1374 on lever 1375 is released, during a shift cycle the lever 1350 (Figure 67) serves to retain the member 1300 in its shift controlling position until practically the end of the cycle, as has been explained. The spring 1400 is then capable of rocking lever 1375 and moving link 1374 to position member 1300 as it appears in Figures 67 and 70, momentum and the centralizer 1364 completing the operation.

Depression of the zero key in the multiplier row is also effective to initiate a one-step shift of the carriage to the left and to disable the other shift control keys as well as the multiplier keys. As has already been described in connection with the zero multiplier key, depression of this key is effective to rock lever 2090 (Figure 75) which engages and moves link 1144 to the left, this link being connected with lever 1145 fixed to shaft 1157 to which there is also fixed a bifurcated arm 1158 embracing the pivot of dog 1383 on lever 1380 to effect a swinging to the left thereof and a movement to the left of the dog 1383. Thus a shift operation is initiated in the manner described in connection with Figure 94.

Since the zero multiplier key does not institute a main clutch cycle, the carriage is not dipped and consequently the restore clutch is not operated, so that extension 1386 (Figure 94) is not moved to release lever 1377. Accordingly, when lever 1355 is rocked by the centralizer disc 1362 at about the middle of the shifting clutch cycle, an arm 1391 pivoted to lever 1355 is moved to the left (Figures 62 and 94) to strike ear 1393 on lever 1396 (Figure 62) to release the zero key through arm 1394 of lever 1396 and lever 2058. A link 1403 connects lever 1392 to arm 1391 so that whenever lever 1392 is in that position shown in Figure 94, the arm 1391 can engage against ear 1393. However, if extension 1386 is rocked upon dipping of the carriage, link 1403, upon upward movement of levers 1377 and 1392, moves the arm 1391 so that subsequently, if lever 1355 is rocked, the ear 1393 is not struck. However, during the shift operation occasioned by the zero key, lever 1377 remains in that position shown in Figure 94, and arm 1391 is in the position wherein it can engage ear 1393 upon rocking of the lever 1355. The ear 1393 is carried on one arm of the member 1396 supported on shaft 1395 and pulled to the right (Figure 62) by spring 1404.

Initiation of the setting clutch operation can not be effected by a multiplication key during a shift operation due to a tail 1155 fixed to the blocking member 1416 (see Figures 62 and 70) which carries an ear 1156. Upon clockwise movement of the blocking member 1416 which occurs during a shift operation, the tail 1155 is swung upwardly until the ear 1156 thereon underlies the lever 2047 to prevent downward movement thereof to bring the interponent 1952 into cooperative relation with the ratchet 1957.

If the zero key is depressed while the machine is running out an operation initiated by previous depression of a multiplier key, the shifting operation must be delayed until the conclusion of the previously initiated operation. In other words, the digitation must be followed first by an automatically initiated one-step shift and then by another one-step shift initiated by the "zero" key. In this situation the mechanism operates as follows.

Assume that a "nine" multiplier key has been depressed. Bar 503 (Figure 39) will be lowered to rock frame 505 downward. Lug 1420 on said frame will thus be brought into blocking relation with the right side of lever 1416 (see also Figure 70) preventing clockwise movement of said lever and thus preventing clockwise movement of the shift centralizer 1410 to which lever 1416 is connected by link 1418. Locking of the centralizer 1410 in this manner, locks the shift control member 1375, until the setting clutch functions.

Upon operation of the setting clutch, lug 1420 (Figure 70) is removed from the path of lever 1416 thus releasing this lock. This is caused by counter-clockwise movement of lever 520 (Figure 40) caused by cam follower 570 which causes shelf 521 on lever 520 to engage and release the latch 514 from the setting clutch dog, thus permitting 503 to rise under the influence of spring 510.

The shift mechanism is not freed for operation, however, because during the carriage dipping operation, an ear 561 (Figures 46 and 70) on the carriage dipping cam follower 570 moves into a notch 563 in the shift control member 1300 preventing it from rocking in either direction during the time the carriage is dipped.

Also as an incident to this carriage dipping operation, links 1713 and 2097 (Figure 75) move to the left, rocking lever 1151 clockwise to carry its ear 1153 against the link 1144, overcoming spring 1144a and lifting the link so that its pin 1143 will be held above the path of movement of extension 1142 on member 2090 and depression of the zero multiplier key will have no immediate effect. During the later portions of the setting clutch cycle, as earlier described, the multiplier lock bar 2055 is retracted, and at any time thereafter the zero multiplier key may be depressed and locked down.

As the carriage rises at the conclusion of the multiplication operation the shift mechanism is automatically set into operation, as hereinbefore described, by the impingement of ear 1386 (Figure 94) against abutment 1385. As this operation is initiated (see Figure 75) member 1380 is rocked moving link 1144 to the left and permitting pin 1143 thereon to move off of the top of extension 1142 to a position adjacent the left end thereof. It being assumed that the zero multiplier key is locked down, the extension 1142 will prevent link 1144 from returning to the right when, during the first step of carriage shifting the abutment 1385 (Figure 94) is released from ear 1386 by the rocking of lever 1387, and a second step of carriage shifting will therefore ensue.

The zero multiplier key is not released during the first step of carriage shifting because, at the time when lever 1355 (Figure 94) is rocked, abutment 1390 of link 1377 is in contact with ear 1386 and lever 1392 is therefore rocked sufficiently clockwise to raise member 1391 to overshoot ear 1393, so that member 1396 (Figure 62) and key release lever 2058 will not be moved.

During the second step of carriage shifting, however, the parts are in the position shown in Figure 94 so that when member 1355 is rocked link 1391 will move ear 1393 to release the zero multiplier key. In order to insure that the shift will be arrested at this time even though the key be held down by the operator, the rocking of member 1396 (Figure 62) carries its ear 1149 against the end of link 1150 rocking the connected member 1151 to carry its ear 1153 (Figure 75) against link 1144 and move the pin 1143 on the latter free of extension 1142, so that link 1144 may return to the right to permit the arresting of the shift mechanism.

*Manually actuated shift*

The carriage may be shifted to the right or to the left by means of a pair of keys 1405 and 1406 respectively (see Figures 1 and 70). These keys are mounted on the usual vertically sliding stems which stems are connected by means of links 1407 and 1408 with a common pin 1409. A spring 1410a normally urges both of the keys 1405 and 1406 upwardly. Upon depression of the key 1405, the pin 1409 is moved to the right and upon depression of 1406 the pin 1409 is moved to the left. A stationary member 1417 guides the pin 1409 in either its right or left hand movement and also serves as an interlock so that neither one of the keys 1405 or 1406 can be depressed when the other one has been depressed. Either right or left hand movement of the pin 1409 will be transmitted through bifurcated arm 1482 to rock the shaft 1485 to which arm 1482 is pinned, clockwise or counter-clockwise, depending upon which of the keys was depressed. Disposed adjacent to each other on the shaft 1485 are two similar V-shaped members 1480 and 1481, each of which is provided with two facing lugs 1486. Spring 1490 is compressed between these four lugs so that a rocking movement in either direction may be transmitted from one of the V-shaped members to the other through the spring. Member 1480 is pinned to the shaft 1485 and is rocked by movement of the arm 1482 thus rocking the member 1481, which is free on the shaft 1485 and which has a downwardly extending tail pivotally connected to the link 1483 which is thus pushed to the right. This results in rocking of lever 1375 which, with its lateral projection 1471 normally engages the notch 1474 in the rearward end of link 1483. The link 1483 is supported with the notch 1474 in engagement with the end of lever 1375 by a link 1476 connected to the member 1026.

Thus, upon depression of key 1406 to initiate a carriage shift to the left, the link 1483 is moved to the right, imparting counter-clockwise movement to lever 1375 and left hand movement to link 1374 which conditions the member 1300 (see also Figure 67) with its ear 1304 in engagement with the star wheel 1305 as has been previously described.

When a right hand carriage shift is desired the key 1405 is depressed, thus moving the link 1483 to the left to rock lever 1375 in a clockwise direction. This rocking movement of lever 1375 moves the link 1374 to the right, causing ear 1302 of member 1300 to engage with ratchet 1303 thus reversing the driving direction of the carriage shifting mechanism.

*Manual control for direction of automatic shift and non-shift*

During multiplication operations of the machine, which include automatic carriage shift, it is desirable sometimes that the shift be in a left hand direction, and other times in a right hand direction. It is likewise desirable, in some instances, that the shift be disabled altogether. In order to control the direction of the automatic shift or to disable the shift when desired, the control keys 1200, 1201, and 1202 are provided (see Figures 1 and 71). Each of these shift control keys is mounted on a stem 1203, the three stems being substantially identical and being supported for vertical movement on pins 1204 and 1205. Each of the three stems is also provided with a spring 1206, normally urging it upwardly and each is provided with a laterally extending arm carrying an ear 1207. Carried on the pins 1204 of the key 1200 and the key 1201 is a latch member 1208. This latch member is provided with slots which surround the pin to permit sliding movement relative to the key and a spring 1209 normally urges the latch member to the left. The latch member 1208 is provided with three identical latching noses having inclined edges 1210 for cooperation with the ear 1207 on the three keys; thus, upon depression of any one of the shift control keys, its ear 1207 urges the latch member 1208 to the right against the tension of its spring 1209 and becomes locked beneath the nose 1208 when it is fully depressed and the spring 1209 returns the latch member to the left. Depression of any one of the keys will cause release of any key previously depressed.

In order to prevent two of the keys from being depressed and left down at the same time an interlocking plate 1211 is mounted for free sliding movement on the pin 1204 of the keys 1200 and 1201 adjacent the latch plate 1208. The interlocking plate 1211 is provided with a pair of upwardly extending wedge-shaped members 1213 which fall between the ears 1207 of the three keys. Depression of any one of the keys will cause its associated ear 1207 to engage with one of the wedges 1213 on the interlocking member 1211 and slide that member to a position where its wedges will block the ear 1207 of the other keys and thus prevent depression of the other keys. Through this means it is impossible to depress any two keys simultaneously, the width of the wedge-shaped member 1213 being greater than the spacing between the ears 1207.

When it is desired that an automatically initiated carriage shift take place in a left hand direction, the control key 1201 is depressed. The ear 1207 of this key engages the tail of a lever 1214 pivoted at 1215 and rocks this lever in a counter-clockwise direction so that a shelf 1216 at its right hand end engages and raises the dog 1383 into position for engagement by the ear 1384 (see also Figure 70) thus causing the automatically initiated carriage shift to take place in a left hand direction in the manner heretofore described.

The normal direction of automatic carriage shift is to the right and the function of the shift control key 1202 is therefore simply to release the shift control key 1201 or the non-shift key 1200, thus to insure a normal right hand shift. When the other keys have been released by depression of key 1202 (Figure 71) the dog 1383 will be urged clockwise for engagement with an ear 1217 by means of a spring 1218. The ear 1217, as appears in Figure 70, is carried by a lever 1219 pivoted at 1220 and having a pin and slot engagement with the shift control member 1375. Thus, under these conditions, upon left hand movement of the dog 1383, it will engage with the ear 1217 to rock the lever 1219 counterclockwise, imparting a clockwise movement to shift control member 1375 and a right hand movement to link 1374, thus rocking the member 1300 to a position where its ear 1302 engages with the ratchet wheel 1303 (Figure 67) to cause a right hand shift to take place in the manner heretofore described.

The automatic carriage shift in either direction may be disabled by depression of the non-shift key 1200 (Figure 71) which, through mechanism presently to be described, effects a lifting of the left hand end of lever 1377 (see Figures 71 and 94). In Figure 94 it appears that upon the raising of the left end of lever 1377, the right hand end thereof will be lowered so that the ear 1386 which is moved to the left upon raising of the carriage, will override the lever 1377 rather than engage it to effect a shift, as has been described.

The mechanism for disabling the shift upon depression of the non-shift key 1200 is illustrated in Figures 71 and 73. In these figures a rocking member 1221 is shown mounted on a shaft 1222. This rocking member comprises a leftwardly extending arm 1223, a rightwardly extending arm 1224, and an upwardly extending arm 1225. The upwardly extending arm 1225 is separately formed but mounted on the same shaft 1222 and has a slotted portion engaging an ear 1226 on the arm 1223 to cause the three arms, 1224, 1225, and 1223 to function as a single unit. In order to disable the shift, the non-shift key 1200 is depressed, swinging a link 1227 downwardly so that a pin 1228 thereon engages an inclined edge 1229 on the arm 1225 to swing the rocker 1221 in a counter-clockwise direction. An ear 1230 on the arm 1224 will thereupon raise a lever 1231 pivoted at 1232 and cause an extension 1233 thereon to lift the lever 1377 into the non-shift position.

The lower end of the link 1227 which carries the pin 1228 just described is slotted and guided on a broad-headed pin 1234 carried by a lever 1258 which will be described in detail in connection with the division mechanism. The automatic shift is disabled in multiplication operations as long as the non-shift key 1200 remains depressed. However, upon depression of either of the shift control keys 1201 and 1202 the non-shift key is released and drawn upwardly by spring 1206. A spring 1235 (Figure 73) then urges the rocker 1221 clockwise to its normal position, permitting the shift to take place automatically.

Disabling of the automatic shift upon operation of the plus or minus bars during addition and subtraction operations, is also effected through the mechanism disclosed in Figures 71 and 73. The add bar control member 728 which moves in a clockwise direction upon depression of either the plus or minus bars, as will be recalled from the description of Figures 53 and 54 carries an ear 1240, engageable with the left hand end of arm 1223 of rocker member 1221 to rock this member counter-clockwise and through the lever 1231 and lever 1377 disable the shift. In order to maintain the shift disabled when the add control member 728 is again moved in a counter-clockwise direction, a latch 1241 (see Figures 71 and 74) loosely pivoted at 1242 and urged in a counter-clockwise direction by spring 1243, falls behind an ear 1244 on the arm 1225 of the rocker member 1221. This causes the shift to continue to be disabled until such time as the carriage dip operates. The carriage dip causes a lever 1246 (Figures 71 and 72) to swing upwardly, this lever being carried by the same hub on the shaft 1152 as the lever 2079 which is operated by the carriage dipping mechanism (see Figures 62 and 75). When the lever 1246 is thus swung upwardly by the carriage dipping operation during the restore cycle, a finger 1247 pivoted thereto at 1248 and urged counter-clockwise by a spring 1249 moves upwardly so that its shoulder 1250 engages an ear 1251 upon the latch 1241 to release said latch and permit the rocking member 1221 to return to its normal position under influence of its spring 1235.

In the previously described disabling of the automatic shift under influence of the non-shift key 1200, the latch 1241 does not come into play due to the fact that an ear 1252 carried on an extension at the lower end of the non-shift key engages with an upwardly extending tail 1253 on the latch 1241, preventing said latch from coming into locking position.

Division

The machine of the present invention includes means for automatically performing problems in division. In such operations the dividend is set up in the accumulator, the divisor is set up on the keyboard, and the automatic division key is depressed. The machine thereupon carries out automatically the operation of dividing the divisor into the dividend and registering the quotient in the counter 1801, the carriage being automatically shifted after registration of each quotient digit successively. The operation consists of successive subtractions of the divisor from those digits of the dividend which are registered in orders of the carriage aligned with the actuating mechanism, and which may be called the "effective dividend." As the carriage is automatically shifted to the left, additional dividend digits are successively brought into alignment with the actuating mechanism until the carriage reaches its leftward limit.

In performing such an operation it is necessary to shift the carriage when the aforementioned subtractions have reduced the effective dividend to a value below that of the divisor. Prior machines have done this automatically by utilizing the overdraft registration of nines across the accumulator to initiate, first a corrective addition cycle, and then a carriage shifting operation. The present machine, however, provides mechanism for mechanically comparing the dividend and divisor and utilizing the indication of their relative magnitude, thus secured, to select the proper ensuing operation. All overdrafts, which have heretofore been necessary only for control purposes, can theoretically be eliminated by the use of such a mechanism, but in practice it is not practicable to set the controls to such a fine adjustment, and some overdrafts do occur. These are, however, properly corrected by the mechanism provided.

Keyboard controlled mechanism

It will be recalled, from the description of the accumulator mechanism of the present machine, that when the carriage is dipped to bring the accumulator in position for operation by the actuating mechanism, the numerals registered may be moved out of alignment with the sight openings since each accumulator element assumes a position indicating not only the value registered on itself, but is also moved ahead to indicate such partial increments of an additional unit as have been transmitted to it from lower orders by the entrained carry mechanism. It is therefore necessary to provide mechanism for forming a similar representation of the divisor value in the decimal orders selected for effecting control of the operation.

Levers 900 (Figure 89) carrying sensing shelves 901 are adapted to be proportionately positioned, under control of the manually set selection mechanism of a plurality of keyboard orders, so as to form such a mechanical representation of the true rather than the decimal value set up in one order and that to the right thereof. According to the present invention, it is unnecessary to transmit partial increments to each lever 900 from keyboard orders below the next adjacent order, and no provision for it is therefore disclosed.

Each sensing lever 900 (Figure 90) is pivoted by pin 902 on a supporting lever 903 and is urged to rock counter-clockwise by a torsion spring 904 tensioned between member 903 and the sensing lever 900. The lever 900 includes a stop lug 905 (see also Figure 87) which overlies and engages member 903 (Figure 90) to limit the movement of the lever 900, and a blocking tail 906 is also provided which may be positioned to permit a gate 907 to rock in a clockwise direction and prevent further actuation, or to block the gate from rocking and thus cause the machine operation to continue, as will presently appear.

Supporting levers 903 are pivotally supported, in each order, between adjacent brace plates 142, as appears in Figure 92, and each includes a bridge 913. Upon an extension 914 of each bridge 913 is fixed a small sleeve 915 having a pin 916 slidably positioned therein, and also enclosing a spring 917 adapted to push the pin to the left to engage head 918 on the pin with the end of the sleeve to limit the travel of the pin. The pin of each order extends through a hole in each brace plate into the lever 903 of the next higher order to support both the lever 903 upon which it is carried and the corresponding lever 903 in the next higher order. This construction, as contrasted with the use of a solid continuous line shaft, not only permits easy removal of the parts for servicing, et cetera, but, as will presently appear, permits certain members to swing across the center line of pins 916.

A spring 920 (Figures 88, 89, and 90) urges the assembly, including the levers 903 and the levers 900 with their sensing shelves 901 clockwise about pivot pins 916 to normally hold them in an inoperative position. Each supporting lever 903 and sensing lever 900 may be rocked counter-clockwise as a unit about the pivot provided by pins 916 by a balancing lever 908 pivoted at 909 to the lever 903, and having limited movement relative thereto. The lever 908 carries a pin 910 overlying a cam 911 pivoted to the shaft 912. The selection segment 132 is fixed to a hub 921 to which is also fixed a lever 922. A stud 923 passes through both the selection segment 132 and the lever 922 to strengthen them and insure against their relative rotation. Carried by the lever 922 is a pin 924 which projects through a cam slot in the cam 911 to swing the cam about its pivot 912 upon rocking movement of the segment 132.

It will be recalled that the selection segment is rocked by depression of the keys on the keyboard and that the amount of its rocking movement is determined by the value of the key depressed. Therefore, the cam 911 is also rocked an amount depending upon the value of the key depressed, and its cam edge is stepped and graduated to control rocking movement of the balance lever 908 through its pin 910. This controls rocking of the lever 903 to elevate the lever 900 and the shelf 901 thereon to a degree also depending upon the value of the depressed key.

The balance lever 908 of each order underlies an extension 925 (Figure 88) of the selection segment 132 of the adjacent lower order, the connecting point between adjacent orders being so disposed that movement of the segment in any order will cause a movement of the lever 903 of the next higher order equal to one-tenth of the movement of the lever 903 in the lower order in which the segment was moved to be effected.

By this arrangement, lever 900 with its sensing shelf 901 may be raised about its pivot 902 a number of increments corresponding to the setting of its selection segment 132, plus an additional fraction of an increment decimally proportionate to the setting of the adjacent lower order selection segment.

To avoid undue loading of the key section, since the keys move the selection segments 132 directly, it is not desirable to move these levers 903 by the depression of keys, and since it is also necessary to keep the sensing shelves 901 out of range of possible interference with carriage elements except during certain portions of the division operation, mechanism is provided for normally maintaining all of the levers 903 and 908 raised out of cooperative relationship with cams 911 and for maintaining all levers 900 lowered sufficiently to avoid the possibility of contact with any carriage parts.

This is accomplished by mechanism including a plurality of levers 930 keyed for limited lost motion upon shaft 931 (Figures 89, 91, and 93), and having fingers 932 adapted to cooperate with lateral extensions 934 on levers 903. When the machine is not operating in division, and in division, until the setting clutch operates, the fingers 932 of members 930 are in engagement with these extensions 934 and hold levers 903 rocked about pins 916 in the position shown in Figure 91. This carries pins 910 of levers 908 sufficiently clear of cams 911 and lifts levers 903 so that the levers 900 pivoted thereon are pressed against a cross rod 935 and rocked clockwise against the tension of springs 904 to lower the sensing shelves 901 sufficiently to prevent their contacting any carriage elements.

The sensing shelves 901 associated with all orders to the right of the highest order in which a divisor digit has been set up are blocked out of operation and are not permitted to rise beyond the position in which they are held by the blocking mechanism. Connected by a separate sleeve 936 (Figures 89, 91, and 93) with each of the members 930, is a member 937 having a shelf 938 adapted to cooperate with a lug 939 on selection segment 132 of the adjacent higher order so that if the segment 132 of that order is advanced out of the zero position in which it is shown in Figure 91, the lug will overlie the shelf and prevent the member 937 from rocking with shaft 931, the loose keyway permitting its retention in this manner.

If one lever 937 is so blocked, all those to the right of it will be similarly blocked even though zeros are set therein, since edges 940 on each lever 930 overlie each member 937 to the right, as is clearly shown in Figure 93, and all sleeves 936 to the right of a blocked sleeve are prevented from rocking in this manner.

From the foregoing it can be seen that when a divisor is set up on the keyboard and the shaft 931 is rocked counter-clockwise, the following positioning of parts described will be assumed.

1. The extension 925 of the selection segment on which the leftmost, or highest digit of the divisor is set up will cause the sensing shelf 901 of the next higher order to be positioned a fraction of an increment above its zero position depending solely upon the digit set up in the highest keyboard order in which a digit is set up;

2. The shelves 901 of all higher orders will assume a zero position;

3. The lever 908 in the order of the previously mentioned selection segment of the highest order in which a digit is set up, and the extension 925 of the next lower selection segment, will jointly cause the sensing shelf 901 associated with the order in which the leftmost digit of the divisor is set up to be positioned so as to mechanically represent the actual value of the two highest digits of the divisor in their proper decimal relation of ten to one;

4. The sensing shelves 901 of all lower orders will be blocked out of operation.

*The division control bail*

The positioning of the sensing shelves 901 (Figure 89) in and to the left of the orders representing highest digit of the divisor, when a divisor is set up on the keyboard and shaft 931 is rocked, effects control of the division operation. When the aforementioned shelves are positioned, that shelf in the highest significant order, and the next shelf to the left thereof, may control movement of a bail 907 commonly known as a gate.

This gate is mounted for a swinging movement about pins 942 (Figures 84, 89, 91) and extends across the machine with a finger 943 extending rearwardly in each order between levers 903 and cooperating with adjacent blocking tails 906. Before shaft 931 is rocked, the gate is held away from the blocking tails and out of a controlling position. For a short period after shaft 931 is rocked, the gate is held before being released. Then, when the gate is released, it is pulled clockwise by spring 944 (Figure 84) until it engages one of the blocking tails 906 or, if it does not engage any tail, rocks through to that position shown in Figure 89, wherein it is effective to stop or prevent main clutch operation. However, so long as the gate is in engagement with a single blocking tail 906 and is prevented thereby from assuming that position shown in Figure 89, the main clutch may operate.

The fingers 943 which engage the blocking tails 906 are each slightly shorter than the finger in the next order to the left. A blocking tail in one order may therefore release the gate but the gate may only swing slightly before it engages the tail in the next lower order. The tail in that order may then block the gate from swinging through and so permits main clutch operation to continue.

The cooperation of the shelves 901 with the accumulator mechanism, will be described presently.

The gate 907 controls operation of the main clutch. A link 2115 (Figure 84) is pivoted at its upper end to a lever 2116 mounted on the gate pivot 942 and fixed for swinging movement with the gate by means of a pin and slot connection 2117. The lower end of the link 2115 is pivoted to a lever 2118 which rocks about the stud 2119. Thus, upon clockwise movement of the gate, the link 2115 is lowered to rock the lever 2118 and, through its pin and slot connection with a short lever 2120, imparts clockwise rocking movement to a shaft 2121. Rocking of shaft 2121 is effective to rock bell crank 2073 thereon (Figure 41), which has one arm adapted to contact with a lug on arm 2124 fixed to shaft 626 and rock the shaft counter-clockwise to release the main clutch dog 395 from restraining of the multicycle latch 632, stopping the main clutch. A second arm of the bell crank 2073 is adapted to contact with a lug 945 on the main clutch engaging interponent 603 and rock the interponent counter-clockwise about its pivot 604 on cam follower 746 to prevent its extension 615 from engaging the hook 616 of the main clutch dog 395. This prevents engagement of the main clutch by the setting clutch, unless the gate 907 is restrained by a blocking tail 906.

Initiation of division operation

The operation of the machine to perform a division calculation is initiated by depression of division key 970 (Figures 76, 79, and 81). This key, when depressed, is latched down and causes engagement of the setting clutch dog 394, conditioning of the reverse unit to ensure negative actuation of the main actuator, including gears 189 therein and rocking of shaft 931.

The division key 970 (Figure 81) is mounted upon a key stem 971 which is supported by parallel links 972 and 973 upon a frame plate in the control unit. The key stem 971 carries a roller 974 which lies in front of division control member 975 (Figure 79). Member 975 is rockably mounted upon shaft 976 and is urged clockwise by a strong spring 977 (Figure 76). When the division key is depressed, the roller 974 passes beneath face 978 on the member 975 and spring 977 rocks the member 975 clockwise until upper roller 979 thereon contacts the main operating bar 503 (see also Figure 39) and depresses said bar to rock the setting clutch dog 394, as has been previously explained. When the key is first depressed, extension 980 (Figure 81) on link 973 is brought into notch 981 on latch 982 and is held in the notch by the pull of spring 983 on arm 984, integral with 982, until the stop key 985 is depressed or until the last order is reached, as will appear.

The main reverse unit, previously explained in connection with Figures 34 to 38 inclusive, is also conditioned, upon depression of the division key, to insure negative operation of the main actuator. In Figure 79 a bellcrank 986 is shown mounted for pivotal movement about stud 987. When the division control member 975 is released and rocks clockwise, the roller 979 is brought into engagement with the lower arm of bellcrank 986 to rock it in a counter-clockwise direction. Bellcrank 986 includes an extension 988 which overlies extension 987 (Figure 34) on pendular lever 545, and this rocking of the bellcrank 986 thus rocks the pendular lever in a clockwise direction to condition the reverse unit for negative operation.

Rocking of the shaft 931 (Figure 89) and the levers 930 and 937 thereon, is effected under the control of the mechanism particularly shown in Figures 84 to 86A inclusive. A member 990 is fixedly keyed to the shaft 931 while another 991 is loose upon the same shaft. Latch member 992 is pivotally mounted on the frame at 993 and is urged by spring 994 into engagement with an ear 995 on member 990 so as to prevent premature counter-clockwise movement of shaft 931 to which the member 990 is keyed. These members also include extensions 997 and 998 respectively, for cooperation with a T-shaped member 999, pivotally supported on a rocking lever 1000 (Figure 95) pivoted on a shaft 501, and provided with a slot embracing pin 936 on cam operated lever 552. Upon rotation of main reverse cams 550 and 551 (see also Figure 34) on the setting clutch shaft 431, the T-member 999 is rocked down and then up. Depending upon the lateral position of the T-member, it may engage selectively either the extension 997 on member 990, or the extension 998 on member 991.

The T-member 999 is positioned by the division control member 975, this member carrying a pin 1005 (see also Figures 79 and 95) which extends into a slot in the end of rocking lever 1006, the lever 1006 being pivoted on a stud 994 on the right side frame. The T-member 999 carries a projection 1007 which extends into a slot 1008 in the lever 1006. When the division member 975 is rocked counter-clockwise, the T-member 999 overlies extension 997 while, when the division member 975 is rocked clockwise, to start a division operation, the T-member 999 overlies extension 998. With the T-member in the latter position, rotation of the reverse conditioning cams 550 and 551, is effective to bring the T-member 999 into engagement with the extension 998 and cause counter-clockwise rotation of the member 991 (Figure 85). Such movement of member 991, which is freely mounted on the shaft 931, first presses a lug 1010 on said member against the latch member 992, rocking it away from the ear 995 and freeing shaft 931 for counter-clockwise movement, under influence of springs 996 (Figures 89 and 91). The sensing mechanism comprising levers 903 and 900 is thereupon released to take up those positions determined by the set up values as heretofore described.

Such counter-clockwise rotation of shaft 931 enabling the sensing mechanism, is also effective to lock the carriage against lateral shifting movement (Figure 85). Member 990 keyed on shaft 931 is provided with an extension 1012 against which spring 1013 pulls lever 1014. Lever 1014 is positioned adjacent the right hand frame plate and includes an extension 1015 which is notched to engage a carriage brace plate 266 and retain the carriage against shifting movement until the extension 1012 is re-rocked in a clockwise direction so that the extension 1015 assumes that position shown in Figure 85. When the sensing mechanism is enabled, therefore, the carriage can not be shifted until the sensing mechanism is returned to its inactive position.

The gate 907 (Figure 84) is also released upon rocking of shaft 931 by a lever 1016 fixedly keyed to the end of this shaft. When this shaft is rocked, roller 1017 on lever 1016 rides up the curved edge of lever 2116 permitting clockwise movement of the gate 907 by spring 944, but to ensure that the several sensing shelves and their associated parts will have sufficient time within which to arrive at the positions dictated by the keyboard setting, the gate 907, although released upon counter-clockwise rocking of shaft 931, is temporarily held by other means until well toward the end of the setting clutch cycle and after the dipping of the carriage.

The several plates 214 (Figures 2 and 79) carry a shaft 213 which extends across the machine through all orders. Mounted upon a stud 1020 (Figure 84) on the control plate frame, is a delay latch 1021 which is urged in a counter-clockwise direction by spring 1022. When plates 214 are rocked in a counter-clockwise direction, upon initial operation of the setting clutch, as has been explained in connection with selection, the end of the delay latch 1021 is released by movement of the shaft 213 and is thereupon pulled in a counter-clockwise direction by spring 1022 to position its shelf 1023 in front of a shoulder 1024 of lever 2116. This prevents lever 2116 from rocking in a clockwise direction and prevents the gate 907 from rocking into operation immediately upon rocking of shaft 931.

At the end of the setting clutch cycle, after the carriage has been lowered by the carriage dipping mechanism (Figure 46) and gears 271 and 189 are meshed, plates 214 are rocked clockwise and the shaft 213 returns to engage the delay latch and force it clockwise to release gate 931 which is then pulled clockwise by spring 944 to engage one of its fingers 943 with the blocking tail 906 in that order of the keyboard which is in control.

Toward the end of the setting clutch cycle (assuming that the gate 907 has been restrained by a blocking tail 906), the cam 747 (Figure 41) will rock lever 746, moving the extension 615 of interponent 603 into engagement with hook 616 on the main clutch dog 395 and rocking the said clutch dog to cause transmission of power through the main clutch.

The multicycle latch 632 then engages the clutch dog 395, lever 2050 (Figure 58) having been rocked to permit it to do so, by a bellcrank on shaft 976 rocked clockwise by depression of the division key (Figure 76) by arm 1026 fixed to the division lever 975 and having an ear 1027 engaging a bifurcation in the lower end of bellcrank 1025.

Operation of the actuator is thus initiated and continues until the blocking tails 906 are moved to release the gate 907, or until the special stop key, hereinafter described, is operated.

Accumulator controlled mechanism and operation

The blocking tails 906 may be moved to release the gate 907 at the proper time, by elements of the previously described accumulator.

It will be recalled from the description of the accumulator mechanism that, when the carriage is dipped to bring gears 271 (Figure 2) therein into mesh with gears 189 in the actuator for actuation, the numerals registered on the dial shells may be moved out of alignment with the sight openings 318 since each accumulator element assumes an intermediate position indicating not only the value registered on itself but is also advanced such a partial increment of an additional value as has been transmitted to it from lower orders by the entrained carry mechanism. The dial, therefore, in the first order of the value set up in the accumulator, registers not only its own order value, but the decimal value of all lower values set in the accumulator.

It will also be recalled that snail cam 281 (Figure 22) moves with the dial shell and that lever 315 carries a roller 316 which may be pressed against the periphery of the cam so that the position of each lever will be a representation of the value position of its associated dial. This structure is used to control the release of the gate 907 at the proper stages in division operations.

Each roller carrier lever 315 has pivoted thereon, for limited movement, a lever 1040 (Figure 89) the nose of which can engage the sensing shelf 901 in the aligned order of the keyboard if that shelf is standing in either a zero position, or any position representing a value. Now, with the first five orders from the left in the accumulator reading "00024", the noses of the first two levers 1040 will stand practically at a zero cam position, the tail of the third will stand at a position corresponding to a 0.24 position on the cam 281, the fourth at a position corresponding to a 2.4 cam position, and the last at a 4.0 position.

If in the first five orders, from the left, on the keyboard are set "00008" and the shaft 931 is rocked, the first three sensing shelves 901 will assume their lowermost effective position, which in practice should be about equivalent to a .5 registration. The fourth shelf 901 will be positioned at an .8 registration by the mechanism described earlier herein, and the fifth shelf will be positioned at an 8 registration. Any remaining levers at the right will remain out of blocking relation with the gate, as previously set forth.

As the shaft 931 is rocked, the noses of the levers 1040 in the first three orders in the carriage, will be pressed against the shelves 901 and rock levers 900 clockwise so that the tails 906 thereof will be ineffective to block the gate. However, in the fourth order, the tail of the compounding lever will stand at a 2.4 value. Since this is a greater value than the .8 represented by its cooperating and opposite shelf 901, it will not contact this shelf 901 and the blocking member in this order, termed the "tens" order, will restrain the gate and the gears 189 will drive gears 271 negatively to subtract "8" from "24."

During the first cycle of subtraction, in the foregoing example the remainder in the accumulator will be reduced to "16," the dial in the fifth order being driven backward from "4" through "0" to "6." Since its original 4. registration was, in the first place, less than the 8. registered on the aligned keyboard order, the original rocking of the shaft 931 pressed the shelf 901 of this order against the nose of aligned lever 1040 so that the blocking tail 906 was moved out of the path of the gate 907 leaving said gate restrained by the blocking tail of the next higher order alone. As this dial passes from "0" to "9," in this first cycle, the conformation of cam 281 permits the spring 904 to raise the shelf 901 high enough to carry the blocking tail 906 into the path of the gate 907, but this is only a temporary condition, for as the dial progresses to its final 6. position, the cam 281 again raises the blocking tail out of the path of the gate. It should be noted, however, that the progressive shortening of the fingers 943 of gate 907, previously referred to, permits blocking tails to the right of the one which is holding the gate to drop into holding position at any time prior to full release of the gate.

Although the position of the lever 315 in the fourth order of the accumulator is changed from a 2.4 registration to a 1.6 registration during this first cycle, its aligned sensing shelf is positioned at .8 and hence is not moved out of blocking relation with the gate. A second subtraction cycle therefore ensues.

During this second subtraction cycle, the position of the lever 315 in this fourth order of the carriage is changed from a 1.6 registration to a .8 registration equaling the .8 registration position of the aligned sensing shelf, but still failing to rock the lever 900 to remove the blocking tail thereof from the path of the gate 907.

The lever 315 in the fifth order of the carriage is moved, during this second subtraction cycle, from a 6. registration downward to a 0. registration, upward to a 9. registration, and back downward to an 8. registration. The upward movement permits its associated blocking tail 906 to move into the path of a finger 943 of the gate 907 and the subsequent downward movement is insufficient to remove it from that position, so that at the close of the cycle both the fourth and fifth blocking tails 906 lie in the path of the gate 907 and another subtraction cycle ensues.

During the very first part of the third subtraction cycle, the downward movement of the fifth lever 315 in the carriage will be sufficient to remove its associated blocking tail 906 from the path of gate 907, leaving the gate held by the fourth blocking tail alone.

The registration of the fourth sensing shelf and its cooperating carriage lever were equal at the end of the second cycle, so that further lowering of the carriage lever during the third cycle immediately begins to rock the lever 900. A small movement of this lever is sufficient to remove its blocking tail from the path of the gate 907 which, thus released from restraint, is pulled clockwise by spring 944 rocking shaft 2121 (Figure 84) clockwise, and thereby rocking bellcrank 2073 (Figure 40) to carry the multicycle latch 632 away from the main clutch dog 395 and thus arrest operation of the main clutch.

In order to insure proper movement of "tens order" blocking tails, a compounding tip for lever 315 is provided in lever 1040 (Figure 89), pivotally mounted thereon. When cooperating with a sensing shelf in any registration from "two" to "nine," lever 1040 assumes a clockwise position abutting the stop 1045 on lever 315. As the lever 315 moves from a "one" to a "zero" registration, however, the tail 1041 of lever 1040 is pressed against the cross rod 268 so that the lever 1040 is rocked counter-clockwise on the lever 315 and its tip describes an arc about three times as long as between other positions. When functioning as a "tens order" control lever, the throw-off is always between "one" and "zero" and the compounding lever is brought into play for such control.

Rocking of the main clutch dog 395 by its spring 612 initiates operation of the restore clutch 700 in the manner previously described. Certain additional functions are performed under control of this clutch in division operations.

During the restore clutch cycle the dipping carriage is raised, and a link 846 (Figure 76) is moved to the left by cam 849 rocking lever 847 (see also Figure 78) counter-clockwise about its pivot 976. This operation rocks the division control member counter-clockwise by means of a bellcrank 1042 pivotally mounted on lever 847 and having a notched end adapted to engage the lateral extension 1027 on the member 975. A second bellcrank 1044 is freely mounted on shaft 976 and has one arm provided with a slot embracing a pin 1046 on the bellcrank 1042. A spring 1045 tensioned between the other arm of bellcrank 1044 and the frame, holds the bellcrank 1042 in position to engage the extension 1027 during the first part of the movement of cam 849, but causes the bellcrank 1042 to be rocked so as to override and miss the extension 1027 when the member 975 is in the position shown in Figure 76 when the cam operates. This movement of the member 975 carries its pin 1005 (Figures 77, 77A and 95) to the right, rocking lever 1006 (Figure 95) and, through lug 1007, the member 999, so that the T-shaped head of the latter overlies the lug 997 of member 990 (see also Figure 85) keyed to shaft 931.

The division member 975 is retained in its leftward position by latch lever 1050 (Figure 79) which is urged by spring 1051 to engage a lateral extension 1052 on the division member. The division control member remains latched in this position during the remainder of the division operation in that carriage position.

Return of the division member 975 is effective to set the reverse unit for positive actuation, and open the setting clutch for another cycle of operation. Division member 975 carries a link 1054 (Figure 79) provided with a notch 1055 which, upon the first forward movement of the division member, is spring urged into engagement with extension 1056 on a bellcrank 1057. Upon return of the division member, the bellcrank 1057 is rocked in a clockwise direction so that extension 1058 thereon presses down upon the main operating bar, as appears in Figure 39, to start a second setting clutch cycle. The bellcrank 1057 also carries a roller 1059 which, upon clockwise rotation of the bellcrank engages the pendular lever 545 (Figure 34) and rocks the link 547 to set the reverse unit for positive operation of the actuator by the main clutch.

Movement of the link 846 by the cam 849 (Figure 76) also rocks the gate 907 so that it may be relatched by the blocking tails if an overdraft has rendered the digits registered in the accumulator greater than those set up on the keyboard. For this purpose link 846 is provided with an extension 1060 adapted to rock an arm 1061 pinned to shaft 2121 and thus to rock the gate 907 (Figure 84) through levers 2120 and 2118 and link 2115. If the gate is not latched by the blocking tails, however, it will rock back as soon as the cam 849 permits it to do so, at the end of the restore clutch cycle.

As the restore clutch cycle terminates, the gate 907 is released unless it is held by the blocking tails, and is free to rock forward under the pull of springs 944. If the gate can pass through, as in the foregoing problem where there was no overdraft, bellcrank 2073 is rocked and interponent 603 (Figure 41) is moved by the initial rise of cam 747 so that it will pass beneath and miss the main clutch dog and main clutch actuation will not occur. If the gate is blocked, however, a main clutch actuation follows. The main clutch actuation, controlled by opening of the main clutch dog, depends upon whether or not an overdraft has occurred, for if an overdraft has taken place, it is necessary that a positive operation follow.

The initial small rise of the main clutch opening cam 747 (Figure 41), either hooks the extension 615 of the interponent 612 into the hook 616 of the main clutch dog 395 so that the main clutch will be actuated or else carries the extension under the hook so that operation of the dog can not take place. As the setting clutch cycle proceeds, the main reverse cam lever 552 (Figure 95) not only sets the reverse unit for positive rotation, but also rocks lever 1000 lowering member 999 which engages lug 997 and rocks shaft 931 to restore the sensing shelves 901 to the position in which they are shown in Figure 91, in which position they are lowered out of contact with the carriage elements. The shaft 931 is held in this position by the latch 992 (Figure 85). Rocking of the member 990 also brings its arm 1012 (Figure 85) against lever 1014 raising its extension 1015 out of locking relation with the carriage so as to permit a shifting operation.

In any event it is necessary that the corrective positive actuation, if initiated, be limited to a single cycle of operation. The corrective actuation takes place at a time when the division control member 975 is in its leftward position, as illustrated in Figure 76. In this position of the division control member 975 an ear 1027 at the lowermost end thereof rocks the lever 1025 (Figure 58) counter-clockwise through its engagement with a notch formed in the lower arm of said lever. This counter-clockwise movement of the lever 1025 permits movement to the left, of lever 2050 which carries ear 2053, to overlie the member 2051 and through the ear 2049 and the main clutch multicycle latch 632 (see also Figure 40) thus preventing engagement of the multicycle latch with the main clutch dog in the manner that has been described in connection with the multiplication operation. The main clutch dog therefore arrests operation of the main clutch after a single cycle of operation, and a second restore clutch operation proceeds in the usual manner.

If such a corrective cycle is not initiated, the restore clutch will be automatically engaged toward the end of the setting clutch cycle. Since, in such an operation, the main clutch dog 395 is not removed from the position in which it is shown in Figure 49, its extension 408 prevents any engagement of the latch member 701 under the M-shaped member 703 controlling the restore clutch, and as the carriage is dipped, engagement of the restore clutch is prevented only by engagement of the cam-rocked bellcrank 721 with the extension 720 of the M-shaped member. As the setting clutch cycle draws to a close, the cam 708 permits its bellcrank 721 to recede from under the extension 720 and, since the latch 701 is already held released by the extension 409 of the main clutch dog 395, the tensioned link unit 723 will cause the restore clutch to be engaged immediately.

Operation of the restore clutch causes the dipping carriage to be raised and initiates an automatic carriage shifting operation through mechanism described in detail hereinafter.

An interlock is provided to prevent depression of the division key while the carriage is dipping, as a result of any operation other than a division operation. This interlock is accomplished by a member 1710 (Figures 75 and 96) which is pivoted at 377 and has a bifurcated end embracing a pin 1712, which pin is carried by link 1713 (see also Figure 46). This link is moved to the left upon dipping of the carriage by means of lever 1714 keyed to shaft 600 which is rocked counter-clockwise upon the dipping operation, as has been previously described. Thus dipping of the carriage causes the blocking member 1710 (Figure 96) to rock clockwise sufficiently to bring its left hand end behind an ear on the upper end of lever 1804 which lever is keyed to shaft 1256, thereby preventing clockwise rotation of said shaft which must occur upon depression of the division key as is illustrated in Figure 81. When the division key is depressed, the lever 1804 is moved clockwise before the carriage dips and consequently before the blocking member 1710 swings clockwise so that the blocking member is ineffective in division operation.

Before proceeding to a description of the automatic carriage shifting it may be well to give an example of the sort of division problem in which an overdraft would occur and be corrected, since the problem considered did not result in an overdraft. Assuming a dividend of 0002402, let us assume a divisor of 0000801, so that at the end of the second cycle of subtraction the dividend will be reduced to 0000800. According to the previous description, the comparison of values will be effected in the fourth and fifth orders from the left only, and will not be affected by the registration of a "one" in the seventh order of the keyboard, since this figure appears to the right of a significant digit and is thus rendered ineffective by the blocking mechanism comprising shelves 901 (Figure 89).

The comparing mechanism which is in actual control will therefore be adjusted exactly as it was in the preceding problem, and a third subtraction cycle will be initiated in the same way. Since the 801 divisor is greater than the 800 dividend, however, this third subtraction cycle will produce an overdraft and necessitate a corrective cycle of operation of the main actuator in the positive direction.

It will be recalled that the gate 907 is released at the end of the restore clutch cycle. At that time the dipping carriage is in its upper position, and if an overdraft has taken place, all dials to the left of the first significant digit will show a "nine" aligned with the carriage cover sight opening. Levers 315 (Figure 89) may therefore rise in these orders until the rollers 316 contact the lowest points of cams 281, permitting all the blocking tails 906 associated with them to be rocked by spring 904 into the path of gate 907, sensing shelves 901 being arranged at such an angle with respect to levers 1040 that it makes no difference in the positioning of the blocking tails whether the dipping carriage be lowered or raised at the time of sensing.

Under these conditions, gate 907 will be restrained by the leftmost blocking tail, and the right arm of bellcrank 2073 (Figure 41) will be held out of the path of lug 945 on the interponent 612, permitting the extension 615 thereon to effect engagement of the main clutch for the corrective cycle, as hereinbefore described. At the end of the main clutch cycle the restore clutch is engaged in the usual way, described in connection with that clutch, and an automatic carriage shifting operation is initiated through the mechanism described in detail hereinafter.

*Operation of carriage shifting in division*

The mechanism for initiating an automatic carriage shifting operation in multiplication has been previously described in detail, and functions similarly in division. During the second cycle of operation of the restore clutch in each carriage position, counter-clockwise movement of lever 570 (Figure 46) carries its lug 1386 against the end of link 1377 (see also Figure 94) moving said link to the left to initiate operation of the carriage shifting mechanism as previously described.

The first cycle of operation of the restore clutch in each carriage position does not initiate operation of the carriage shifting mechanism because, at that time the division control member 975 stands rocked clockwise from the position in which it is shown in Figure 94, and the stud 1065 on said member has lifted the left end of link 1377 depressing its right end below the path of movement of lug 1386. Later in the first restore clutch cycle, however, the member 975 is rocked counter-clockwise and latched in the position in which it is shown in Figure 94, as previously described, removing the stud 1065 from under link 1377 and permitting spring 1382 to rock the link through member 1392 until it abuts the under side of lug 1386. Subsequent dipping of the carriage by the setting clutch, preparatory to a possible correction cycle, then moves lug 1386 to the right permitting link 1377 to be rocked still further and to thus be brought into the path of the leftward movement of lug 1386 during the following cycle of operation of the restore clutch. The carriage is thus moved one step to the left bringing another digit into the "effective dividend."

Operation of the shifting mechanism, thus initiated, is automatically limited to a single cycle, and the division mechanism is automatically restarted at the end of that cycle. About the middle of the carriage shifting cycle, the floating cam 1334 (Figure 69) rocks lever 1350, as has been described in connection with the shifting mechanism proper. Bellcrank 1387 (Figure 94) pivoted on shaft 1388, has one arm adapted for engagement by a pin 1356 on member 1355 and has its other arm provided with an extension 1389 underlying the shift control link 1377. Clockwise rocking of the bellcrank 1387 therefore rocks the link 1377 to depress its right end and carry it clear of lug 1386, thus permitting centralizer 1410 to disengage the shift power transmission at the end of the cycle, and also lifts the latch 1050 (see also Figure 79) freeing the division control member 975 which is thereupon rocked clockwise by its spring 977, restarting subtractive operation in the new carriage position as soon as centralizer 1410 has moved into the position in which it is shown in Figure 94 so as to carry the interlock lever 1416, attached to the centralizer by link 1418, out from under lug 1420 on the main operating bar link 505 (see also Figure 39).

During the division operation the short-cut key is blocked out of operation and operation of the non-shift key is disabled. As appears in Figure 74, a bellcrank 1255 is carried by the shaft 1256 which is rocked by depression of the division key 970 (Figure 81) in a manner to be described hereinafter. This bellcrank 1255 forms the support for the latch 1241 described in connection with the non-shift key (Figure 71). As the division key 970 is depressed, the bellcrank 1255 is therefore also rocked in a clockwise direction and the latch 1241 carried thereby is moved to the right from its normal position overlying ear 1244, permitting it to be rocked counter-clockwise by its spring 1243 until an ear 1251 thereon engages the bell crank 1255. Bell crank 1255 carries latch 1241 to a position wherein it is wholly ineffective. The bellcrank 1255 has also a pin and slot connection 1257 with a lever 1258 pivoted on the shaft 752. The lever 1258, as is also illustrated in Figure 83, has an arm 1260 which, upon the counterclockwise movement of lever 1258 caused by rocking of the bellcrank 1255, will underlie a shelf 1128 on the lower end of the short-cut key stem 1121 to prevent depression of said key during the division operation.

The mechanism for manually initiating a carriage shift in either direction is also disabled during the division cycle by means illustrated in Figure 70. It will be recalled that upon depression of either of the manual shift keys 1405 or 1406, the link 1483 is moved laterally to operate the control member 1375 by means of its notch 1474 engaging said control member. During the division operation, this link 1483 is lowered sufficiently to carry the notch 1474 thereon out of engagement with the control member 1375. In order so to lower the link 1483, the division key, as illustrated in Figure 81, upon being depressed, rocks the left hand end of lever 973 upwardly to pull a link 965 pivoted thereto to the left. This link is pivoted at its opposite end to a lever 1026 which is fixed to shaft 1256 and has a connection with the upper end of link 1476 which link is pivoted at its lower end to the link 1483.

The mechanism for predetermining the direction of automatic shifting in multiplication is rendered ineffective in division operations by means of an ear 971a (Figures 75, 76, and 94) on the division key 971 which, upon depression of the division key, may be brought into contact with member 1383 to rock the latter into cooperative engagement with ear 1384, if it is not already so set. Upon release of the division key, the setting of member 1383 will again be under the control of keys 1201 and 1202 as hereinbefore described.

*Termination of operation*

This repetitive tour of operations is repeated in each successive carriage position until the carriage reaches its leftmost position, when further operation of the carriage shifting mechanism is prevented and the machine is brought to rest. As the carriage moves into its leftmost position, projection 1570 (Figure 81) on the right carriage end plate 251 contacts the under side of the cam end 1571 of lever 1572, rocking the lever counter-clockwise against the tension of spring 1573.

During division operations, with the carriage in its leftmost position, the division key will be unlatched and permitted to rise. A third arm of lever 1572 underlies a lateral extension 1067 on the upper end of bellcrank 1068 pivoted at 1069 to the division key latch 982. When the lever 1572 is rocked by the carriage, bellcrank 1068 may be rocked by spring 1070 to hook its other arm around lateral extension 1056 of the bellcrank 1057 (Figure 79). This bellcrank, it will be recalled, is rocked by link 1054 during the first restore clutch cycle in each order for the purpose of initiating a setting clutch cycle. If the end of bellcrank 1068 (Figure 81) be hooked over its extension 1056 during such rocking, the bellcrank 1057 will be pulled to the left, rocking the latch member 982 counter-clockwise about its supporting shaft 1222 and releasing the lateral extension 980 of lever 973, permitting the division key 970 to be raised by its spring, since member 975 (Figure 79) is concurrently removed from its position overlying roller 974 on the division key stem. The machine is thus completely conditioned for subsequent operations of any character.

*Interruption of division operations*

A division operation may be terminated at the conclusion of operations in any carriage position by a single depression of the stop key 985 (Figure 80), leaving the quotient digit in that order accurately registered, or it may be terminated at once by two successive depresssions of the same key, which may possibly leave an inaccurate quotient digit in the counter. This mode of operation is planned to take advantage of the instinctive action of the operator, who will naturally strike the stop key a second time if the machine fails to stop as soon as was desired when the key was first struck.

The stop key 985 is slidably supported upon pins in the frame and is provided with a right angular portion 966 which overlies a lever 1075 connected by means of a pin and slot with a lever 1076 mounted on the same hub as a bellcrank 1077 (see also Figure 81). Upon depression of the stop key the bellcrank 1077 is, through the levers described, rocked in a counter-clockwise direction. A link 1079 connected with the downwardly extending arm of the bellcrank 1077 and normally urged upwardly by a spring 1080, is moved to the right by this counter-clockwise movement of the bellcrank 1077. A spring 1078, urging the bellcrank 1077 in a clockwise direction, also serves, through the levers described, to maintain the stop key in its raised position.

The link 1079 carries a shelf 1084 engageable with the tail 1086 of the division key latch 982, and is limited in its upward movement under tension of the spring 1080, by an ear 1085 formed on a lever 1087. The lever 1087 is pivoted on the shaft 1222 which carries the division key latch 982, and has but a limited swinging movement relative to said latch so that for the present purpose it may be considered as an integral part of the latch. Upon the first depression of the stop key the link 1079 is moved to the right carrying its shelf 1084 against the lower end of the tail 1086 of the division key latch 982. This swings the division key latch counter-clockwise, releasing the division key to rise slightly until its roller 974 (see Figure 79) meets the under side of the division control member 975.

Being released from its latch, the division key 970 is permitted to rise as soon as the division control member 975 has been moved to the position in which it is shown in Figure 79. This occurs during the next cycle of operation of the restore clutch and the roller 974 on the division key stem is then brought into blocking relation with the member 975, preventing operative movement thereof after its release from the latch 1050 (see Figure 79) by operation of the shifting mechanism. Upon being released by latch 1050, however, the member 975 moves slightly to the right against the roller 974, thus preventing the reengagement of the latch. The division operation is therefore interrupted upon a single depression of the stop key at the conclusion of the first shifting operation subsequent to the depression of the key, but the last quotient digit is correct.

A second depression of the stop key, after the latch 982 has been tripped, also moves the link 1079 to the right. It will be recalled, however, that upon the first depression of the stop key the member 982 (Figure 81) was moved in a counter-clockwise direction; thus the lever 1087 was swung upwardly and its ear 1085 permitted the link 1079 to rise slightly. This rise of the link 1079 is sufficient to cause its right hand end to engage lateral extension 2126 on a downward extension of lever 2117 fixed to shaft 626.

As shown in Figure 41, the multicycle latch 632 is also fixed to shaft 626, so that movement of this shaft by the link 1079 releases the main clutch dog 395 and thus immediately arrests operation of the main clutch and initiates operation of the restore clutch. The operation is then terminated as in the case where the stop key was depressed but once, a positive cycle of actuator operation intervening in appropriate cases.

Miscellaneous functions of the stop key

The stop key may be used to reset the add control member 728 (Figures 55 and 80) in the event that it has been released by depression of the plus or minus bars while the machine is not under power. The stop key also may be used to release any multiplication keys which may have been depressed when the machine was not under power.

Lever 1076 (Figure 80), connected by a sleeve with bellcrank 1077, carries a broad-headed pin 1091 lying in a slot in a link 1092 pivotally connected to the lower end of control member 728. The slot of the link 1092 permits member 728 to rock in its normal positions without interference from the pin 1091, but rocking of lever 1076 by depression of the stop key 985 will, if the member 728 has been released, restore it to the position in which it is shown in Figure 80, where it may be relocked by the lug 726 (Figure 54).

To release any multiplier keys which may have been depressed and left down while the machine was not under power, a link 1073 is pivoted to the lower end of lever 1076 and rides over a frame stud 1074 to maintain its left end in a position where an ear 1075 thereon may engage and actuate the multiplier key latch bar 2055 described in detail in connection with Figures 59 and 62.

Relatching of the division control member 975 under similar conditions, may be effected by pressing the ear 1093 (Figure 79) to the right by means of a tool. This first rocks the small lever 1094 counter-clockwise around its pivot 1095 on the lower part of control member 975, and brings an upper ear 1096 of the lever against lever 1062, raising it and thus raising link 1054 to prevent rocking of bellcrank 1057 by movement of member 975. The ear 1093 then strikes an ear 1097 on the member 975 and further movement of the tool to the right, rocks member 975 back toward the position in which it is shown in Figure 79, where it may be held by latch 1050 until the release of the division key 970 by depression of the stop key 985. As the division key rises, roller 974 thereon first moves to block member 975 and then raises the latch member 1050 to release member 975 from the latch, leaving it restrained by roller 974 alone, and ready for operation upon depression of the key.

Counter mechanism

A counter mechanism is provided in the upper portion of the carriage (Figures 1 and 16) so that the number of operations performed in addition or subtraction may be recorded, the mechanism also serving as a multiplier register in multiplication operations and as a quotient register in division operations.

Counter control

The character of count in the counting register is controlled by lever 1803 (Figures 1 and 96). When this lever is in its forward or leftward position, counting register 1800 will give a complementary or negative count of multipliers in case of multiplication, and of quotients in the case of division; while, when lever 1803 is moved to its rearward or rightward position, the counter will give a direct or positive count of multipliers in multiplication and a direct count of quotients in division.

The construction of the counter actuator for register 1800 will now be described, while the construction of the counter mechanism will be considered presently.

A slide 1812 (Figures 97 and 98) is supported in the slotted end of shaft 1819 and includes a projection 1814 which can be selectively engaged with slot 1815 provided in gear 1816 and slot 1817 in gear 1818 mounted on shaft 1819 which extends across the machine to a counter actuator to be described in connection with register 1800.

Gear 1816 is driven directly by gear 491 (Figures 96, 97, and 52) from the main clutch, while gear 1818 is driven through gear 492 and idler 1820. Whenever the main clutch is rotated, therefore, gears 1816 and 1818 will be rotated in opposite directions, so that when the projection 1814 is engaged with the slot in gear 1818, it will be driven by that gear in one direction, while, if it is in the slot in gear 1816, it will be driven in the other direction, driving gear 1821 keyed to shaft 1819 selectively in opposite directions. The gear train, including gear 1822, is thus reversed in its direction of rotation to rotate shaft 1823 in either a clockwise or a counter-clockwise direction. The ratio between the gears is such that finger 1824 (Figures 96 and 97) will describe a complete cycle for each half revolution made by the main clutch. This arrangement results in the counter dial in register 1800 being advanced one full increment for each main clutch cycle, although this main clutch cycle is completed in only a half revolution.

The relation of the gearing is such that, upon additive rotation of the twelfth, quarter, and half speed shafts, with projection 1814 in the slot in gear 1816, the counter actuating finger moves the counter dial in the same direction as the accumulator dials while, with the projection 1814 in the slot in gear 1818, similar actuation results in the dials being moved in the subtractive direction and complementary figures being entered in the dials.

The direction of rotation of the counter dials is under the control of the radial cam on lever 1808. This cam operates in a notch in a slidable shaft 1810 which is supported by a sleeve 1811 in the right side frame plate 610 and by a bracket 1806 attached to the plate 1886. One end of shaft 1810 is keyed into the flat slide 1812 by enlarged portion 1813, whereby lateral movement of the shaft 1810 moves slide 1812, but rotation of the slide with respect to the shaft is permitted. This cam lever 1808 has an extending double offset end 1825 which shifts shaft 1810 to set the counter dials for rotation in the same direction as the accumulator dials, and another portion 1826 whereby the dials are set for rotation in the opposite direction to the accumulator dials.

In division, the counter drive is reversed with respect to the accumulator dials and lever 1808 is automatically moved by shaft 1256. As previously described, shaft 1256 (Figure 96) is rocked clockwise by depression of the division key 970 (see also Figure 81). Lever 1804 is pinned to this shaft and upon clockwise rocking of shaft 1256 pushes lever 1805, which is loose upon the shaft, to the rear against the tension of spring 1801 which urges lever 1804 counter-clockwise while spring 1806 pulls the two levers together.

The direction of operation of the finger 1824 is also under the control of lever 1803 which is positioned at the right hand side of the keyboard and is pivoted on the right side frame. The lever is centralized in either of two positions by a lever 1837 pivoted at 1838 and urged in a clockwise direction by spring 1839. This lever has a nose 1870 engaging a projection 1871 on the lever 1803 to retain it in either position in which it may be set. A short link 1872 pivoted to the lever 1803 is also pivoted to a depending link 1873 which latter link is pivoted at its lower end to the lever 1835. A link 1807 extends from a pivot 1849 at the center of the link 1873 to a downwardly extending end of lever 1808.

Thus the character of count in the counting register is controlled by lever 1803. When this lever is in its rearward position the counting register will give a direct or positive count of multipliers, in case of multiplication, and of quotients in the case of division, while, when lever 1803 is moved to its forward position the counter will give a complementary or negative count of multipliers in multiplication and a complementary count of quotients in division.

In order to obtain a direct count in multiplication operations, it is necessary that the counter dials be driven in the same direction that the accumulator dials are driven, while, to obtain a direct count of quotients in division operations, it is necessary that the counter dials be driven in the opposite direction to that in which the accumulator dials are driven. This requires a reversal of the counter drive upon the initiation of the division operations so that in whichever position lever 1803 stands, the interchange from the proper direction of actuation of the counter for multiplication to the proper actuation for division is automatically secured. In the present machine this is accomplished without moving the lever 1803 from its rearward position.

As previously described, shaft 1256 is rocked clockwise during division. Lever 1804 is keyed to this shaft 1256. Lever 1804, upon clockwise rocking of shaft 1256, pushes lever 1805 to the rear, bringing the connection point 1849 of link 1807 to position B from position A so that the counter dial will be driven in the opposite direction to that in which the accumulator dials are being driven. With the lever 1803 in the forward position and point 1849 in position B, a similar movement of lever 1804 would serve to bring connection point 1849 in position C in which the counter dials would be driven in the same direction as the accumulator dials and would thus record the complement of the quotient, rather than the direct quotient. Thus, upon division, that character of result is entered into the counter register which is called for by the lever 1803, even though the drive in division is reversed.

Immediately upon operation of the circuit controlling means, bellcrank 385 (Figures 28 and 96) is rocked on shaft 386 and projection 1827 thereon is brought down to engage either notch 1828 or 1829 to retain link 1807 rocked until the circuit is reopened, thus preventing reversal of the counters upon release of the division key, but before completion of the operation.

The counter actuator finger 1824 serves to operate the counter one step for each cycle of accumulator actuation and, as the carriage is shifted across the machine, the gear 1880 in each order is selectively presented to the actuating finger (Figure 96). This finger is mounted on lever 1830 which is rotated by an eccentric 1811 on shaft 1823. The finger is supported intermediately by pin 1835 while the lever is supported by pin 1836 so that the finger is moved to engage and rotate the particular gear 1880 presented. The gear 1880 is selectively reversed by reversing the direction of rotation of the eccentric. In one case the finger is moved toward the gear, then up and back to drag the gear around. In the other, the finger is moved forward and down, to push the gear around in the opposite direction, and then out of engagement, and back. The finger is retracted from the gear 1880 after each single actuation so that the counter dial is moved one step at a time, each successive counter dial unit to the left of that unit actuated by finger 1824 being moved as hereinafter described. A lever 1833 is supported from pin 1836 and is biased by spring 1834 against a surface on the cam 1831 to centralize the eccentric 1811 and thereby the finger 1824.

The counter mechanism proper includes a plurality of dials 1875 which may be observed through sight openings 1874 (Figure 16) in the accumulator carriage. The construction of these dials is similar to that of the accumulator mechanism dials to which reference may be had for a detailed description of the construction thereof. The construction of the counter register 1800 is practically the same except as hereinafter noted.

In the present case, the dials are mounted upon shaft 1867 (Figure 21) extending through end plates 251 and brace plates 255. Each order of the counter unit includes a gear 1877 rotatably mounted upon a shaft 1878 being engaged with a gear 1879 and its cooperatively associated counter dial 1875. Gear 1879 corresponds to gear 273 in Figures 19 and 25. Gear 1877 is also in mesh with a gear 1880 which, in each actuated order in the counter 1800 may be engaged by the actuating finger 1824.

Immediately prior to each operation of the counter dials, either clockwise or counter-clockwise, roll carriers 1881 (Figure 22) are freed from spring tension to permit rollers 1882 to move out of contact with and out of the path of snail cams 1883. This occurs, upon each dip of the dipping carriage, only in the operated order and all orders to the left thereof. This obviates the strain on the mechanism which would result if the rollers had to be backed up the steep rise in the cam in additive operations.

The levers 1884 are rocked against the tension of their springs 1885 upon each carriage dipping by a member 1890 carried by bellcranks 1891 on shaft 542 (Figure 23). The bellcranks lie beneath dipping bail 269 so that each time the carriage dips, member 1890 rocks counter-clockwise to rotate levers 1893 on shaft 1894 and rock levers 1884 opposite to such of the levers 1893 as are engaged by member 1890. Roller carrier levers 1881, being held against the snail cams only by spring 1885, are thus freed from this tension and do not interfere with operation in either direction.

The following copending applications claim certain subject matter disclosed but not claimed in the present application: Serial Number 104,471, filed October 7, 1936; Serial Number 228,613, filed September 6, 1938; Serial Number 305,311, filed November 20, 1939; Serial Number 314,597, filed January 19, 1940; Serial Number 315,055, filed January 22, 1940; Serial Number 329,281, filed April 12, 1940; Serial Number 351,375, filed August 4, 1940; Serial Number 352,289, filed August 12, 1940.

I claim:

1. In a motor driven calculating machine having cyclically operable actuating mechanism and clutch means for connecting the same with said motor; a depressible key, means controlled thereby for initiating operation of said motor, means for latching said key in depressed position, means operable by said motor for initiating operation of said clutch means, and means controlled jointly by said key upon depression thereof and by said latching means upon movement thereof to retain said key in depressed position for actuating said last named means.

2. In a motor driven calculating machine having cyclically operable actuating mechanism and clutch means for connecting the same with said motor; a depressible key, means controlled thereby for initiating operation of said motor, means for latching said key in depressed position, means operable by said motor including a cyclically operable clutch for initiating operation of said clutch means and releasing said latching means; and means controlled jointly by said key upon depression thereof and by said latching means upon movement thereof to retain said key in depressed position for actuating said motor operable means.

3. In a motor driven calculating machine having actuating mechanism and a cyclically operable power transmission device for connecting the same to said motor, a plurality of depressible members for controlling said device, means for latching any of said members in depressed position, means operated by said motor for releasing said latch; the combination with means for retaining said latching means to prevent reengagement thereof with a depressed member, of means controlled by said members and effective upon depression of another of said members to withdraw and hold said retaining means out of engagement with said latching means.

4. In a motor driven calculating machine having actuating mechanism and a cyclically operable power transmission device for connecting the same to said motor, a plurality of depressible members for controlling said device, means for latching any of said members in depressed position, means operated by said motor for releasing said latch; the combination with means for retaining said latching means to prevent reengagement thereof with a depressed member, of means controlled by said members and effective upon depression of another of said members to withdraw and hold said retaining means out of engagement with said latching means, and means operated by said motor for releasing said retaining means to permit reengagement thereof with said latching means.

5. In a calculating machine having accumulating mechanism, actuating mechanism, driving mechanism therefor, and means for engaging said driving mechanism with said actuating mechanism comprising cyclically operable power transmission mechanism and a selectively operable control device therefor; the combination of means normally effective to actuate said control device to disengage said driving mechanism from said actuating mechanism upon a single cycle of operation of said transmission mechanism, means for latching said control device to permit multicyclic operation of said transmission mechanism, and means controlled by said control device for preventing operation of said latching means during monocyclic operation of said transmission mechanism.

6. A control mechanism for calculating machines comprising a plurality of concurrently operable motor operation control devices, latching means for retaining said devices in operated position, means rendered effective upon partial operation of one of said devices for preventing initiation of the operation controlled by another of said devices while permitting free operation and latching of the latter device, means effective upon complete operation of said partially operated device, before operation of said other device, for completely blocking operation of said other device, and means effective upon complete operation of said partially operated device after operation and latching of said other device for initiating an operation under the joint control of both said devices.

7. A control mechanism for calculating machines having a plurality of concurrently operable motor operation control devices comprising means rendered effective upon partial operation of one of said devices for preventing initiation of the operation controlled by another of said devices while permitting free operation of said latter device, means effective upon restoration of said partially operated device, after operation of said other device, for initiating the operation controlled by the operated device, and means effective upon complete operation of said partially operated device, after operation of said other device, for initiating an operation under the joint control of both said devices.

8. In a motor driven calculating machine, a series of depresible keys spring urged to raised position, means for retaining said keys in depressed position, means for releasing said retaining means, a longitudinally extending member underlying said keys and mounted for parallel movement by any of said keys upon depression thereof, and power operated means operating in timed relation with said releasing means for sequentially applying and relieving resilient pressure to move said member upwardly against any depressed key.

HAROLD T. AVERY.